United States Patent
Cong et al.

(10) Patent No.: US 7,626,533 B2
(45) Date of Patent: Dec. 1, 2009

(54) ROAD CURVATURE ESTIMATION SYSTEM

(75) Inventors: Shan Cong, Ann Arbor, MI (US); Shi Shen, Farmington Hills, MI (US); Lang Hong, Beavercreek, OH (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 12/060,842

(22) Filed: Apr. 1, 2008

(65) Prior Publication Data

US 2008/0183419 A1 Jul. 31, 2008

Related U.S. Application Data

(60) Division of application No. 11/022,265, filed on Dec. 24, 2004, which is a continuation-in-part of application No. 10/620,749, filed on Jul. 15, 2003, now Pat. No. 7,034,742.

(60) Provisional application No. 60/396,211, filed on Jul. 15, 2002, provisional application No. 60/532,344, filed on Dec. 24, 2003.

(51) Int. Cl.
*G01S 13/93* (2006.01)
*G08G 1/16* (2006.01)

(52) U.S. Cl. .................. 342/70; 342/113; 342/133; 342/195; 701/300; 701/301

(58) Field of Classification Search .......... 342/70–74, 342/90, 107, 113–115, 133, 159, 160–162, 342/189, 195, 196; 701/300, 301
See application file for complete search history.

(56) References Cited

U.S. PATENT DOCUMENTS

| | | | |
|---|---|---|---|
| 2,709,804 A | 5/1955 | Chance et al. | |
| 3,177,485 A | 4/1965 | Taylor, Jr. | |
| 3,603,994 A | 9/1971 | Williams at al. | |
| 3,699,573 A | 10/1972 | Andrews et al. | |
| 3,725,918 A | 4/1973 | Fleischer et al. | |
| 3,869,601 A | 3/1975 | Metcalf | |
| 3,971,018 A | 7/1976 | Isbister et al. | |
| 4,623,966 A | 11/1986 | O'Sullivan | |
| 5,051,751 A | 9/1991 | Gray | |
| 5,138,321 A | 8/1992 | Hammer | |
| 5,170,440 A | 12/1992 | Cox | |
| 5,202,691 A | 4/1993 | Hicks | |
| 5,307,289 A | 4/1994 | Harris | |
| 5,314,037 A | 5/1994 | Shaw et al. | |
| 5,343,206 A | 8/1994 | Ansaldi et al. | |
| 5,402,129 A | 3/1995 | Gellner et al. | |
| 5,406,289 A | 4/1995 | Barker et al. | |
| 5,471,214 A | 11/1995 | Faibish et al. | |
| 5,530,651 A | 6/1996 | Uemura et al. | |
| 5,537,119 A | 7/1996 | Poore, Jr. | |

(Continued)

OTHER PUBLICATIONS

Dickmanns, E.D.; Mysliwetz, B.D.; "Recursive 3-D Road and Relative Ego-State Recognitiion," IEEE Transactions on Pattern Analysis and Machine Intelligence, vol. 14, No. 2, Feb. 1992, pp. 199-213.

(Continued)

*Primary Examiner*—Isam Alsomiri
(74) *Attorney, Agent, or Firm*—Raggio & Dinnin, P.C.

(57) ABSTRACT

A processor operatively coupled to a speed sensor adapted to generate a measure of a longitudinal speed of a vehicle on a roadway, and to a source of a measure of yaw rate of the vehicle, provides for selecting a most likely roadway model of a plurality of different roadway models and for outputting a corresponding associated at least one curvature parameter as an estimate of curvature of the roadway, wherein the processor incorporates a plurality of curvature estimators associated with the corresponding plurality of different roadway models.

4 Claims, 21 Drawing Sheets

U.S. PATENT DOCUMENTS

| | | | |
|---|---|---|---|
| 5,539,397 | A | 7/1996 | Asanuma et al. |
| 5,587,929 | A | 12/1996 | League et al. |
| 5,594,414 | A | 1/1997 | Namngani |
| 5,598,164 | A | 1/1997 | Reppas et al. |
| 5,627,768 | A | 5/1997 | Uhlmann et al. |
| 5,631,639 | A | 5/1997 | Hibino et al. |
| 5,633,642 | A | 5/1997 | Hoss et al. |
| 5,657,251 | A | 8/1997 | Fiala |
| 5,668,739 | A | 9/1997 | League et al. |
| 5,684,473 | A | 11/1997 | Hibino et al. |
| 5,689,264 | A | 11/1997 | Ishikawa et al. |
| 5,703,593 | A | 12/1997 | Campbell et al. |
| 5,710,565 | A | 1/1998 | Shirai et al. |
| 5,751,211 | A | 5/1998 | Shirai et al. |
| 5,926,126 | A | 7/1999 | Engelman |
| 5,948,043 | A | 9/1999 | Mathis |
| 5,955,967 | A | 9/1999 | Yamada |
| 5,959,552 | A | 9/1999 | Cho |
| 5,959,574 | A | 9/1999 | Poore, Jr. |
| 5,983,161 | A | 11/1999 | Lemelson et al. |
| 6,070,121 | A | 5/2000 | Matsuda |
| 6,085,151 | A | 7/2000 | Farmer et al. |
| 6,134,509 | A | 10/2000 | Furusho et al. |
| 6,141,617 | A * | 10/2000 | Matsuda et al. ............... 701/72 |
| 6,161,071 | A | 12/2000 | Shuman et al. |
| 6,198,426 | B1 | 3/2001 | Tamatsu et al. |
| 6,226,389 | B1 | 5/2001 | Lemelson et al. |
| 6,265,991 | B1 * | 7/2001 | Nishiwaki et al. ........... 340/903 |
| 6,268,825 | B1 | 7/2001 | Okada |
| 6,275,231 | B1 | 8/2001 | Obradovich |
| 6,275,773 | B1 | 8/2001 | Lemelson et al. |
| 6,282,478 | B1 | 8/2001 | Akita |
| 6,292,752 | B1 | 9/2001 | Franke et al. |
| 6,300,865 | B1 * | 10/2001 | Fechner et al. .............. 340/436 |
| 6,343,253 | B1 | 1/2002 | Matsuura et al. |
| 6,370,475 | B1 | 4/2002 | Breed et al. |
| 6,374,184 | B1 | 4/2002 | Zahm et al. |
| 6,393,376 | B1 | 5/2002 | Andreas |
| 6,405,132 | B1 | 6/2002 | Breed et al. |
| 6,420,997 | B1 | 7/2002 | Cong |
| 6,424,904 | B1 | 7/2002 | Takahashi et al. |
| 6,470,272 | B2 | 10/2002 | Cong et al. |
| 6,542,111 | B1 | 4/2003 | Wilson |
| 6,567,039 | B2 | 5/2003 | Shirai et al. |
| 6,643,588 | B1 | 11/2003 | Ibrahim |
| 6,670,910 | B2 | 12/2003 | Delcheccolo et al. |
| 6,675,090 | B2 * | 1/2004 | Matsuura .................... 701/200 |
| 6,675,094 | B2 | 1/2004 | Russell et al. |
| 6,718,259 | B1 * | 4/2004 | Khosla ........................ 701/200 |
| 6,751,547 | B2 | 6/2004 | Khosla |
| 6,763,318 | B1 | 7/2004 | Winter et al. |
| 6,819,779 | B1 | 11/2004 | Nichani |
| 6,823,241 | B2 | 11/2004 | Shirato et al. |
| 7,034,742 | B2 | 4/2006 | Cong et al. |
| 7,522,091 | B2 | 4/2009 | Cong et al. |
| 2002/0022927 | A1 | 2/2002 | Lemelson et al. |
| 2002/0042668 | A1 | 4/2002 | Shirato et al. |
| 2002/0044080 | A1 | 4/2002 | Shirai et al. |
| 2002/0049539 | A1 | 4/2002 | Russell et al. |
| 2003/0100992 | A1 | 5/2003 | Khosla |
| 2003/0195703 | A1 | 10/2003 | Ibrahim |
| 2003/0218563 | A1 | 11/2003 | Miyahara |
| 2004/0143416 | A1 | 7/2004 | Hattori et al. |
| 2004/0183663 | A1 | 9/2004 | Shimakage |

OTHER PUBLICATIONS

Hsu, J.C.; Chen, W. L.: Lin, R. H; Yeh, E. C.; "Estimations of previewed road curvatures and vehicular motion by a vision-based data fusion scheme," Machine Vision and Applications, vol. 9, 1997, p. 179-192.

Barber, P.A.; King, P.; Richardson, M.; "Road lane trajectory estimation using yaw rate gyroscopes for intelligent vehicle control," Transactions on the Institute of Measurement and Control, vol. 20, No. 2, 1998, pp. 59-66.

Schiffmann, J.K.; Widmann, G.R.: "Model-Based Scene Tracking Using Radar Sensors for Intelligent Automotive Vehicle Systems," IEEE International Radar Conference, 1998, pp. 421-426.

Jilkov, V.P.; Angelova, D.S.; Semerdjiev, Tz.A.; "Design and Comparison of Mode-Set Adaptive IMM Algorithms for Maneuvering Target Tracking." IEEE Transactions on Aerospace and Electronic Systems, vol. 35, No. 1, Jan. 1999, pp. 343-350.

Tsang, S. H.;. Hoare, E. G; Hall, P. S.; Clarke, N. J.; "Automotive Radar Image Processing To Predict Vehicle Trajectory," IEEE International Radar Conference, 1999, p. 867-870.

Jula, H.; Kosmatopoulos, E.; Ioannou, P.; "Collision Avoidance Analysis for Lane Changing and Merging," Technical Report, University of Southern California, 1999.

Lin, C-F.; Ulsoy, A.G.; LeBlanc, D.J.; "Vehicle Dynamics and External Disturbance Estimation for Vehicle Path Prediction," IEEE Transactions on Control Systems Technology, vol. 8, No. 3, May, 2000, pp. 508-518.

Ke, C-C.; Herrero, J.G.; Lilnas, J.; "Comparative Analysis of Alternative Ground Target Tracking Techniques," In International Conference on Information Fusion, vol. 2, 2000, pp. WeB5:3-10.

Miyahara, S.: "A Method for Radar-Based Target Tracking in Non-Uniform Road Condition," SAE 2003 World Congress, 2003-01-0013, 2003.

Karlsson, R.; Jansson, J.; Gustafsson, F.; "Model-based statistical tracking and decision making for collision avoidance application," Technical Report, Linkoping University, LITH-ISY-R-2492, Feb. 2003.

Coue, C.; Fraichard, Th.; Bessiere, P.; Mazer, E.; "Using Bayesian Programming for Multi-Sensor Multi-Target Tracking in Automotive Applications," Proceedings of the IEEE Int. Conf. on Robotics and Automation, Taipei, Taiwan, May 2003.

Dickmanns, E.D., Zap, A., "A curvature-based scheme for improving road vehicle guidance by computer vision," Mobile Robots, Cambridge, MA: SPIE. 1986; vol. 727, p. 161-168.

Goldbeck, J., Huertgen, B., Ernst, S., Kelch, L., "Lane following combining vision and DGPS," Image and Vision Computing, vol. 18, 2000, p. 425-433.

Shen, S., A Multisensor-Based Automotive Collision Prediction System, Ph.D. Dissertation. Wright State University, Oct. 2002.

International Search Report in PCT/US04/43695, Dec. 19, 2006, 4 pages.

* cited by examiner

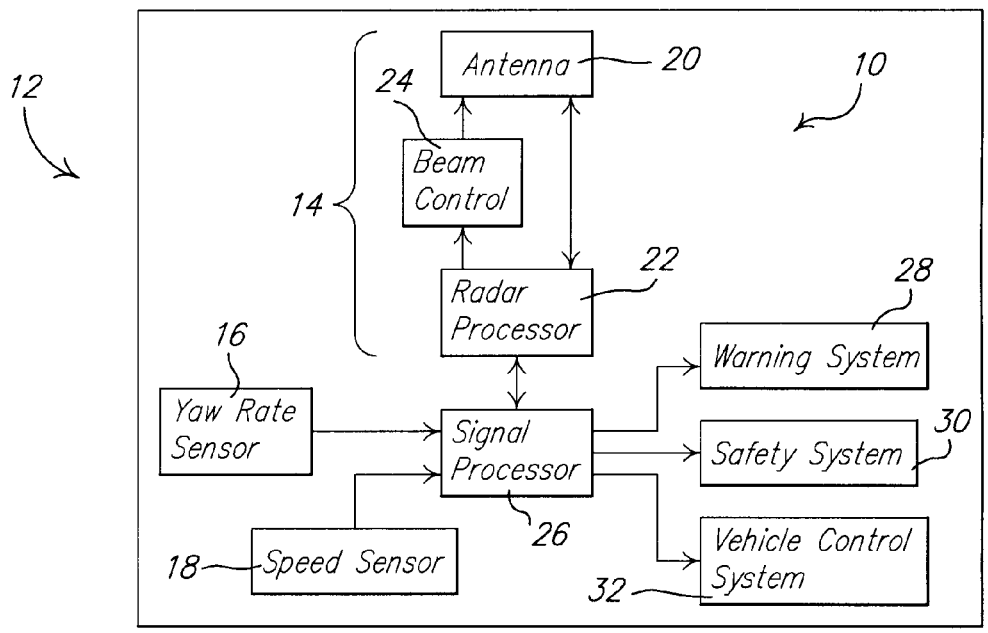
FIG. 1.
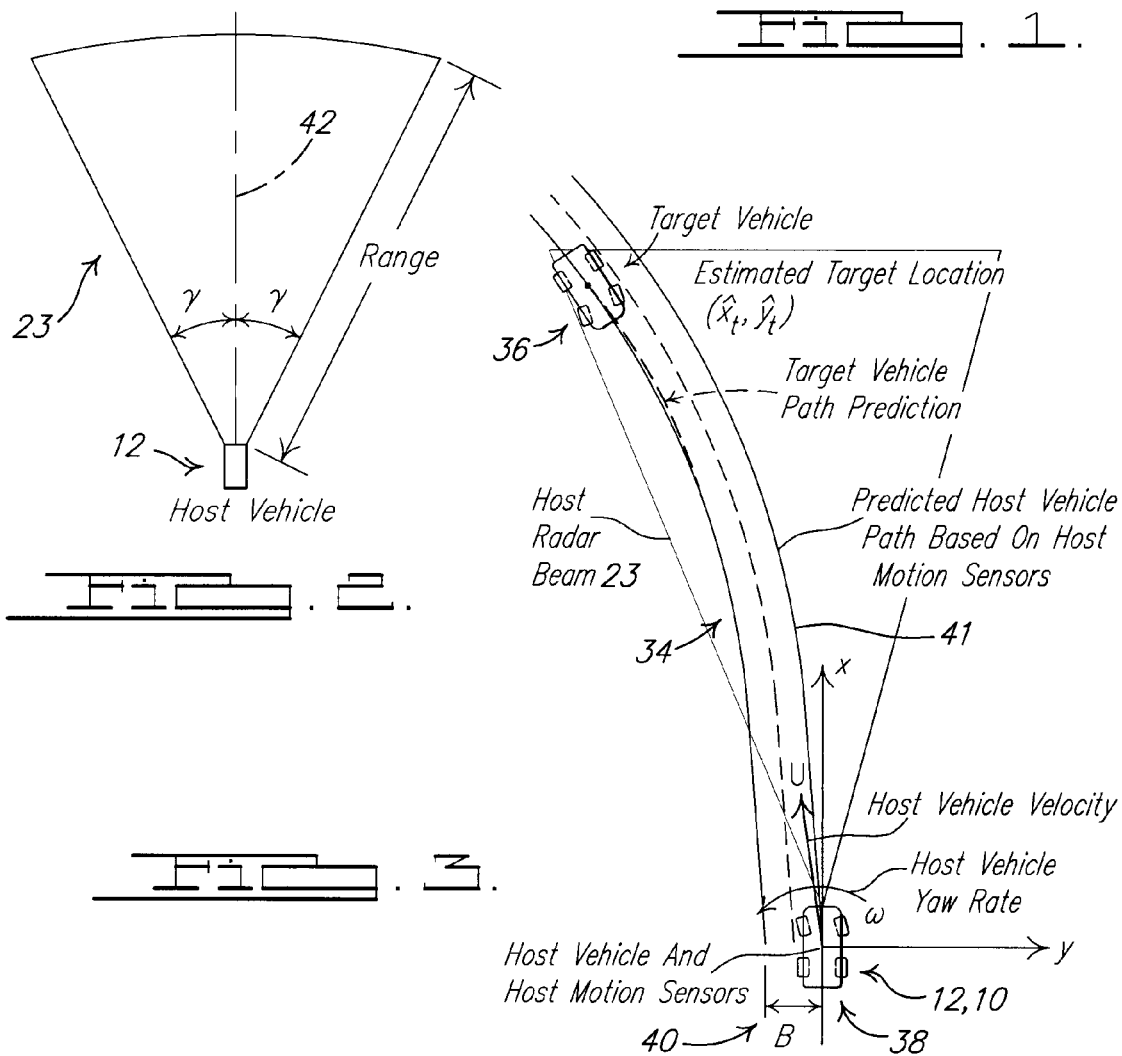
FIG. 2.
FIG. 3.

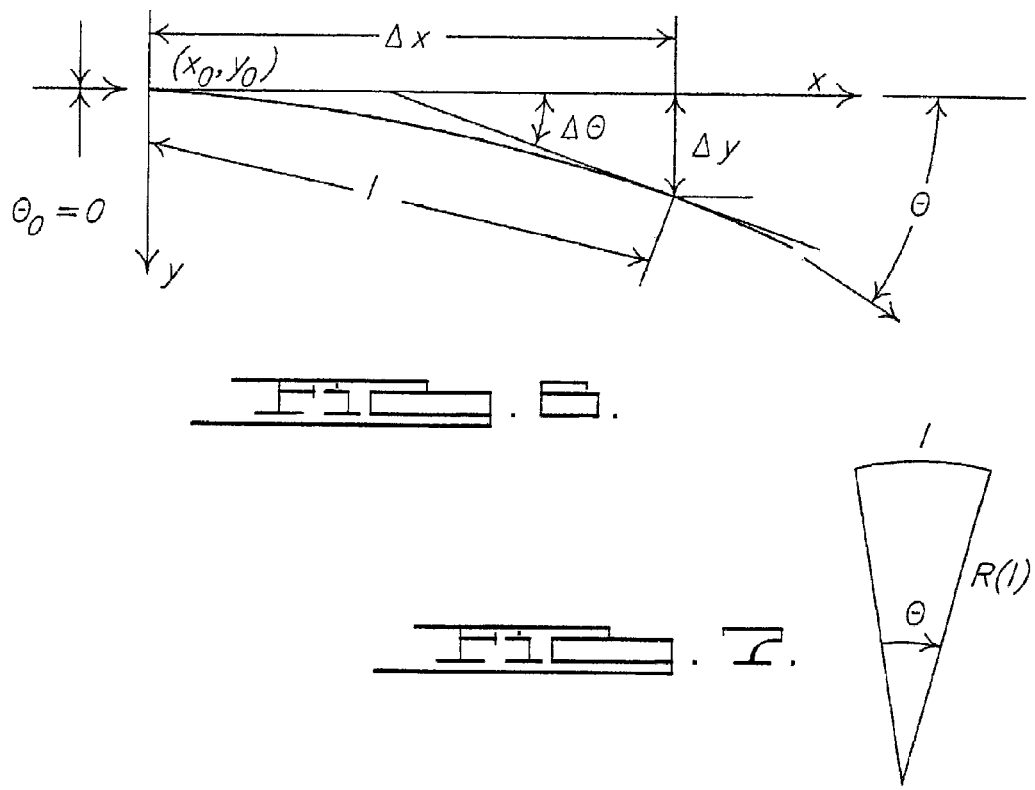
FIG. 6.
FIG. 7.
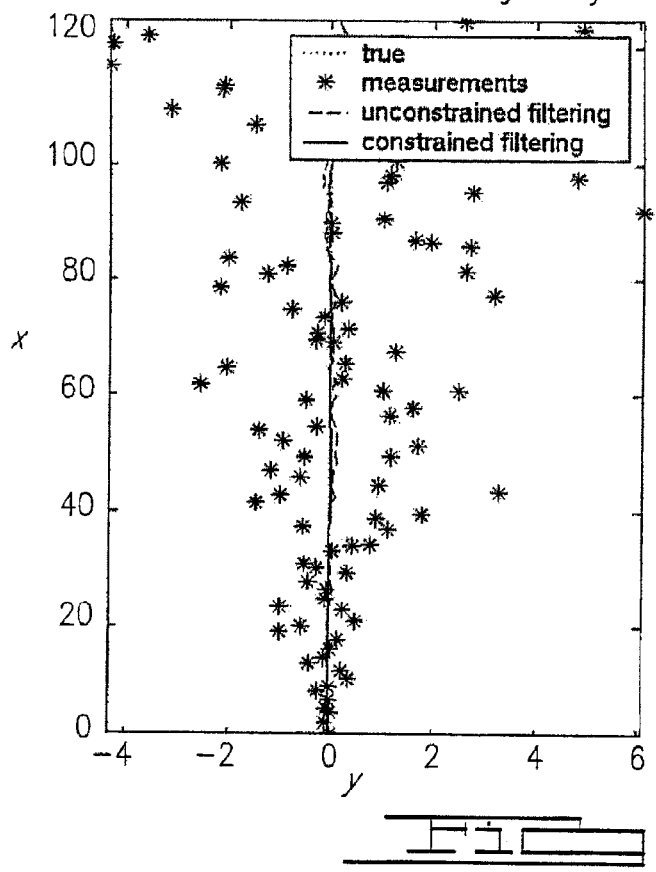
FIG. 8a.

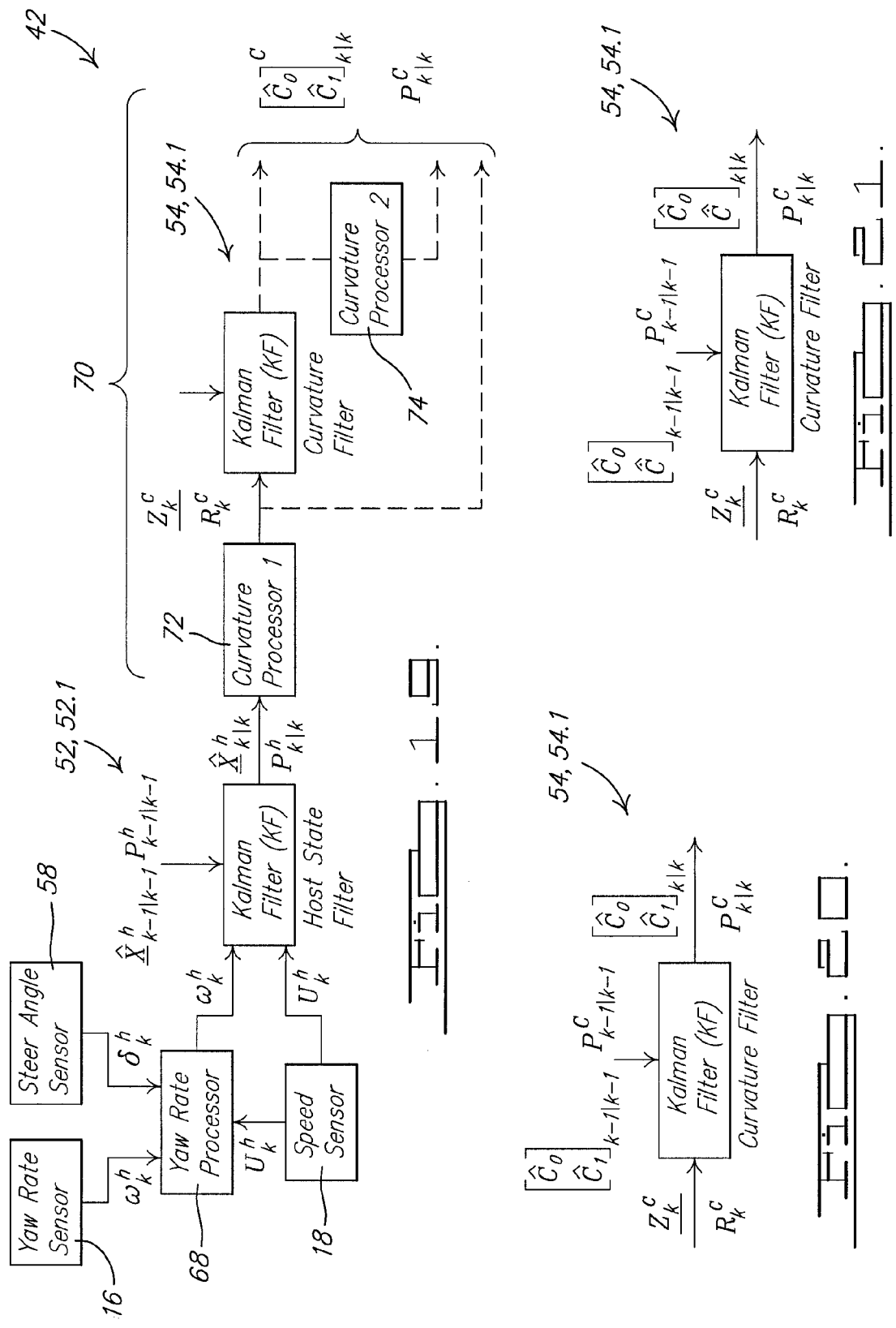

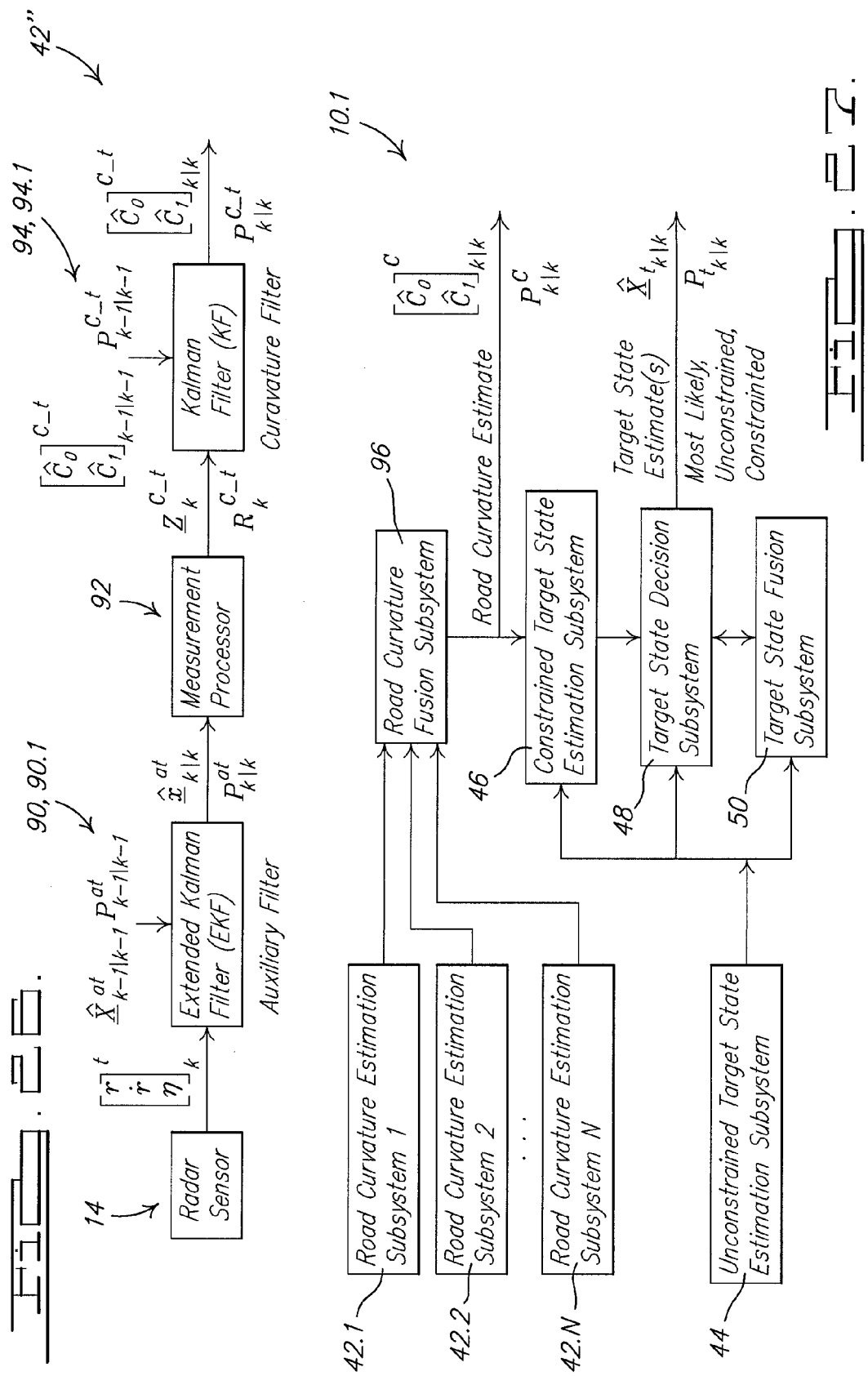

ROAD CURVATURE ESTIMATION SYSTEM

CROSS-REFERENCE TO RELATED APPLICATIONS

The instant application is a division of U.S. application Ser. No. 11/022,265 filed on Dec. 24, 2004, which is a continuation-in-part of U.S. application Ser. No. 10/620,749 filed on Jul. 15, 2003, now U.S. Pat. No. 7,034,742, which claims the benefit of prior U.S. Provisional Application Ser. No. 60/396,211 filed on Jul. 15, 2002. U.S. application Ser. No. 11/022,265 also claims the benefit of prior U.S. Provisional Application Ser. No. 60/532,344 filed on Dec. 24, 2003. The above-identified applications are incorporated herein by reference in their entirety.

BRIEF DESCRIPTION OF THE DRAWINGS

In the accompanying drawings:

FIG. 1 illustrates a block diagram of hardware associated with a predictive collision sensing system;

FIG. 2 illustrates a coverage pattern of a radar beam used by the predictive collision sensing system;

FIG. 3 depicts a driving scenario for purposes of illustrating the operation of the predictive collision sensing system;

FIG. 6 illustrates a geometry used for determining curvature parameters of a roadway;

FIG. 7 illustrates the geometry of an arc;

FIGS. 8a-d illustrates an example of the estimation of target position, lateral velocity, and road curvature parameters for a straight roadway;

FIG. 16b illustrates a geometry of the steered wheel illustrated in FIG. 16a.;

FIG. 19 illustrates a block diagram of a road curvature estimation subsystem for estimating road curvature from host vehicle state estimates;

FIG. 20 illustrates a curvature filter associated with a first embodiment of a curvature estimator;

FIG. 21 illustrates a curvature filter associated with a fourth embodiment of a curvature estimator;

FIG. 26 illustrates a block diagram of a curvature estimation subsystem responsive to radar measurements of a target vehicle on the roadway; and FIG. 27 illustrates a block diagram of a predictive collision sensing system comprising a plurality of road curvature estimation subsystems and an associated road curvature fusion subsystem.

DESCRIPTION OF EMBODIMENT(S)

Figure 4:
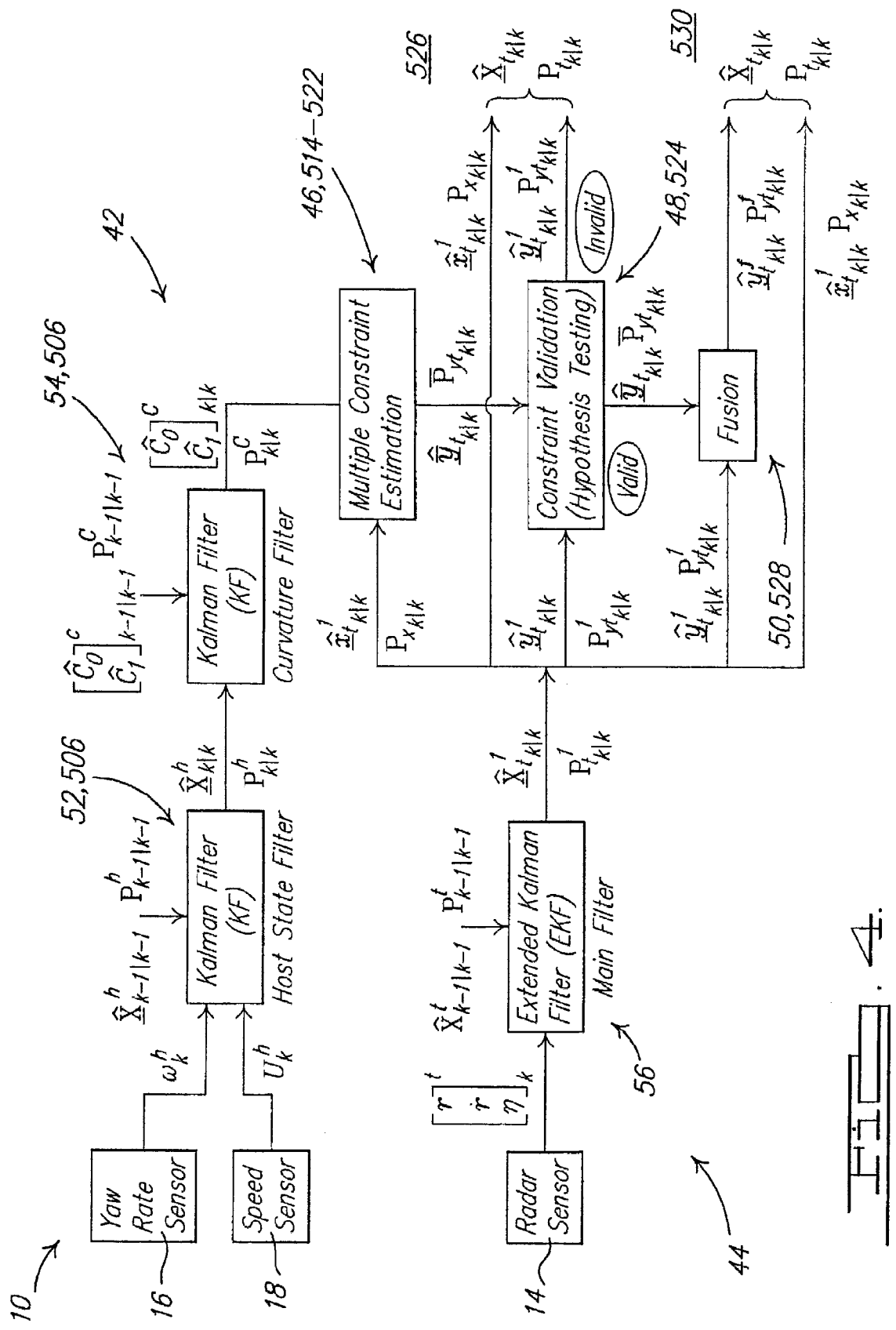
FIG. 4 illustrates a block diagram of the hardware and an associated signal processing algorithm of the predictive collision sensing system.

Referring to FIG. 1, a predictive collision sensing system 10 incorporated in a host vehicle 12, comprises a radar system 14 for sensing objects external to the host vehicle 12, and a set of sensors, including a yaw rate sensor 16, e.g. a gyroscopic sensor, and a speed sensor 18, for sensing motion of the host vehicle 12. The yaw rate sensor 16 and speed sensor 18 respectively provide measurements of the yaw rate and speed of the host vehicle 12. The radar system 14, e.g. a Doppler radar system, comprises an antenna 20 and a radar processor 22, wherein the radar processor 22 generates the RF signal which is transmitted by the antenna 20 and which is reflected by objects in view thereof. The radar processor 22 demodulates the associated reflected RF signal that is received by the antenna 20, and detects a signal that is responsive to one or more objects that are irradiated by the RF signal transmitted by the antenna 20. For example, the radar system 14 provides target range, range rate and azimuth angle measurements in host vehicle 12 fixed coordinates. Referring to FIG. 2, the antenna 20 is adapted to generate a radar beam 23 of RF energy that is, for example, either electronically or mechanically scanned across an azimuth range, e.g. +/−γ, e.g. +/−50 degrees, responsive to a beam control element 24, and which has a distance range, e.g. about 100 meters, from the host vehicle 12 that is sufficiently far to enable a target to be detected sufficiently far in advance of a prospective collision with the host vehicle 12 so as to enable a potentially mitigating action to be taken by the host vehicle 12 so as to either avoid the prospective collision or mitigate damage or injury as a result thereof. The radar processor 22, yaw rate sensor 16, and speed sensor 18 are operatively connected to a signal processor 26 that operates in accordance with an associated predictive collision sensing algorithm to determine whether or not a collision with an object, e.g. a target vehicle 36 (illustrated in FIG. 3), is likely, and if so, to also determine an action to be taken responsive thereto, for example, one or more of activating an associated warning system 28 or safety system 30 (e.g. frontal air bag system), or using a vehicle control system 32 (e.g. an associated braking or steering system) to take evasive action so as to either avoid the prospective collision or to reduce the consequences thereof.

Referring to FIG. 3, the host vehicle 12 is shown moving along a multiple lane roadway 34, either straight or curved, and there is also shown a target vehicle 36 moving in an opposite direction, towards the host vehicle 12. Generally, there can be any number of target vehicles 36 that can fit on the roadway 34, each moving in the same or opposite direction as the host vehicle 12. These target vehicles 36 can either be in the host lane 38 or in a neighboring lane 40 either adjacent to or separated from the host lane 38, but generally parallel thereto. For purposes of analysis, it is assumed that the host vehicle 12 moves along the center line 41 of its lane 38 steadily without in-lane wandering, and the road curvatures of all the parallel lanes 38, 40 are the same. Road curvature is assumed small such that the differences between the heading angles of the host vehicle 12 and any detectable target vehicles 36 are smaller than 15 degrees.

Referring to FIG. 4, the predictive collision sensing system 10 uses the measurements of speed $U^h$ and yaw rate $\omega^h$ of the host vehicle 12 from the speed sensor 18 and the yaw rate sensor 16 respectively therein; and the measurements of target range r, range rate $\dot{r}$ and azimuth angle $\eta$ for all target vehicles 36 from the radar system 14 mounted on the host vehicle 12; along with the corresponding error covariance matrices of all these measurements, to estimate each target's two dimensional position, velocity and acceleration $[x,\dot{x},\ddot{x},y,\dot{y},\ddot{y}]'$ in the host fixed coordinate system at every sampling instance preferably with an error as small as possible. The predictive collision sensing system 10 comprises 1) a road curvature estimation subsystem 42 for estimating the curvature of the roadway 34 using measurements from the host vehicle motion sensors, i.e. the yaw rate sensor 16 and speed sensor 18; 2) an unconstrained target state estimation subsystem 44 for estimating the state of a target illuminated by the radar beam 23 and detected by the radar processor 22; 3) a constrained target state estimation subsystem 46 for estimating the state of the constraint on the target, assuming that the target is constrained to be on the roadway 34, either in the host lane 38 or in a neighboring lane 40, for each possible lane 38, 40; 4) a target state decision subsystem 48 for determining whether the best estimate of the target state is either the unconstrained target state, or a target state constrained by one of the constraints; and 5) a target state fusion subsystem 50 for fusing the unconstrained target state estimate with the appropriate constraint identified by the target state decision subsystem 48 so as to generate a fused target state. The best estimate of target state—either the unconstrained target state or the fused target state—is then used by a decision or control subsystem for determining whether or not the host vehicle 12 is at risk of collision with the target, and if so, for determining and effecting what the best course of action is to mitigate the consequences thereof, e.g. by action of either the warning system 28, the safety system 30, or the vehicle control system 32, or some combination thereof. When possible, the use of the geometric structure of the roadway 34 as a constraint to the target kinematics provides for a more accurate estimate of the target state, which thereby improves the reliability of any actions taken responsive thereto.

Figure 5:
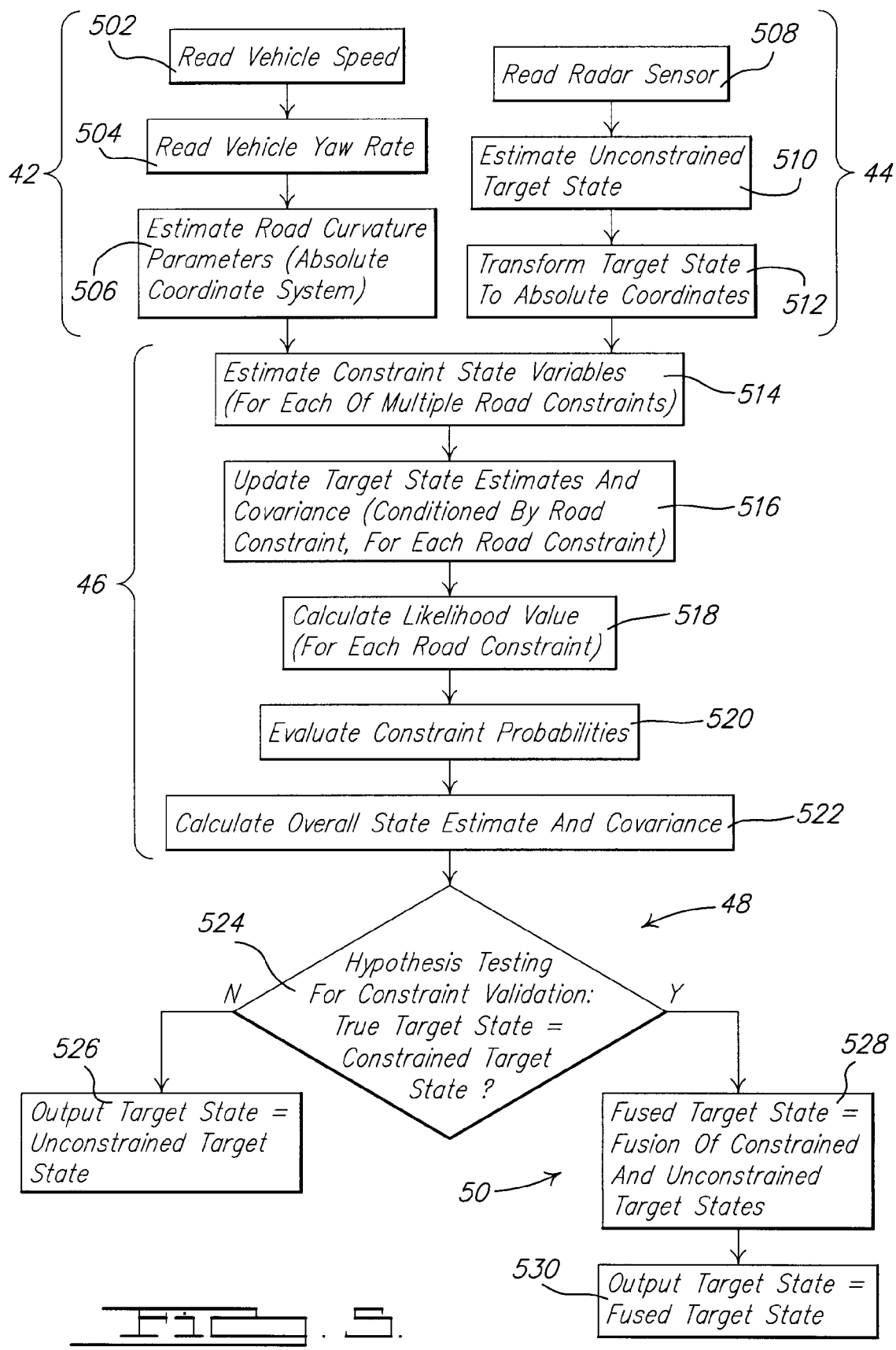
FIG. 5 illustrates a flow chart of an associated signal processing algorithm of the predictive collision sensing system.
Figure 8B:
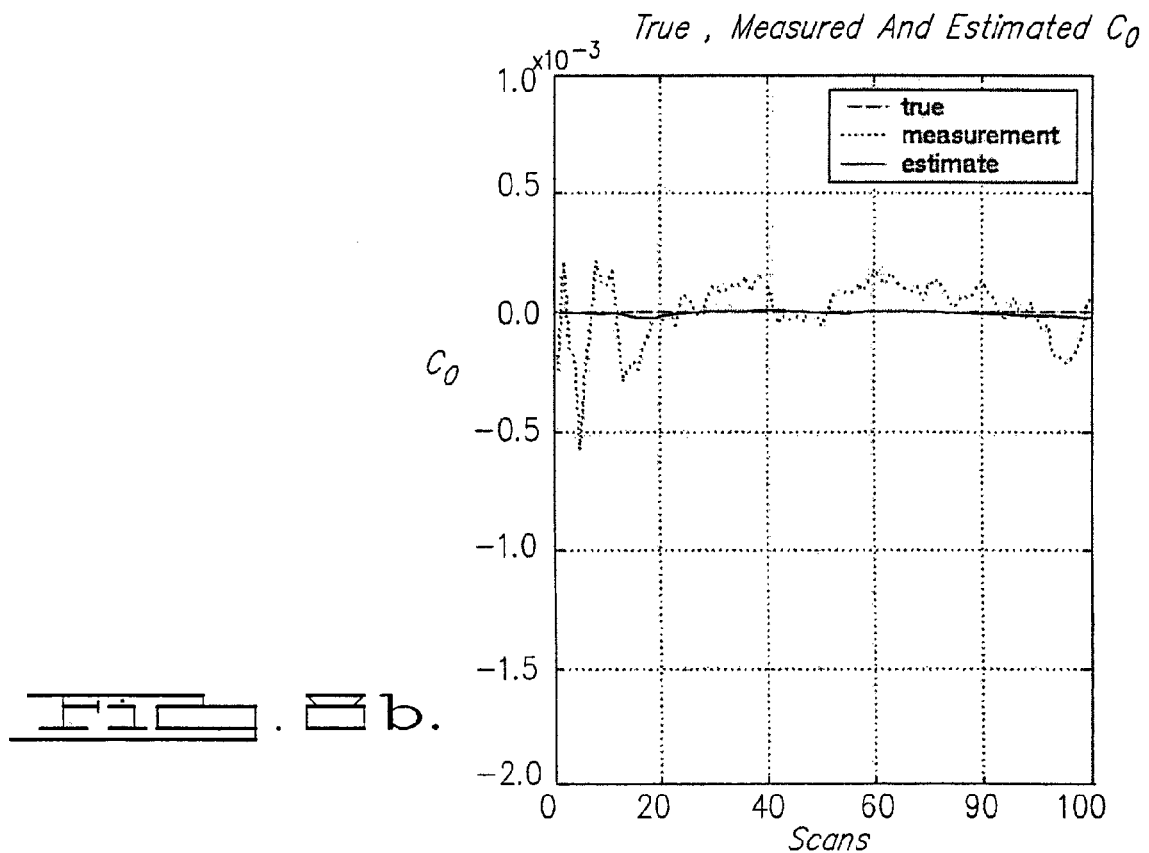
Figure 8C:
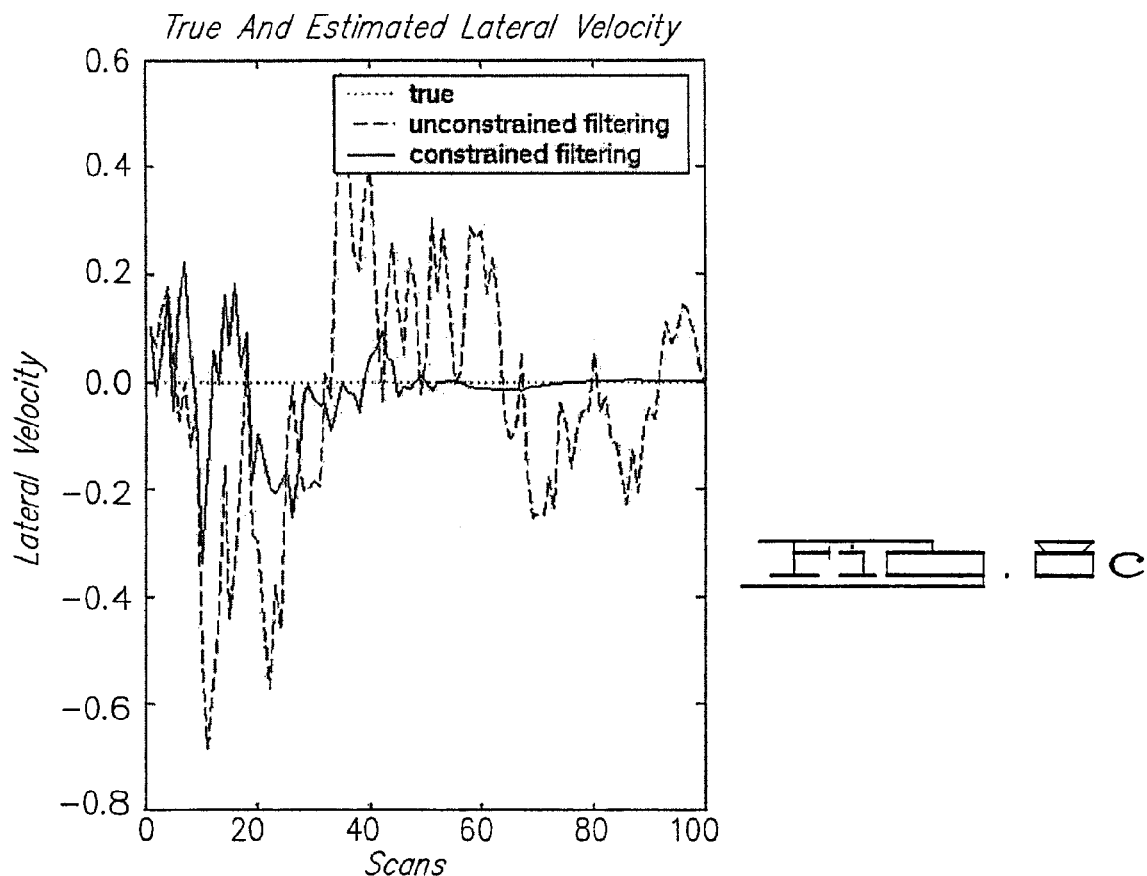
Figure 8D:
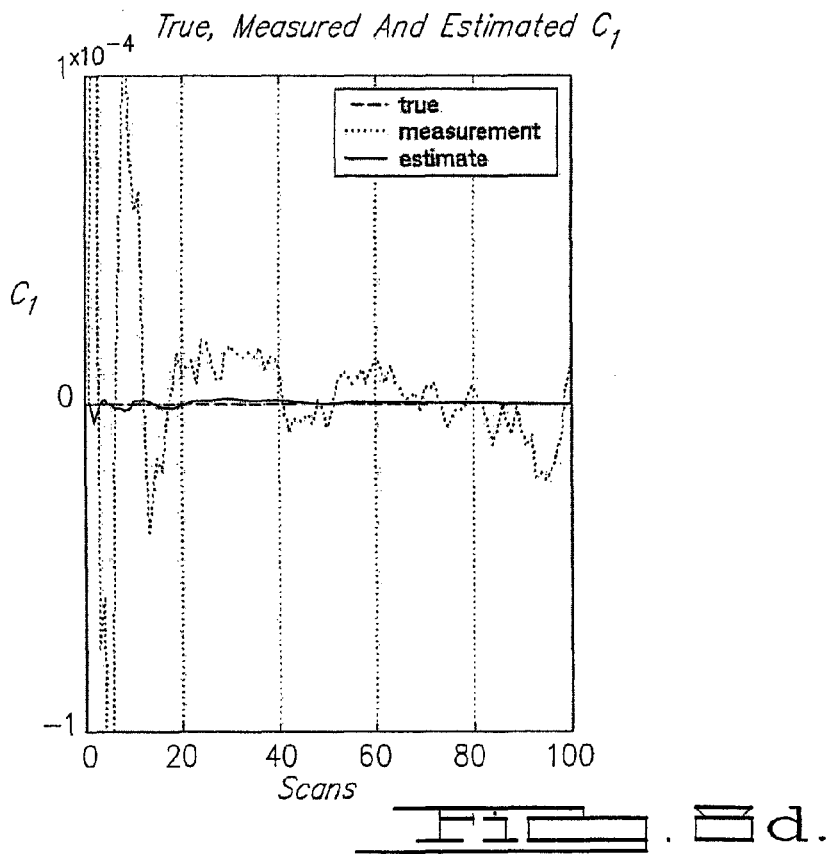

Referring also to FIG. 5, illustrating a method 500 of detecting the state, i.e. kinematic state variables, of a target in view of the host vehicle 12, the steps of which are, for example, carried out by the signal processor 26, in steps (502) and (504), the speed $U^h$ and yaw rate $\omega^h$ of the host vehicle 12 relative to the roadway 34 are respectively read from the speed sensor 18 and the yaw rate sensor 16 respectively. Then, in step (506), the curvature parameters and associated covariance thereof of the roadway 34 are estimated using first 52 and second 54 Kalman filters that respectively estimate the state (i.e. kinematic state variables of the host vehicle 12) and associated covariance thereof of the host vehicle 12, and then the curvature parameters and associated covariance thereof of the roadway 34, as described hereinbelow, wherein the curvature parameters and associated covariance thereof of the roadway 34 are then subsequently used by the constrained target state estimation subsystem 46 to generate associated constraints on the possible location of a prospective target vehicle 36.

A well-designed and constructed roadway 34 can be described by a set of parameters, including curvature, wherein the curvature of a segment of the roadway 34 is defined as:

$$C = \frac{1}{R} \tag{1}$$

where R is the radius of the segment. In general, for a piece of smooth roadway 34, the curvature variation can be described as a function of a distance l along the roadway 34 by a so-called clothoid model, i.e.:

$$C = C_0 + \frac{dC}{dl}l = C_0 + C_1 l \tag{2}$$

where $C_1 = 1/A^2$ and A is referred to as the clothoid parameter.

Referring to FIG. 6, the heading angle $\theta$ defining the heading direction is given by:

$$\theta = \theta_0 + \int_0^l C(\tau)d\tau. \tag{3}$$

Substituting equation (2) into equation (3) gives $$\Delta\theta = \theta - \theta_0 = C_0 l + C_1 l^2/2 \tag{4}$$

Referring to FIG. 6, the equation of the roadway 34, i.e. the road equation, in x-y coordinates is given by:

$$x = x_0 + \int_0^l \cos\theta(\tau)d\tau \tag{5}$$

and $$y = y_0 + \int_0^l \sin\theta(\tau)d\tau. \tag{6}$$

Assuming the heading angle $\theta$ to be within 15 degrees, i.e. $|\theta| < 15°$, equations (5) and (6) can be approximated by:

$$\Delta x = x - x_0 \approx l \tag{7}$$

$$\Delta y = y - y_0 \approx C_0 l^2/2 + C_1 l^3/6 \approx C_0 \frac{\Delta x^2}{2} + C_1 \frac{\Delta x^3}{6} \tag{8}$$

Accordingly, the roadway 34 is modeled by an incremental road equation in terms of curvature coefficients (or parameters): $C_0$ and $C_1$. This incremental road equation describes a broad range of road shapes as follows: 1) Straight roadway 34: $C_0 = 0$ and $C_1 = 0$; 2) circular roadway 34: $C_1 = 0$; and 3) a general roadway 34 with an arbitrary shape for which the change in heading angle $\theta$ is less than 15 degrees: $C_0 > 0$.

The road curvature parameters $C_0$ and $C_1$ are estimated using data from motion sensors (yaw rate sensor 16 and speed sensor 18) in the host vehicle 12, based upon the assumption that the host vehicle 12 moves along the center line 41 of the roadway 34 or associated host lane 38.

The road curvature parameters $C_0$ and $C_1$ can be calculated from data of $\omega$, $\dot{\omega}$, U, $\dot{U}$ responsive to measurements of yaw rate $\omega^h$ and speed $U^h$ of the host vehicle 12 from the available host vehicle 12 motion sensors. However, generally the measurements of yaw rate $\omega^h$ and speed $U^h$, from the yaw rate sensor 16 and speed sensor 18 respectively, are noisy. A host state filter implemented by a first Kalman filter 52 is beneficial to generate estimates of $\omega$, $\dot{\omega}$, U, $\dot{U}$ from the associated noisy measurements of yaw rate $\omega^h$ and speed $U^h$; after which a curvature filter implemented by a second Kalman filter 54 is used to generate smoothed estimates of the curvature parameters $C_0$ and $C_1$. The dynamics of the host vehicle 12 for the host state filter follows a predefined set of kinematic equations (constant velocity in this case) given by:

$$\underline{x}^h_{k+1} = F^h_k \cdot \underline{x}^h_k + \underline{w}^h_k, \, \underline{w}^h_k \sim N(0, Q^h_k) \quad (9)$$

$$\underline{z}^h_k = H^h_k \cdot \underline{x}^h_k + \underline{v}^h_k, \, \underline{v}^h_k \sim N(0, R^h_k) \quad (10)$$

where $$F^h_k = \begin{bmatrix} 1 & T & 0 & 0 \\ 0 & 1 & 0 & 0 \\ 0 & 0 & 1 & T \\ 0 & 0 & 0 & 1 \end{bmatrix}, \, H^h_k = \begin{bmatrix} 1 & 0 & 0 & 0 \\ 0 & 0 & 1 & 0 \end{bmatrix}, \quad (11)$$

$$\underline{x}^h_k = \begin{bmatrix} U \\ \dot{U} \\ \omega \\ \dot{\omega} \end{bmatrix}_k \text{ and } \underline{z}^h_k = \begin{bmatrix} U^h \\ \omega^h \end{bmatrix}_k$$

and where T is the sampling period, superscript $(\bullet)^h$ is used to indicate that the filter is the host filter, and $U^h$ and $\omega^h$ are host vehicle 12 speed and yaw rate measurements. The first Kalman filter 52 is implemented to estimate the host state $\hat{\underline{x}}^h_{k|k}$ and its error covariance $P^h_{k|k}$, as illustrated in FIG. 4.

The estimate of the host state from the first Kalman filter 52, i.e. the host state filter, is then used to generate a synthetic measurement that is input to the second Kalman filter 54, i.e. curvature coefficient (or parameter) filter, wherein the associated Kalman filters 52, 54 operate in accordance with the Kalman filtering process described more fully in the Appendix hereinbelow. The relationship between the road curvature parameters $C_0$, $C_1$ and the host state variables $\omega$, $\dot{\omega}$, U, $\dot{U}$ is derived as follows:

From equation (4), the radius R of road curvature is expressed generally as a function R(l) of the distance l along the roadway, as is illustrated in FIG. 7. Taking the time derivative on both sides of equation (4) yields:

$$\dot{\theta} = C_0 \cdot \dot{l} + C_1 \cdot l \cdot \dot{l} = (C_0 + C_1 \cdot l) \cdot \dot{l}. \quad (1)$$

Noting that $\dot{\theta} = \omega$, the yaw rate of the host vehicle 12, and that $\dot{l} = U$, the speed of the host vehicle 12, and substituting the clothoid model of equation (2) in equation (12), yields:

$$\omega = C \cdot U \quad (13)$$

or $$C = \frac{\omega}{U}. \quad (14)$$

Clothoid parameter $C_0$ is given as the value of curvature C at $l=0$, or $$C_0 = C|_{l=0} = \frac{\omega}{U}. \quad (15)$$

Taking the derivative on both sides of equation (14) yields $$\dot{C} = \frac{\dot{\omega}}{U} - \frac{\omega \cdot \dot{U}}{U^2}. \quad (16)$$

Using the definition of $C_1$, from equation (2), $C_1$ may be expressed in terms of the host state as follows:

$$C_1 = \frac{dC}{dl} = \frac{dC}{dt} \cdot \frac{dt}{dl} = \frac{\dot{C}}{U} = \frac{\dot{\omega}}{U^2} - \frac{\omega \cdot \dot{U}}{U^3}. \quad (17)$$

The system equations for the second Kalman filter 54, i.e. the curvature filter, that generates curvature estimates $\hat{C}_{0_{k|k}}$ and $\hat{C}_{1_{k|k}}$, are given by $$\underline{x}^C_{k+1} = F^C_k \cdot \underline{x}^C_k + \underline{w}^C_k, \, \underline{w}^C_k \sim N(0, Q^C_k) \quad (18)$$

$$\underline{z}^C_k = H^C \cdot \underline{x}^C_k + \underline{v}^C_k, \, \underline{v}^C_k \sim N(0, R^C_k) \quad (19)$$

where $$F^C_k = \begin{bmatrix} 1 & \Delta t \cdot \hat{U} + \hat{\dot{U}} \cdot \Delta t^2/2 \\ 0 & 1 \end{bmatrix}, \, H^C = \begin{bmatrix} 1 & 0 \\ 0 & 1 \end{bmatrix}, \, \underline{x}^C_k = \begin{bmatrix} C_0 \\ C_1 \end{bmatrix}_k, \quad (20)$$

$\Delta t$ is the update time period of the second Kalman filter 54, and the values of the elements of the measurement vector $\underline{z}^C_k$ are given by the corresponding values of the state variables—i.e. the clothoid parameters $C_0$ and $C_1$—of the curvature filter.

The measurement, $\underline{z}^C_k$, is transformed from the estimated state $[\hat{U}, \hat{\dot{U}}, \hat{\omega}, \hat{\dot{\omega}}]^T_k$ as follows:

$$\underline{z}^C_k = \begin{bmatrix} \dfrac{\hat{\omega}}{\hat{U}} \\ \dfrac{\hat{\dot{\omega}}}{\hat{U}^2} - \dfrac{\hat{\omega} \cdot \hat{\dot{U}}}{\hat{U}^3} \end{bmatrix}_{k|k} \quad (21)$$

and the associated covariance of the measurements is given by:

$$R^C_k = J^C_k P^h_{k|k} (J^C_k)^T \quad (22)$$

where $$J^C_k = \frac{\partial \begin{bmatrix} C_0 \\ C_1 \end{bmatrix}}{\partial x^h} \bigg|_{x^h = \hat{x}^h_{k|k}} = \quad (23)$$

$$\begin{bmatrix} -\dfrac{\hat{\omega}}{\hat{U}^2} & 0 & \dfrac{1}{\hat{U}} & 0 \\ -\dfrac{2 \cdot \hat{\omega}}{\hat{U}^3} + \dfrac{3 \cdot \hat{\omega} \cdot \hat{\dot{U}}}{\hat{U}^4} & -\dfrac{\hat{\omega}}{\hat{U}^3} & -\dfrac{\hat{\dot{U}}}{\hat{U}^3} & \dfrac{1}{\hat{U}^2} \end{bmatrix}_{k|k}.$$

It should be understood that other systems and methods for estimating the curvature parameters of the roadway 34 may be substituted in the road curvature estimation subsystem 42 for that described above. For example, the curvature parameters of the roadway may also be estimated from images of the roadway 34 by a vision system, either instead of or in conjunction with the above described system based upon measurements of speed $U^h$ and yaw rate $\omega^h$ from associated motion sensors. Furthermore, it should be understood that yaw rate can be either measured or determined in a variety of ways, or using a variety of means, for example, but not limited to, using a yaw gyro sensor, a steering angle sensor, a differential wheel speed sensor, or a GPS-based sensor; a combination thereof, or functions of measurements therefrom (e.g. a function of, inter alia, steering angle rate).

Referring again to FIG. 5, in step (508), the measurements of target range r, range rate ṙ, and azimuth angle η are read from the radar processor 22, and are used as inputs to an extended Kalman filter 56, i.e. the main filter, which, in step (510), generates estimates of the unconstrained target state—i.e. the kinematic state variables of the target—which estimates are relative values in the local coordinate system of the host vehicle 12 (i.e. the host-fixed coordinate system) which moves with therewith. In step (512), the unconstrained target state, i.e. the target velocity and acceleration, is transformed to absolute coordinates of the absolute coordinate system fixed on the host vehicle 12 at the current instant of time as illustrated in FIG. 3, so as to be consistent with the absolute coordinate system in which the road constraint equations are derived and for which the associated curvature parameters are assumed to be constant, when used in the associated constraint equations described hereinbelow in order to generate estimates of the constrained target state. The absolute coordinate system superimposes the moving coordinate system in space at the current instant of time, so that the transformation in step (512) is realized by adding velocity and acceleration related correction terms—accounting for the motion of the host vehicle 12—to the corresponding target estimates, in both x and y directions.

The result from the coordinate transformation in step (512) of the output from the extended Kalman filter 56 is then partitioned into the following parts, corresponding respectively to the x and y position of the target vehicle 36 relative to the host vehicle 12, wherein the superscript 1 refers to the unconstrained target state of the target vehicle 36:

$$\hat{X}^1_{t_{k|k}} = \begin{bmatrix} \hat{x}^1_t \\ \hat{y}^1_t \end{bmatrix}_{k|k} \text{ and } P^1_{t_{k|k}} = \begin{bmatrix} P^1_{x_t} & P^1_{xy_t} \\ P^1_{yx_t} & P^1_{y_t} \end{bmatrix}_{k|k}. \tag{24}$$

Referring again to FIG. 5, following steps (506) and (512), in steps (514) through (524) described more fully hereinbelow, various constraints on the possible trajectory of the target vehicle 36 are applied and tested to determine if the target vehicle 36 is likely traveling in accordance with one of the possible constraints. For example, the constraints are assumed to be from a set of lanes that includes the host lane 38 and possible neighboring lanes 40, and a target vehicle 36 that is likely traveling in accordance with one of the possible constraints would likely be traveling on either the host lane 38 or one of the possible neighboring lanes 40. In step (524), the hypothesis that the target vehicle 36 is traveling on either the host lane 38 or one of the possible neighboring lanes 40 is tested for each possible lane. If the hypothesis is not satisfied for one of the possible lanes, then, in step (526), the state of the target is assumed to be the unconstrained target state, which is then used for subsequent predictive crash sensing analysis and control responsive thereto. Otherwise, from step (524), in step (528), the target state is calculated by the target state fusion subsystem 50 as the fusion of the unconstrained target state with the associated state of the constraint that was identified in step (524) as being most likely.

Prior to discussing the process of steps (514) through (524) for determining whether the target is likely constrained by a constraint, and if so, what is the most likely constraint, the process of fusing the unconstrained target state with state of a constraint will first be described for the case of a target vehicle 36 moving in the same lane as the host vehicle 12. The constraints are applied in the y-direction and are derived from road equations where y-direction state variables are functions of x-direction state variables, consistent with the assumptions that the host vehicle 12 moves along the center line 41 of its lane 38 steadily without in-lane wandering and that the road curvatures of all the parallel lanes 38, 40 are the same, and given that the absolute coordinate system is fixed on the host vehicle 12 at the current instant of time. Assuming the target vehicle 36 is moving in the same lane 38 as the host vehicle 12, and using the road constraint equation with the estimated coefficients (or parameters), in step (514), the constraint state variables are then given in terms of the lateral kinematic variable as:

$$\hat{\bar{y}}_{t_{k|k}} = \begin{bmatrix} \bar{y} \\ \dot{\bar{y}} \\ \ddot{\bar{y}} \end{bmatrix}_{t_{k|k}} \tag{25}$$

$$= \begin{bmatrix} \hat{C}_0(\hat{x}^1)^2/2 + \hat{C}_1(\hat{x}^1)^3/6 \\ \hat{C}_0\hat{x}^1\dot{\hat{x}}^1 + \hat{C}_1(\hat{x}^1)^2\dot{\hat{x}}^1/2 \\ \hat{C}_0(\dot{\hat{x}}^1)^2 + \hat{C}_0\hat{x}^1\ddot{\hat{x}}^1 + \hat{C}_1\hat{x}^1(\dot{\hat{x}}^1)^2 + \hat{C}_1(\hat{x}^1)^2\ddot{\hat{x}}^1/2 \end{bmatrix}$$

and $$\bar{P}_{yt_{k|k}} = A^1_k P_{xt_{k|k}}(A^1_k)^T + A^2_k P^C_{k|k}(A^2_k)^T \tag{26}$$

where

-continued $$A_k^1 = \begin{bmatrix} \hat{C}_0\hat{x}^1 + \hat{C}_1(\hat{x}^1)^2/2 & 0 & 0 \\ \hat{C}_0\dot{\hat{x}} + \hat{C}_1\hat{x}^1\dot{\hat{x}}^1 & \hat{C}_0\hat{x}^1 + \hat{C}_1(\hat{x}^1)^2/2 & 0 \\ \hat{C}_0\ddot{\hat{x}} + \hat{C}_1(\dot{\hat{x}}^1)^2 + \hat{C}_1\hat{x}^1\ddot{\hat{x}}^1 & 2\hat{C}_0\dot{\hat{x}} + 2\hat{C}_1\hat{x}^1\dot{\hat{x}} & \hat{C}_0\hat{x}^1 + \hat{C}_1(\hat{x}^1)^2/2 \end{bmatrix} \quad (27)$$

and $$A_k^2 = \begin{bmatrix} (\hat{x}^1)^2/2 & (\hat{x}^1)^3/6 \\ \hat{x}^1 \cdot \dot{\hat{x}}^1 & (\hat{x}^1)^2 \cdot \dot{\hat{x}}^1/2 \\ (\dot{\hat{x}}^1)^2 + \hat{x}^1 \cdot \ddot{\hat{x}}^1 & \hat{x}^1 \cdot (\dot{\hat{x}}^1)^2 + (\hat{x}^1)^2 \cdot \ddot{\hat{x}}^1/2 \end{bmatrix}. \quad (28)$$

In step (528), the two y-coordinate estimates, one from the main filter and the other from the road constraint, are then fused as follows:

$$P_{yt_{k|k}}^f = [(\overline{P}_{yt_{k|k}})^{-1} + (P_{yt_{k|k}}^1)^{-1}]^{-1} \quad (29)$$

$$\hat{y}_{t_{k|k}}^f = P_{yt_{k|k}}^f [(\overline{P}_{yt_{k|k}})^{-1}\overline{y}_{yt_{k|k}} + (P_{yt_{k|k}}^1)^{-1}\hat{y}_{t_{k|k}}] \quad (30)$$

Finally, the composed estimate of the target state is $$\hat{X}_{t_{k|k}} = \begin{bmatrix} \hat{x}_{t_{k|k}}^1 \\ \hat{y}_{t_{k|k}}^f \end{bmatrix} \quad (31)$$

and $$P_{t_{k|k}} = \begin{bmatrix} P_{x_t} & \overline{P}_{xy_t} \\ \overline{P}_{xy_t}' & P_{y_t}^f \end{bmatrix}_{k|k}. \quad (32)$$

where $$\overline{P}_{xy_t} = P_{x_t}(A_k^1)' \quad (33)$$

In step (530), this composed estimate would then be output as the estimate of the target state if the target vehicle 36 were to be determined from steps (514) through (524) to be traveling in the host lane 38.

Returning to the process of steps (514) through (524) for determining whether the target is likely constrained by a constraint, and if so, what is the most likely constraint; according to the assumption that targets follow the same roadway 34, if the target vehicle 36 were known to travel in a particular lane, it would desirable to use estimated road parameters for that lane as a constraint in the main filter of estimating target kinematics. However, the knowledge of which lane the target vehicle 36 is current in is generally not available, especially when the target is moving on a curved roadway 34. Since the road equation (8) is only for the host lane 38 in the host-centered coordinate system, constrained filtering would require knowing which lane the target is in, and different constraint equations would be needed for different lanes. Ignoring the difference of road curvature parameters among these parallel lanes, i.e. assuming the curvature of each lane to be the same, the road equation for an arbitrary lane can be written as:

$$y = mB + \hat{C}_0 \frac{x^2}{2} + \hat{C}_1 \frac{x^3}{6}, m = 0, \pm 1, \pm 2, \ldots \quad (34)$$

where B is the width of the lanes and m represents the lane to be described (m=0 corresponds the host lane 38, m=1 corresponds the right neighboring lane 40, m=−1 corresponds the left neighboring lane 40, and so on). Without the prior knowledge of the target lane position, each of the multiple constraints forming a multiple constraint system (analogous to the so-called multiple model system) is tested to determine which, if any, of the constraints are active. A multiple constraint (MC) system is subjected to one of a finite number $N^C$ of constraints. Only one constraint can be in effect at any given time. Such systems are referred to as hybrid—they have both continuous (noise) state variables as well as discrete number of constraints.

The following definitions and modeling assumptions are made to facilitate the solution of this problem:

Constraint equations:

$$\underline{y}_k = \underline{f}_k(\underline{x}_k) \quad (35)$$

where $\underline{f}_{t_k}$ denotes the constraint at time $t_k$ in effect during the sampling period ending at $t_k$.

Constraint: among the possible $N^C$ constraints $$\underline{f}_{t_k} \in \{\underline{f}^j\}_{j=1}^{N^C} \quad (36)$$

$\overline{\underline{y}}_{t_{k|k}}^j$: state estimate at time $t_k$ using constraint $\underline{f}_{t_k}^j$ $\overline{P}_{yt_{k|k}}^j, \overline{P}_{xyt_{k|k}}^j$: covariance matrix at time $t_k$ under constraint $\underline{f}_{t_k}^j$ $\mu_{t_{k-1}}^j$: probability that the target is following constraint j at time $t_{k-1}$ Constraint jump process: is a Markov chain with known transition probabilities $$P\{\underline{f}_k = \underline{f}^j | \underline{f}_{k-1} = \underline{f}^i\} = p_{ij}. \quad (37)$$

To implement the Markov model—for systems with more than one possible constraint state—it is assumed that at each scan time there is a probability $p_{ij}$ that the target will make the transition from constraint state i to state j. These probabilities are assumed to be known a priori and can be expressed in the probability transition matrix as shown below.

$$P_{trans} = \begin{matrix} & \text{New State} \\ & 1 \quad 2 \quad 3 \end{matrix} \atop \text{Prior State} \begin{matrix} 1 \\ 2 \\ 3 \end{matrix} \begin{bmatrix} p_{11} & p_{12} & p_{13} \\ p_{21} & p_{22} & p_{23} \\ p_{31} & p_{32} & p_{33} \end{bmatrix} \quad (38)$$

The prior probability that $\underline{f}^j$ is correct ($\underline{f}^j$ is in effect) is $$P(\underline{f}^j | Z^0) = \mu_{t_0}^j, j=1, \ldots, N^C \quad (39)$$

where $Z^O$ is the prior information and $$\sum_{j=1}^{N^C} \mu_{t_0}^j = 1 \tag{40}$$

since the correct constraint is among the assumed $N^C$ possible constraints.

The constrained target state estimation subsystem 46 provides for determining whether the target state corresponds to a possible constrained state, and if so, then provides for determining the most likely constrained state.

A multiple constraint (MC) estimation algorithm mixes and updates $N^C$ constraint-conditioned state estimates using the unconstrained state estimate $\hat{\underline{y}}_{t_{k|k}}^1$ as a measurement, along with the calculation of the likelihood function and probability associated with each constraint. In one embodiment of the multiple constraint (MC) estimation algorithm, the constrained state estimate output is a composite combination of all of the constraint-conditioned state estimates. If this constrained state estimate is valid, i.e. if the constrained state estimate corresponds to—e.g. matches—the unconstrained state estimate, then the target state is given by fusing the constrained and unconstrained state estimates; otherwise the target state is given by the unconstrained state estimate. This embodiment of the multiple constraint (MC) estimation algorithm comprises the following steps:

1. Estimation of state variables from multiple constraints: In step (514), using the multiple lane road equation (34) to replace the first row in equation (25), the multiple constraint state estimates are given by:

$$\hat{\underline{y}}_{t_{k|k}}^{0j} = \begin{bmatrix} \bar{y} \\ \dot{\bar{y}} \\ \ddot{\bar{y}} \end{bmatrix}_{t_{k|k}}$$

$$= \begin{bmatrix} B_j + \hat{C}_0 \cdot (\hat{x}^1)^2 / 2 + \hat{C}_1 \cdot (\hat{x}^1)^3 / 6 \\ \hat{C}_0 \cdot \hat{x}^1 \cdot \dot{\hat{x}}^1 + \hat{C}_1 \cdot (\hat{x}^1)^2 \cdot \dot{\hat{x}}^1 / 2 \\ \hat{C}_0 \cdot (\dot{\hat{x}}^1)^2 + \hat{C}_0 \cdot \hat{x}^1 \cdot \ddot{\hat{x}}^1 + \hat{C}_1 \cdot \hat{x}^1 \cdot (\dot{\hat{x}}^1)^2 + \hat{C}_1 \cdot (\hat{x}^1)^2 \cdot \ddot{\hat{x}}^1 / 2 \end{bmatrix} \tag{41}$$

where $$B_j = 0, \pm B, \ldots, \pm \frac{N^C - 1}{2} B, \tag{50}$$

and B is the width of a lane. Stated in another way, the constraint state estimates corresponds to—e.g. matches—the y locations of the centerlines of each possible lane in which the target vehicle 36 could be located.

The associated covariance is given by:

$$\overline{P}_{yt_{k|k}}^{0j} = A_k^1 \cdot P_{xt_{k|k}} \cdot (A_k^1)^T + A_k^2 \cdot P_{k|k}^C \cdot (A_k^2)^T \tag{42}$$

where $A_k^1$ and $A_k^2$ are given by equation (27) and equation (28), $P_{xt_{k|k}}$ is from equation (24) and $P_{k|k}^C$ is from the curvature filter.

2. Constraint-conditioned updating: In step (516), the state estimates and covariance conditioned on a constraint being in effect are updated, as well as the constraint likelihood function, for each of the constraints $j=1, \ldots N^C$. The updated state estimate and covariances corresponding to constraint j are obtained using measurement $\hat{\underline{y}}_{t_{k|k}}^1$, as follows:

$$\overline{\underline{y}}_{t_{k|k}}^j = \overline{\underline{y}}_{t_{k|k}}^{0j} + \overline{P}_{yt_{k|k}}^{0j} (P_{yt_{k|k}}^{0j} + P_{yt_{k|k}}^1)^{-1} (\hat{\underline{y}}_{t_{k|k}}^1 - \overline{\underline{y}}_{t_{k|k}}^{0j}) \tag{43}$$

$$\overline{P}_{yt_{k|k}}^j = \overline{P}_{yt_{k|k}}^{0j} - \overline{P}_{yt_{k|k}}^{0j} (\overline{P}_{yt_{k|k}}^{0j} P_{yt_{k|k}}^1)^{-1} P_{yt_{k|k}}^{0j}. \tag{44}$$

$$\overline{P}_{xyt_{k|k}}^j = \overline{P}_{xyt_{k|k}}^{0j} - \overline{P}_{yt_{k|k}}^{0j} (\overline{P}_{yt_{k|k}}^{0j} + P_{yt_{k|k}}^1)^{-1} \overline{P}_{xyt_{k|k}}^{0j} \tag{45}$$

3. Likelihood calculation: In step (518), the likelihood function corresponding to constraint j is evaluated at the value $\underline{y}_{t_{k|k}}^1$ of the unconstrained target state estimate, assuming a Gaussian distribution of the measurement around the constraint-conditioned state estimate for each of the constraints $j=1, \ldots N^C$, as follows:

$$\Lambda_{t_k}^j = N(\underline{y}_{t_{k|k}}^1; \overline{\underline{y}}_{t_{k|k}}^{0j}, \overline{P}_{yt_{k|k}}^{0j} + P_{yt_{k|k}}^1) \tag{46}$$

wherein the Gaussian distribution $N(\,;\,,\,)$ has a mean value of $\overline{\underline{y}}_{t_{k|k}}^{0j}$ and an associated covariance of $\overline{P}_{yt_{k|k}}^{0j} + P_{yt_{k|k}}^1$.

4. Constraint Probability evaluations: In step (520), the updated constraint probabilities are calculated for each of the constraints $j=1, \ldots N^C$, as follows:

$$\mu_{t_k}^j = \frac{1}{a} \Lambda_{t_k}^j \bar{a}_j \tag{47}$$

where $\bar{a}_j$, the probability after transition that constraints is in effect, is given by $$\bar{a}_j = \sum_{i=1}^{N^C} p_{ij} \cdot \mu_{t_{k-1}}^i \tag{48}$$

and the normalizing constant is $$a = \sum_{j=1}^{N^C} \Lambda_{t_k}^j \bar{a}_j. \tag{49}$$

5. Overall state estimate and covariance: In step (522), the combination of the latest constraint-conditioned state estimates and covariances is given by:

$$\hat{\underline{y}}_{t_{k|k}} = \sum_{j=1}^{N^C} \mu_{t_k}^j \cdot \hat{\underline{y}}_{t_{k|k}}^j \tag{50}$$

$$\overline{P}_{yt_{k|k}} = \sum_{j=1}^{N^C} \mu_{t_k}^j \cdot \left[ \overline{P}_{yt_{k|k}}^j + \left( \hat{\underline{y}}_{t_{k|k}}^j - \hat{\underline{y}}_{t_{k|k}} \right) \cdot \left( \hat{\underline{y}}_{t_{k|k}}^j - \hat{\underline{y}}_{t_{k|k}} \right)' \right]. \tag{51}$$

$$\overline{P}_{xyt_{k|k}} = \sum_{j=1}^{N^C} \mu_{t_k}^j \cdot \overline{P}_{xyt_{k|k}}^j \tag{52}$$

The output of the estimator from step (522) in the above algorithm is then used as the constrained estimates in the fusion process described by equations (29) and (30), and the result of equation (52), instead of the result of equation (33), is used in equation (32).

When the target vehicle 36 is not following the roadway 34 or is changing lanes, imposing the road constraint on target kinematic state variables will result in incorrect estimates that would be worse than using the associated unconstrained estimates. However, noise related estimation errors might cause a correct road constraint to appear invalid. Accordingly, it is beneficial to incorporate a means that can keep the constraints in effect when they are valid, e.g. when the target vehicle 36 follows a particular lane; and lift them off promptly when they are invalid, e.g. when the target vehicle 36 departs from its lane. The unconstrained target state estimate plays a useful role in road constraint validation, since it provides independent target state estimates.

One approach is to test the hypothesis that the unconstrained target state estimate satisfies the road constraint equation, or equivalently, that the constrained estimate and the unconstrained estimate each correspond to the same target. The optimal test would require using all available target state estimates in history through time $t_k$ and is generally not practical. A practical approach is the sequential hypothesis testing in which the test is carried out based on the most recent state estimates only. In accordance with the notation used hereinabove, the difference between the constrained and unconstrained target state estimates (y direction only) is denoted:

$$\hat{\delta}_{t_k} = \hat{y}_{t_k|k}^1 - \bar{\hat{y}}_{t_k|k} \tag{53}$$

as the estimate of $$\underline{\delta}_{t_k} = \underline{y}_{t_k}^1 - \underline{\bar{y}}_{t_k} \tag{54}$$

where $\underline{y}_{t_k}^1$ is the true target state and $\underline{\bar{y}}_{t_k}$ is the true state of a target moving along the roadway 34 (or a lane). In step (524), the "same target" hypothesis is tested, i.e.

$$H_0: \underline{\delta}_{t_k} = 0 \tag{55}$$

vs.

$$H_1: \underline{\delta}_{t_k} \neq 0 \tag{56}$$

The main filter error $$\tilde{y}_{t_k}^1 = \underline{y}_{t_k}^1 - \hat{y}_{t_k|k}^1 \tag{57}$$

is assumed independent of the error $$\tilde{\bar{y}}_{t_k} = \underline{\bar{y}}_{t_k} - \bar{\hat{y}}_{t_k|k} \tag{58}$$

which is from the constraints. The covariance of the difference $\hat{\delta}_{t_k}$ is, under hypothesis $H_0$, given by:

$$P_{t_k}^{\delta} = E(\hat{\delta}_{t_k} \hat{\delta}_{t_k}') = E\left[\left(\tilde{y}_{t_k}^1 - \tilde{\bar{y}}_{t_k}\right)\left(\tilde{y}_{t_k}^1 - \tilde{\bar{y}}_{t_k}\right)'\right] \tag{59}$$
$$= P_{y t_k|k}^1 + \bar{P}_{y t_k|k}$$

Assuming that the estimation errors are Gaussian, the test of $H_0$ vs. $H_1$ is as follows:

Accept $H_0$ if $\rho_{t_k} = \hat{\underline{\delta}}_{t_k}'(P_{t_k}^{\delta})^{-1}\hat{\underline{\delta}}_{t_k} \leq \gamma \tag{60}$ The threshold is chosen such that $$P(\rho_{t_k} > \gamma | H_0) = \alpha \tag{61}$$

where $\alpha$ is a predefined error tolerance value. Note that based on the above Gaussian error assumption, $\rho_{t_k}$ has a chi-square distribution with $n_y$ degrees of freedom. The choice of this threshold is a significant design factor and should be based on specific application need. In road vehicle collision prediction, a target in the host lane 38 is regarded to be on a collision course and is considered more dangerous than a target in one of the neighboring lanes 40. Thus it is desirable to have a high threshold (a low error tolerance value) for a target in host lane 38 since constrained filtering can provide accurate target state estimates while a "changing lane" maneuver of such a target will not pose a threat to the host vehicle 12. On the other hand, targets in neighboring lanes 40 are usually regarded as passing-by vehicles. Though constrained filtering may further reduce false alarm rate, a "changing lane" maneuver of such a target (into the host lane 38) would pose a real threat to the host vehicle 12. Thus it is desirable to have a low threshold (a high error tolerance value) for a target in a neighboring lane if false alarm rate is already low enough.

Based on the above analysis, the hypothesis testing scheme efficiently uses different threshold values for targets in different lanes, with the multiple constraint filtering algorithm providing the knowledge of which lane the target is most likely in currently. Assuming that there are $N^C$ possible lanes on the roadway 34, and each lane is described by a constraint equation, the constraint equation with the highest probability $\mu_{t_k}^j$ for a target corresponds to the lane that this target in most likely in at time $t_k$ (the current time). Denoting this most likely lane as $l_t$, then $$\mu_{t_k}^{l_t} = \max_j \{\mu_{t_k}^j, j = 1, \ldots, r\}. \tag{62}$$

The difference between the unconstrained state estimates and lane $l_t$ constrained state estimates (y direction only), denoted as:

$$\hat{\underline{\delta}}_{t_k}^{l_t} = \hat{y}_{t_k|k}^1 - \bar{\hat{y}}_{t_k|k}^{l_t} \tag{63}$$

is the estimate of $$\underline{\delta}_{t_k}^{l_t} = \underline{y}_{t_k}^1 - \underline{\bar{y}}_{t_k}^{l_t} \tag{64}$$

where $\underline{y}_{t_k}^1$ is the true target state and $\underline{\bar{y}}_{t_k}^{l_t}$ is the true state of a target moving along lane $l_t$. The test for the "same target" hypothesis is then given by:

$$H_0: \underline{\delta}_{t_k}^{l_t} = 0 \tag{65}$$

vs.

$$H_1: \underline{\delta}_{t_k}^{l_t} \neq 0 \tag{66}$$

The constrained estimation error is given by:

$$\tilde{\bar{y}}_{t_k}^{l_t} = \underline{\bar{y}}_{t_k}^{l_t} - \bar{\hat{y}}_{t_k|k}^{l_t} \tag{67}$$

Assuming that the estimation errors are independent and Gaussian, the test of $H_0$ vs. $H_1$ becomes:

Accept $H_0$ if $\rho_{t_k}^{l_t} = (\hat{\underline{\delta}}_{t_k}^{l_t})'(P_{t_k}^{\delta l})^{-1}\hat{\underline{\delta}}_{t_k}^{l_t} \leq \gamma_{l_t} \tag{68}$ where $$P_{t_k}^{\delta l} = E\left[\left(\hat{\delta}_{t_k}^{l_t} - \hat{\hat{\delta}}_{t_k}^{l_t}\right)\left(\hat{\delta}_{t_k}^{l_t} - \hat{\hat{\delta}}_{t_k}^{l_t}\right)'\right] = E\left[\left(\tilde{y}_{t_k}^1 - \tilde{\bar{y}}_{t_k}^{l_t}\right)\left(\tilde{y}_{t_k}^1 - \tilde{\bar{y}}_{t_k}^{l_t}\right)'\right] \tag{69}$$
$$= P_{y t_k|k}^1 + \bar{P}_{y t_k|k}^{l_t}$$

and the threshold is such that $$P(\rho_{t_k}^{l_t} < \gamma_{l_t} | H_0, l_t) = \alpha_{l_t} \tag{70}$$

where $$\gamma_{l_t} \in \{\gamma_j\}_{j=1}^r \text{ and } \alpha_{l_t} \in \{\alpha_j\}_{j=1}^r \tag{71}$$

Such a lane adaptive hypothesis testing scheme provides for a prompt switch of the target state estimation output to the unconstrained estimate when the target vehicle 36 leaves its current lane, while the estimation accuracy of a target in host lane 38 is substantially improved by constrained filtering.

In another embodiment of the multiple constraint (MC) estimation algorithm, the constrained state estimate used for the hypothesis testing is the most likely of the separate constrained target state estimates (i.e. in accordance with a "winner take all" strategy), rather than a composite combination of all of the constrained target state estimates. If this most likely constrained state estimate is valid, i.e. if the most likely constrained state estimate corresponds to—e.g. matches—the unconstrained state estimate, then the target state is given by fusing the most likely constrained state estimate and the unconstrained state estimate; otherwise the target state is given by the unconstrained state estimate.

In yet another embodiment of the multiple constraint (MC) estimation algorithm, hypothesis tests are made for each of the constrained state estimates. If none of the hypotheses are accepted, then the target state is given by the unconstrained state estimate. If one of the hypotheses is accepted, then the target state is given by fusing the corresponding constrained state estimate and the unconstrained state estimate. If more than one hypotheses are accepted, then the most likely constrained state may be identified by voting results from a plurality of approaches, or by repeating the hypothesis tests with different associated thresholds.

Generally, the number of constraints (i.e. the number of roadway lanes) can vary with respect to time, as can associated parameters therewith, for example, the width of the lanes of the roadway, so as to accommodate changes in the environment of the host vehicle 12. For example, the host vehicle 12 in one trip could travel on a one-lane road, a two-lane road with opposing traffic, a three-lane road with a center turn lane, a four line road two lanes of opposing traffic, or on a multi-lane divided freeway.

Road vehicle tracking simulations using constrained and unconstrained filtering were carried out for four scenarios. In all scenarios, the host vehicle 12 was moving at 15.5 m/s and a target vehicle 36 is approaching on the same roadway 34 at a speed of 15.5 m/s. The initial position of the target was 125 meters away from the host in the x direction, and the lane width for all lanes was assumed to be 3.6 meters. The measurement variance of the vehicle speed sensor was 0.02 m/s and the variance of the gyroscope yaw rate measurement was 0.0063 rad/s. The variances of radar range, range rate and azimuth angle measurements were 0.5 m, 1 m/s, and 1.5° respectively. Simulation results were then generated from 100 Monte-Carlo runs of the associated tracking filters.

Figure 9A:
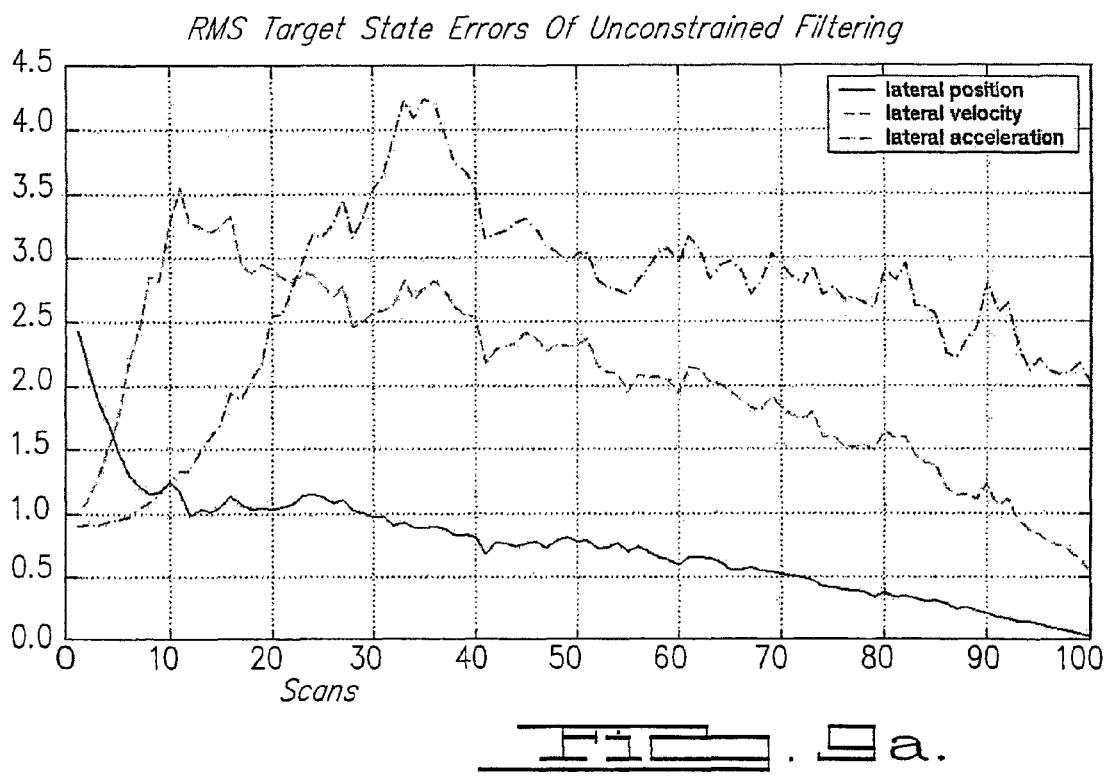
FIGS. 9a-b illustrate an example of the target state RMS errors from unconstrained and constrained filtering on the straight roadway, corresponding to FIGS. 8a-d.
Figure 9B:
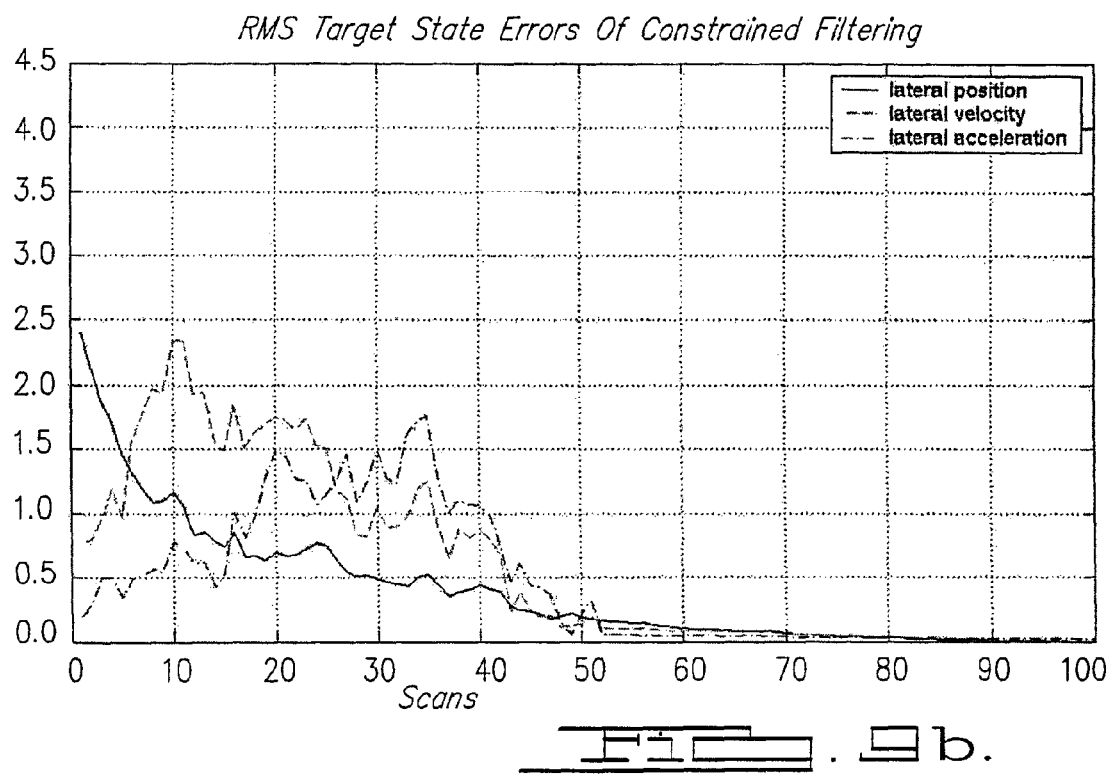
Figure 10A:
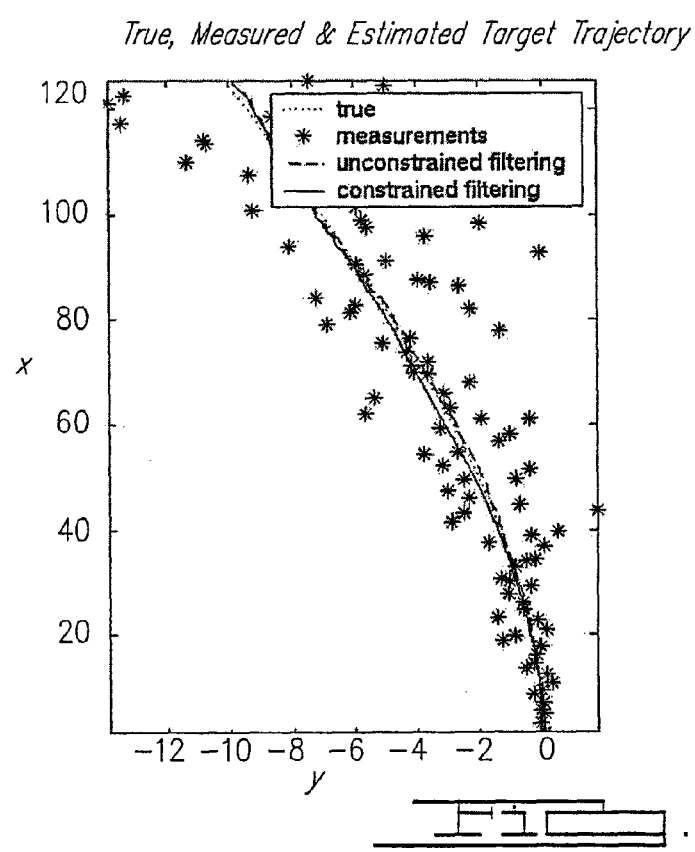
FIGS. 10a-d illustrate an example of the estimation of target position, lateral velocity, and road curvature parameters for a curved roadway.
Figure 10B:
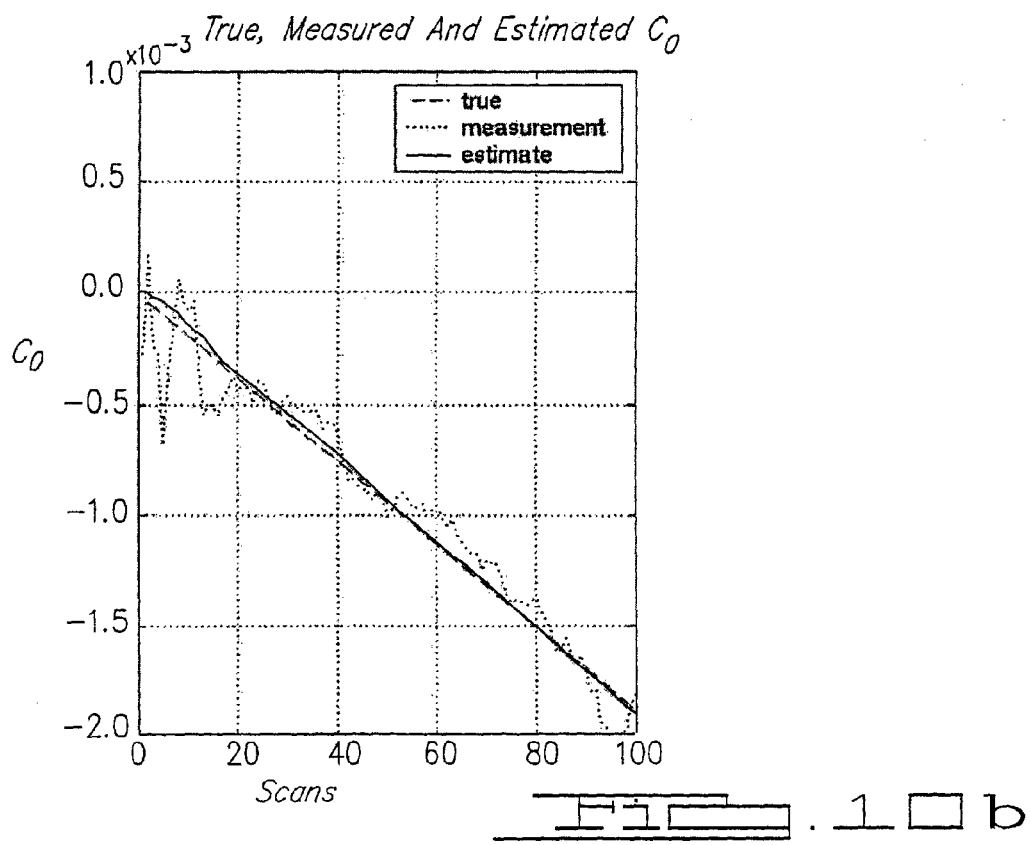
Figure 10C:
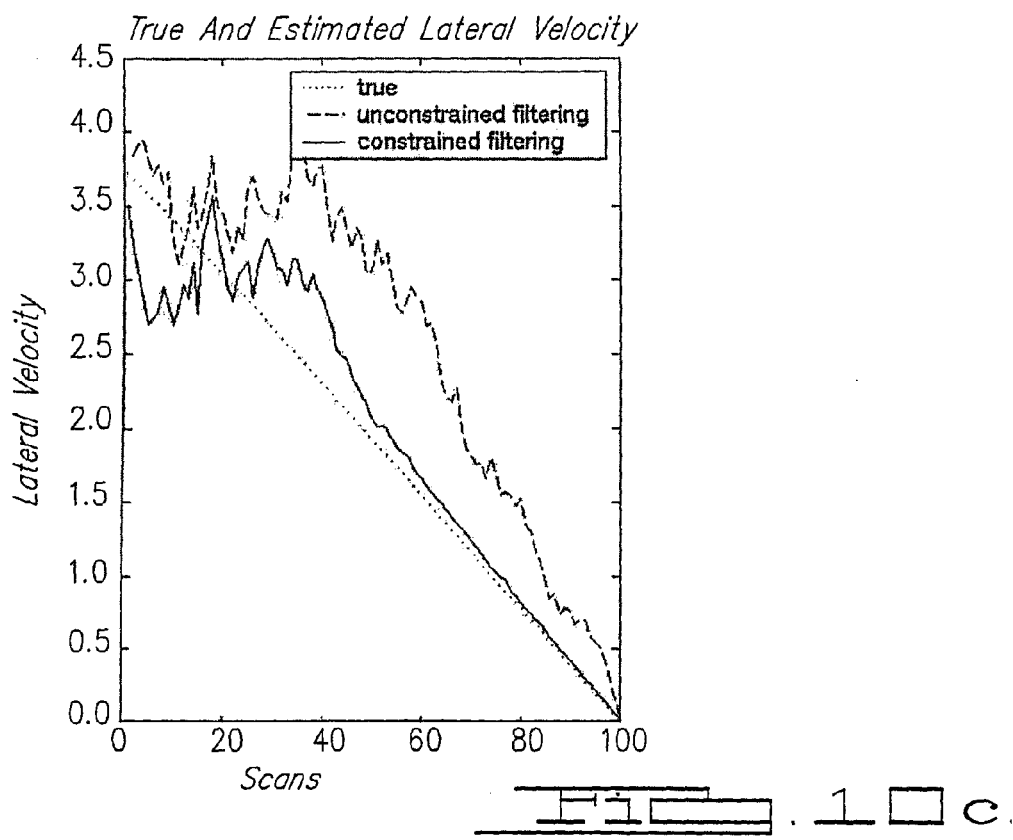
Figure 10D:
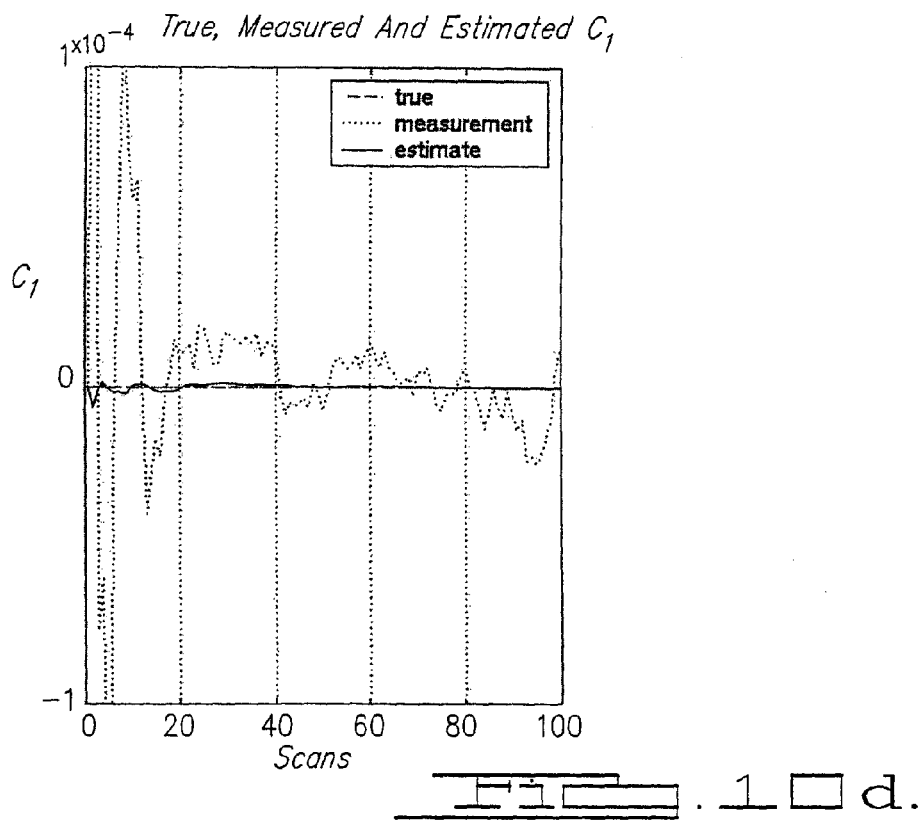

In the first scenario, the host vehicle 12 and the target vehicle 36 were moving on a straight roadway 34 ($C_0=0$ and $C_1=0$) and the target vehicle 36 was moving toward the host vehicle 12 in the same lane. FIGS. 8a-d illustrate the target state estimation and road curvature estimation results of the unconstrained and constrained filtering schemes, and FIGS. 9a-b illustrate the average target vehicle 36 lateral position, velocity and acceleration RMS errors of the unconstrained and constrained filtering schemes. The estimation errors from constrained filtering were substantially reduced. Before 48 radar scans, when the target vehicle 36 was farther than 65 meters away from the host vehicle 12, constrained filtering resulted in a more than 40 percent reduction of error in target lateral velocity estimation, and a more than 60 percent reduction of error in lateral acceleration estimation. When the target vehicle 36 was less than 65 meters away from the host vehicle 12, which is a more relevant condition for collision prediction, more than 50 percent of lateral position estimation error, and more than 90 percent of lateral velocity and acceleration estimation errors, were reduced by constrained filtering.

Figure 11A:
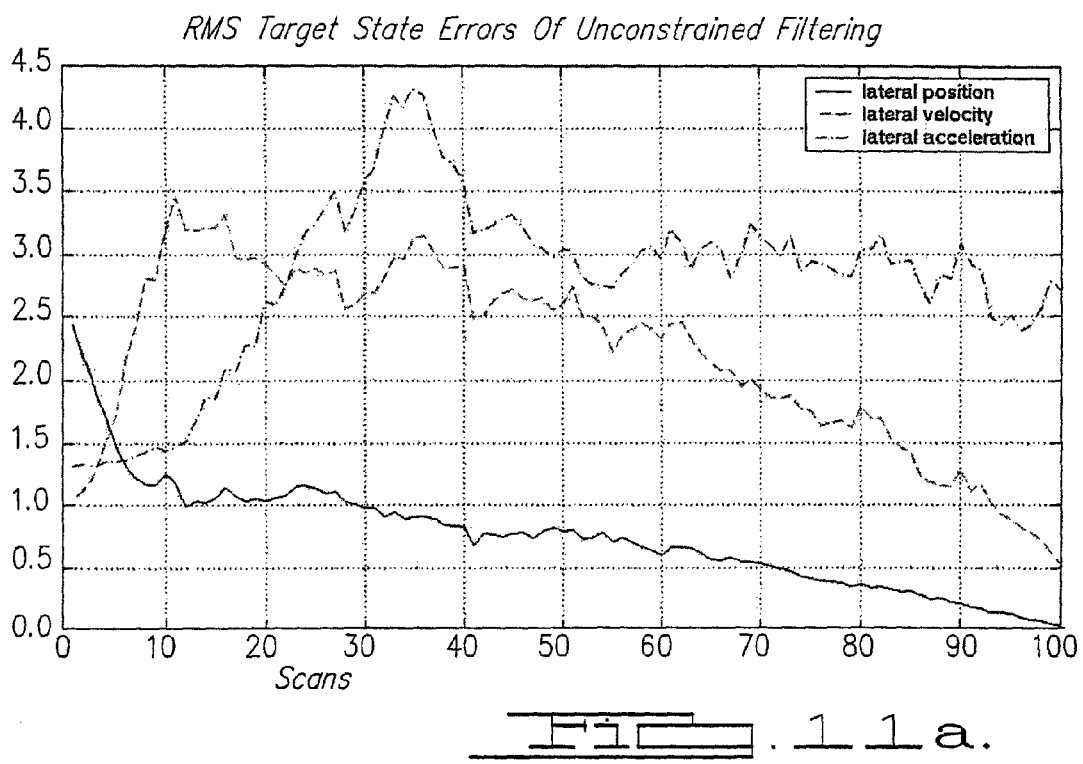
FIGS. 11a-b illustrate an example of the target state RMS errors from unconstrained and constrained filtering for the curved roadway, corresponding to FIGS. 10a-d.
Figure 11B:
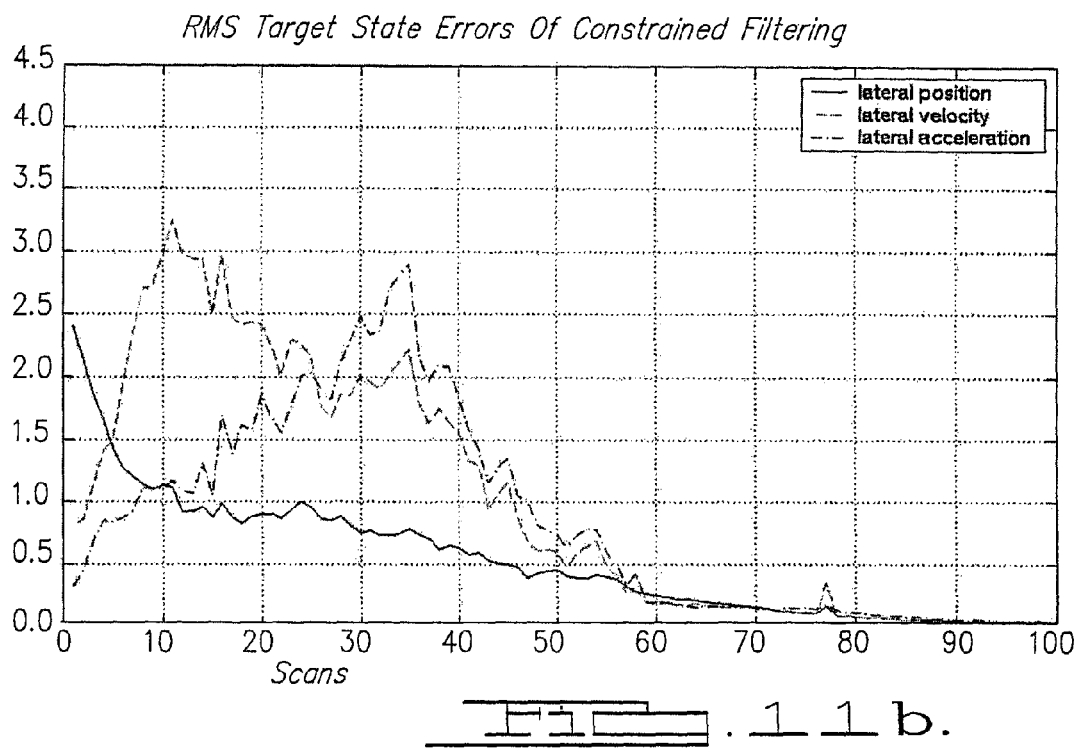
Figure 12A:
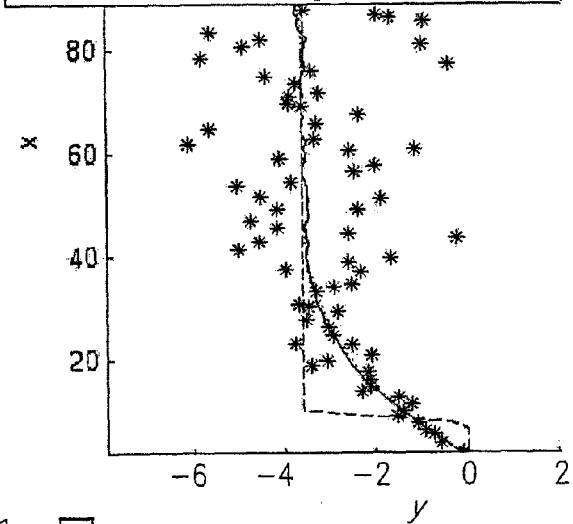
FIGS. 12a-d illustrate an example of the estimation of target position, lateral velocity, and associated RMS errors for a straight roadway involving a lane change.
Figure 12B:
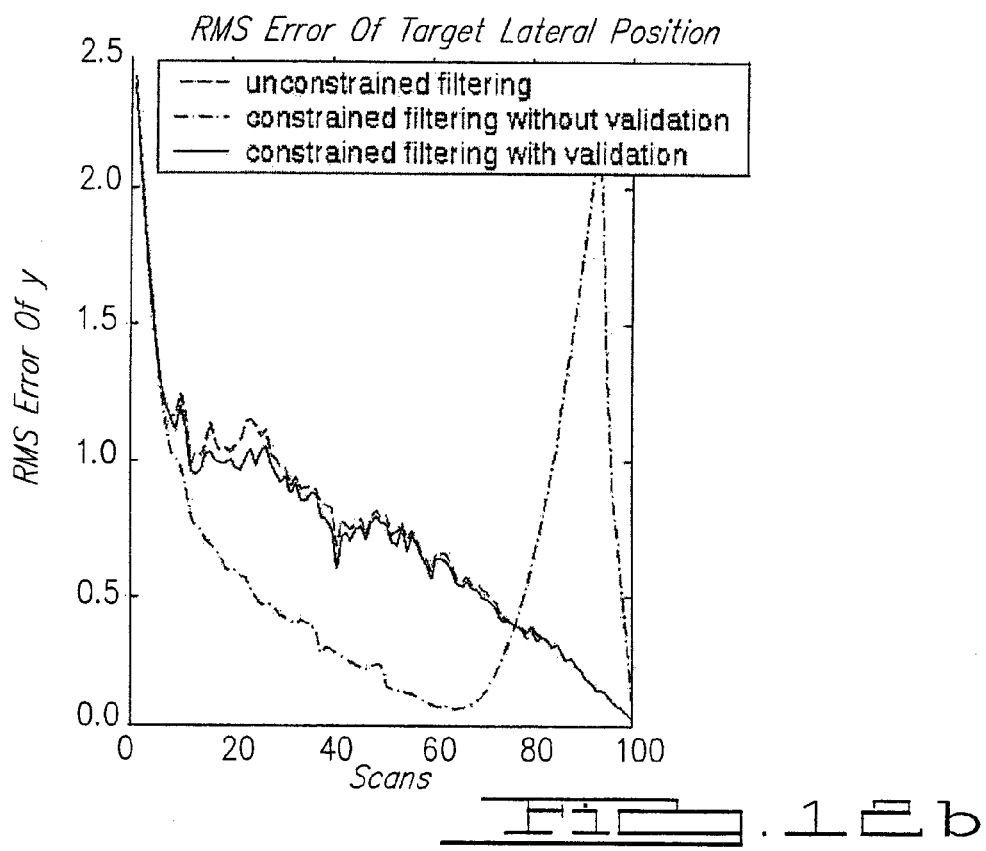
Figure 12C:
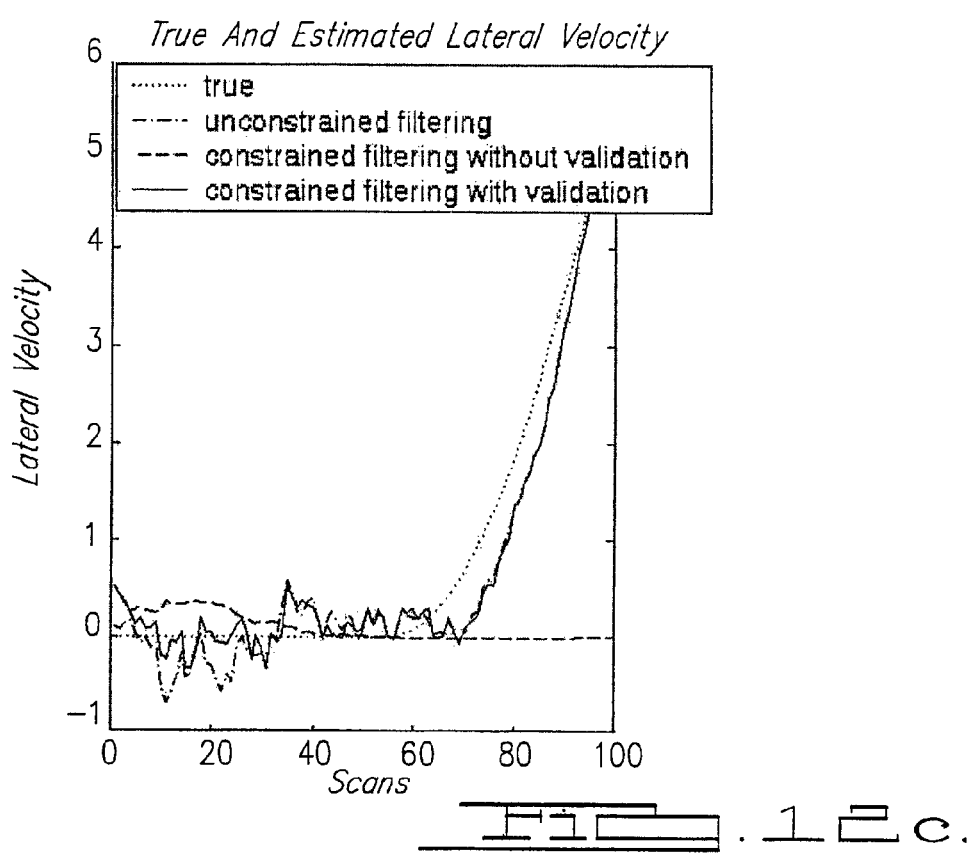
Figure 12D:
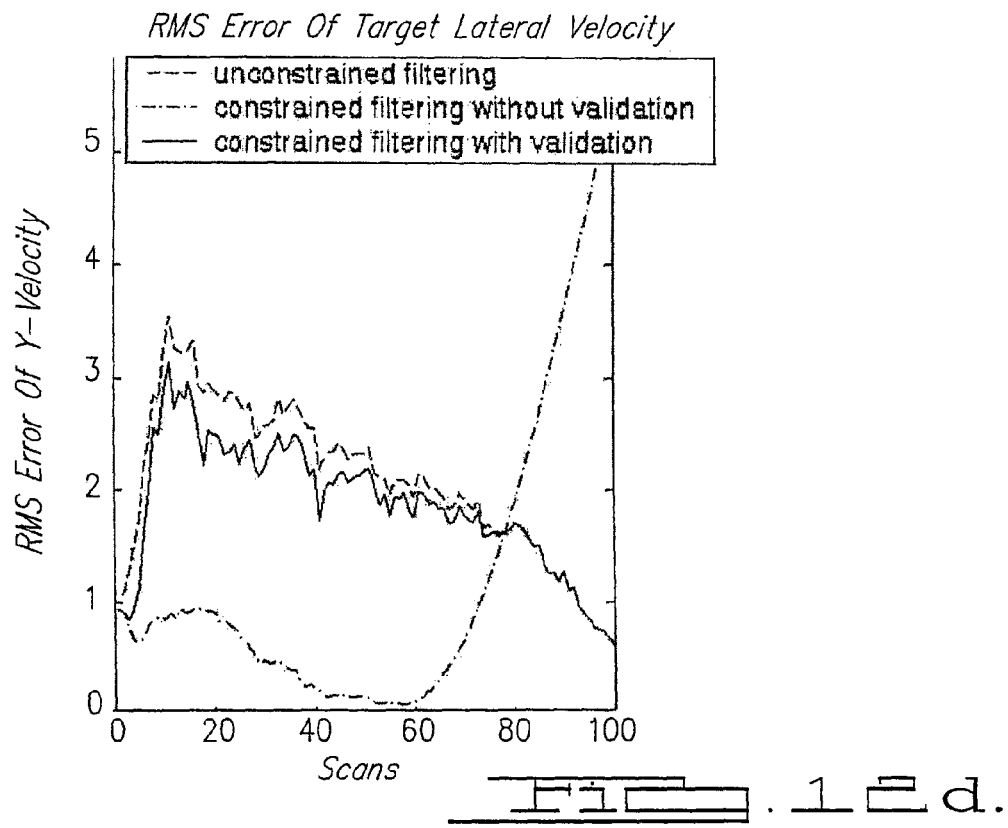
Figure 13A:
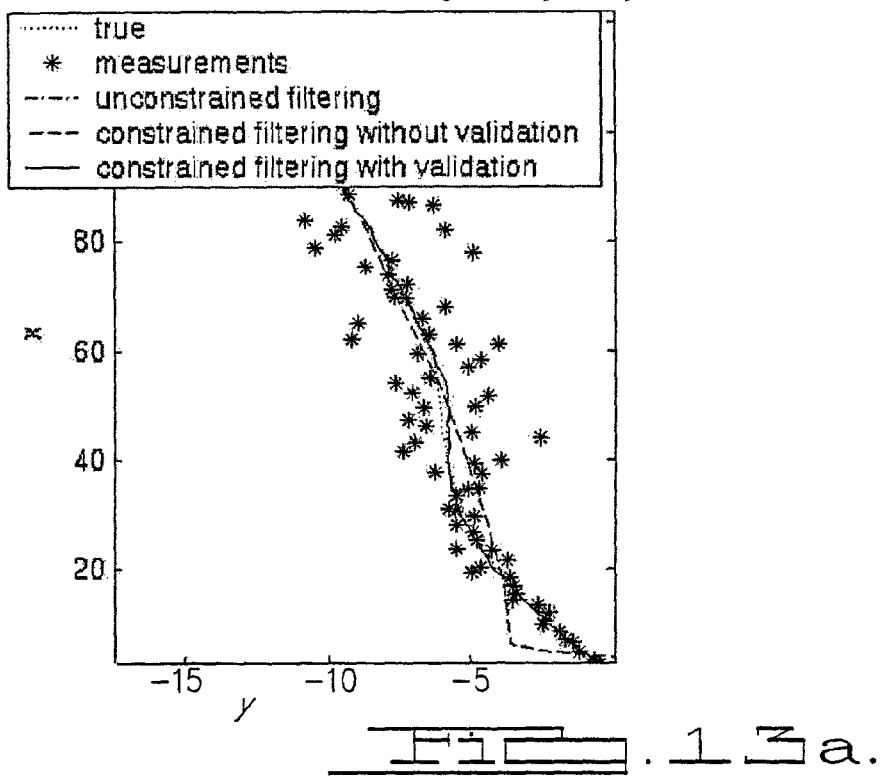
FIGS. 13a-d illustrates an example of the estimation of target position, lateral velocity, and their RMS errors for a curved roadway involving a lane change.
Figure 13B:
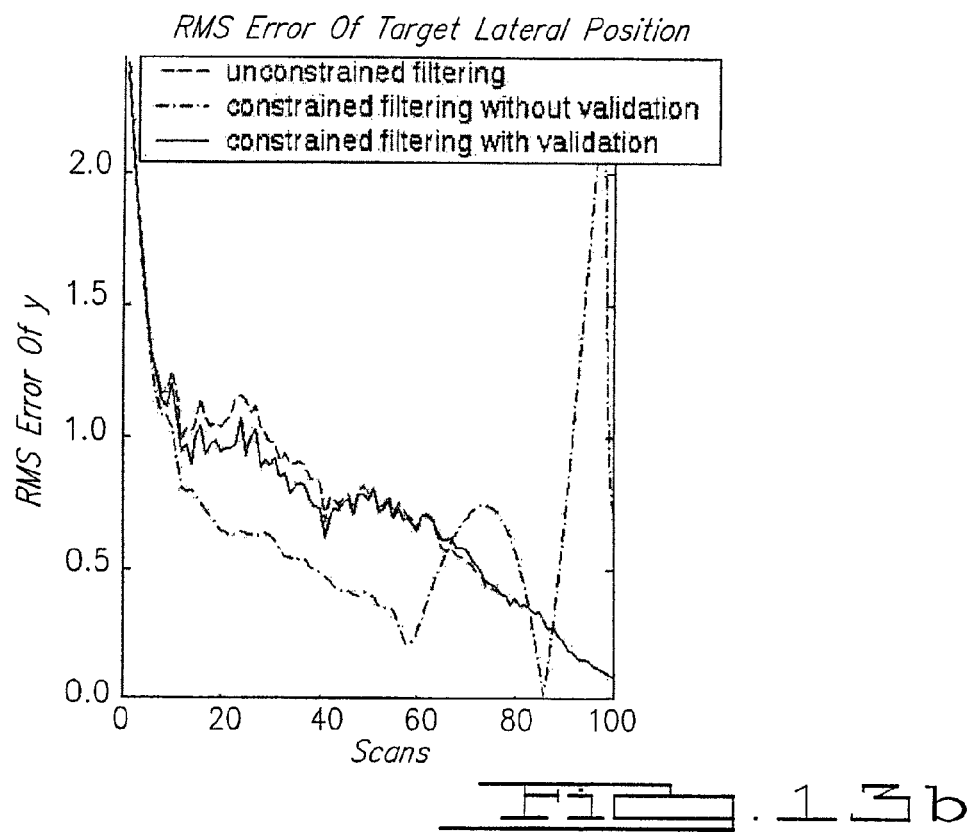
Figure 13C:
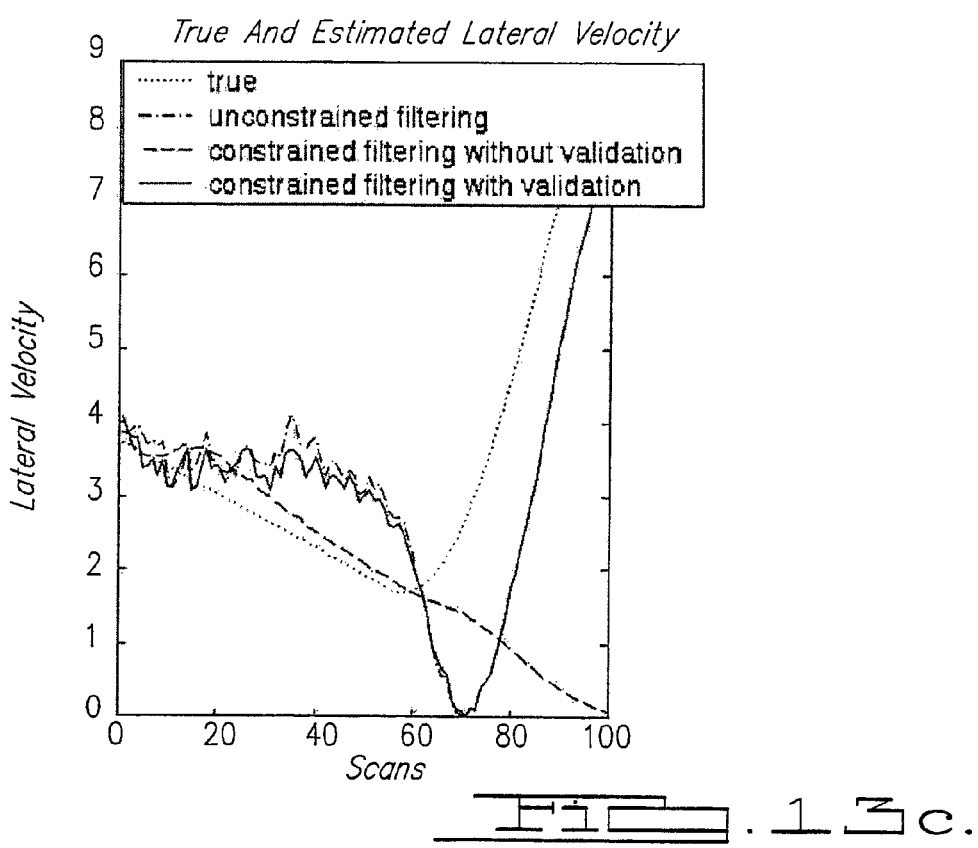
Figure 13D:
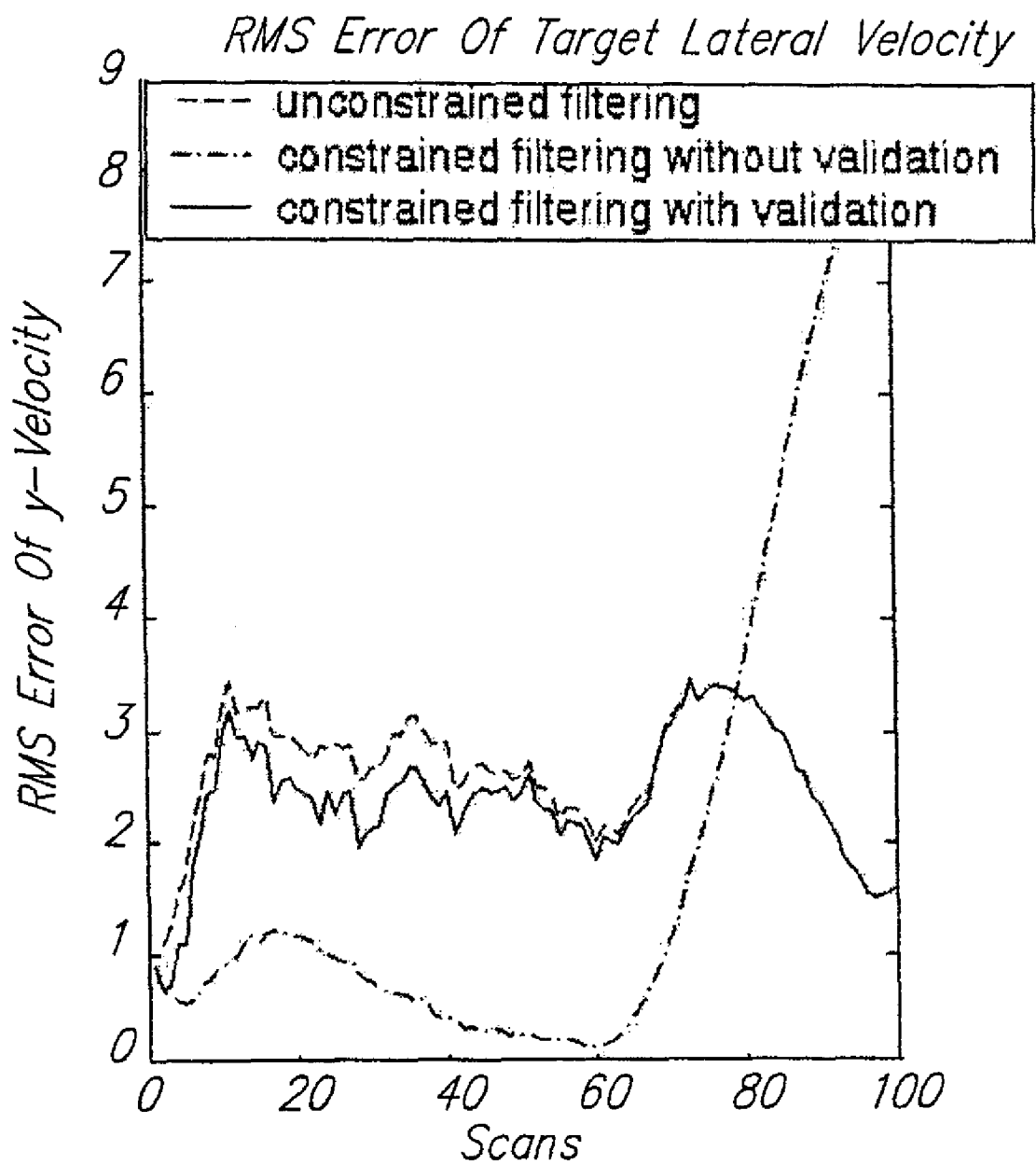

In the second scenario, the host vehicle 12 and the target vehicle 36 were moving on a curved roadway 34 ($C_0=-10^{-5}$ and $C_1=-3\times10^{-5}$) and the target vehicle 36 was moving toward the host vehicle 12 in the same lane. FIGS. 10a-d illustrate the target state estimation and curvature estimation results of the unconstrained and constrained filtering schemes, and FIGS. 11a-b illustrate the average target vehicle 36 lateral position, velocity and acceleration RMS errors of the unconstrained and constrained filtering schemes. The estimation errors from constrained filtering were substantially reduced after about 48 radar scans, when the target vehicle 36 was less than 65 meters away from the host vehicle 12. Estimation errors were the same for constrained and unconstrained filtering before 20 radar scans, when the target vehicle 36 was about 100 meters away from the host vehicle 12. For the target vehicle 36 located between 100 and 65 meters away from the host vehicle 12, constrained filtering resulted in about a 30 percent reduction in errors of lateral velocity and acceleration estimation, and when the target vehicle 36 was less than 65 meters away from the host vehicle 12, more than 50 percent of lateral position estimation error and more than 90 percent of lateral velocity and acceleration estimation errors were reduced by constrained filtering. The lack of improvement for constrained filtering when the target vehicle 36 was far away resulted from estimation errors of road curvature parameters, which caused constraint errors proportional to the distance between host vehicle 12 and the target vehicle 36. This is more evident in the curved roadway 34 case, where curvature estimation error was larger and caused more lane position ambiguity of a distant target vehicle 36.

In the third scenario, the host vehicle 12 and the target vehicle 36 were moving on a straight roadway 34 ($C_0=0$ and $C_1=0$) and the target vehicle 36 was initially approaching in the left neighboring lane. At t=2.2 second (55 radar scans), the target vehicle 36 began to diverge from its lane and turns toward the host lane 38, which resulted in a collision at t=4 seconds (100 radar scans). FIGS. 12a-d illustrate the target state estimation results and the lateral position and velocity RMS errors of the unconstrained and constrained filtering schemes. The error tolerance levels for constraint validity hypothesis testing (equation (70)) were chosen as a $\alpha \approx 1$ for the host lane 38 and $\alpha=0.5$ for all neighboring lanes 40. Whereas constrained filtering without validation produces substantially lower estimation errors before the target vehicle 36 turns away, the associated target state estimation result was incorrect and its RMS errors were much larger than that of unconstrained filtering after the target vehicle 36 began to turn away from its lane (the left neighboring lane), implying that the road constraints, which become invalid after the target vehicle 36 began to diverge from its lane, were not promptly lifted off. On the other hand, the performance of constrained filtering with validation was substantially close to that of unconstrained filtering, producing slightly lower estimation errors before the target vehicle 36 turns away, and exhibiting target state estimation results and RMS errors that were the same as unconstrained filtering after the target vehicle 36 began to turn away from its lane, implying that road constraints were promptly lifted off after the target vehicle 36 began to diverge from its lane.

The fourth scenario was similar to the third scenario, the only difference being that the vehicles were on a curved roadway 34 ($C_0=-10^{-5}$ and $C_1=-3\times10^{-5}$) instead of a straight one. The target vehicle 36 began to diverge at t=2.2 s and results in a collision at t=4 s. FIGS. 13a-d illustrate the target state estimation results and the lateral position and velocity RMS errors of the unconstrained and constrained filtering schemes. The error tolerance levels were the same as in the third scenario, and the results and observations were also similar to that of the third scenario. Road constraints were promptly lifted off by the proposed constraint validation after the target vehicle 36 began to diverge from its lane. In general, the overall improvement by constrained filtering in estimation accuracy of target vehicle 36 lateral kinematics was substantial, given the fact that estimation accuracy of target vehicle 36 lateral kinematics was often limited by poor radar angular resolution.

Accordingly, simulation results of road vehicle tracking on both straight and curved roadways 34 show that the predictive collision sensing system 10 could substantially reduce the estimation errors in target vehicle 36 lateral kinematics when the target vehicles 36 were in the host lane 38. When a target vehicle 36 maneuvers from a neighboring lane into the host lane 38, the predictive collision sensing system 10 promptly detects this maneuver and lifts off the road constraint to avoid an otherwise incorrect constrained result. In view of the fact that poor radar angular resolution often results in poor lateral kinematics estimation, the predictive collision sensing system 10 has provided for a substantial improvement in estimation accuracy of target vehicle 36 lateral kinematics, which is beneficial for an early and reliable road vehicle collision prediction.

Figure 14:
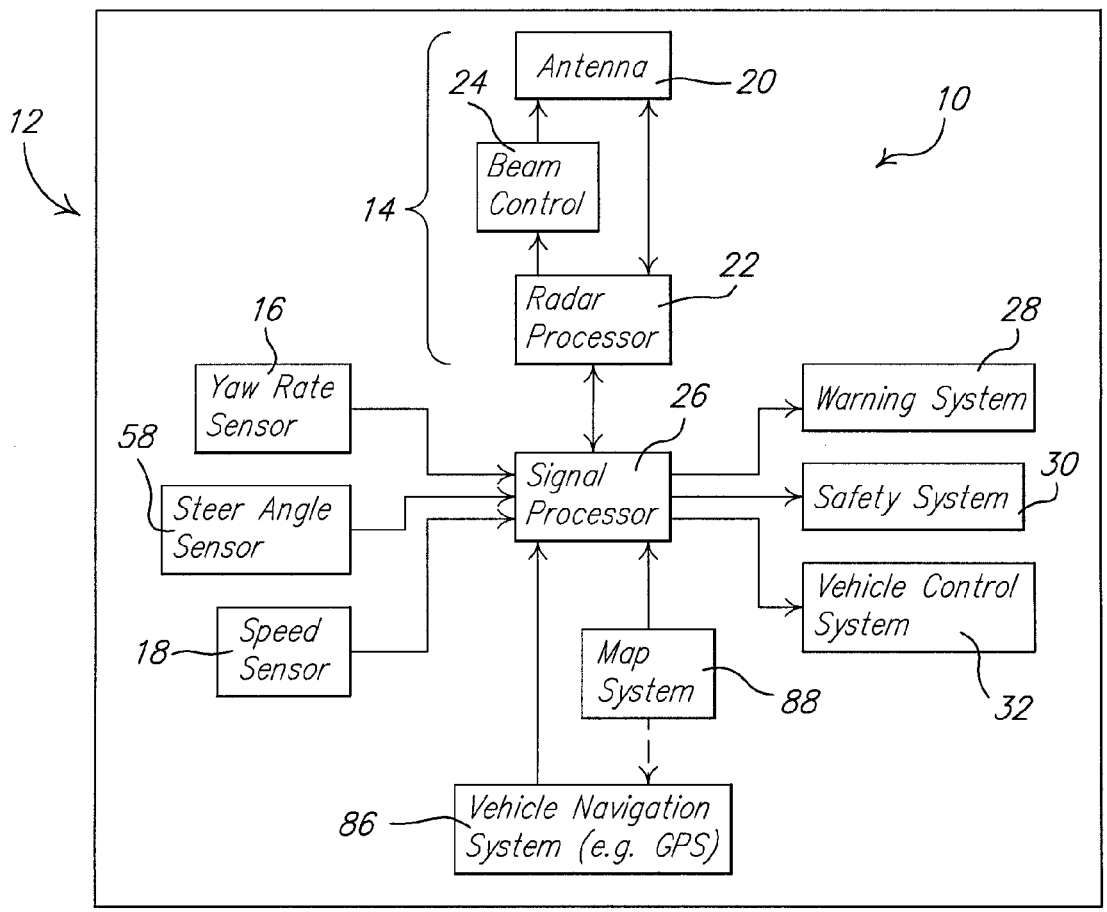
FIG. 14 illustrates a block diagram of hardware associated with another embodiment of a predictive collision sensing system.
Figure 15:
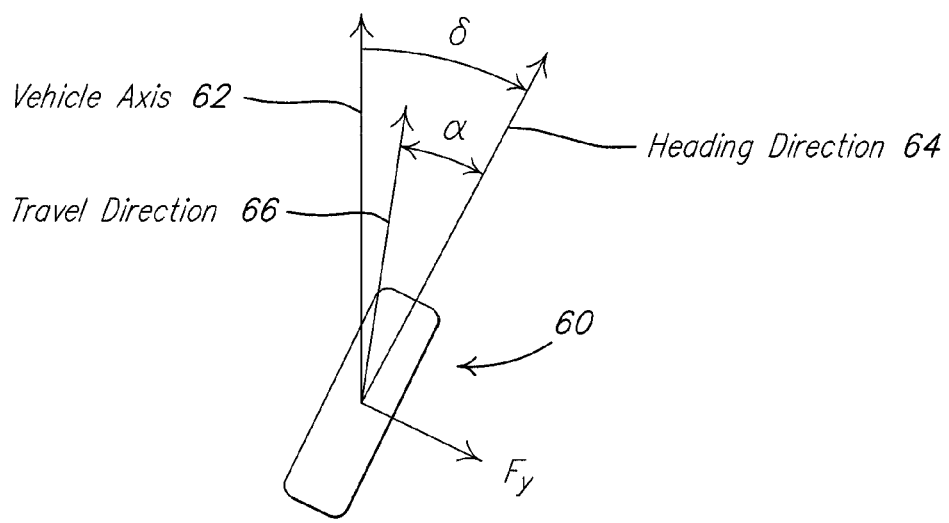
FIG. 15 illustrates a free-body diagram of a steered wheel.

Referring to FIG. 14, in accordance with another embodiment, the predictive collision sensing system 10 further comprises a steer angle sensor 58 which provides a measure indicative of or responsive to the steer angle δ of one or more steered wheels 60. For example, referring to FIG. 15, the steer angle δ of a particular steered wheel 60, e.g. one of the front wheels, is the angle between the longitudinal axis 62 of the vehicle 12 and the heading direction 64 of the steered wheel 60, wherein the heading direction 64 is the direction in which the steered wheel 60 rolls. Under cornering conditions, responsive to the steered wheel 60 being steered by a steer angle δ, the steered wheel 60 experiences a lateral slip as it rolls, which causes the resulting travel direction 66 to differ from the heading direction 64 by an associated slip angle α. The action between the associated tire and the road generates a laterally directed cornering force $F_y$ responsive—e.g. proportional—to the slip angle α which causes the vehicle 12 to turn, and which can be modeled as:

$$F_y = C_\alpha \cdot \alpha \tag{72}$$

wherein the associated proportionality constant, $C_\alpha$—also known as cornering stiffness—is defined as the slope of cornering force $F_y$ with respect to slip angle α at α=0.

Figure 16A:
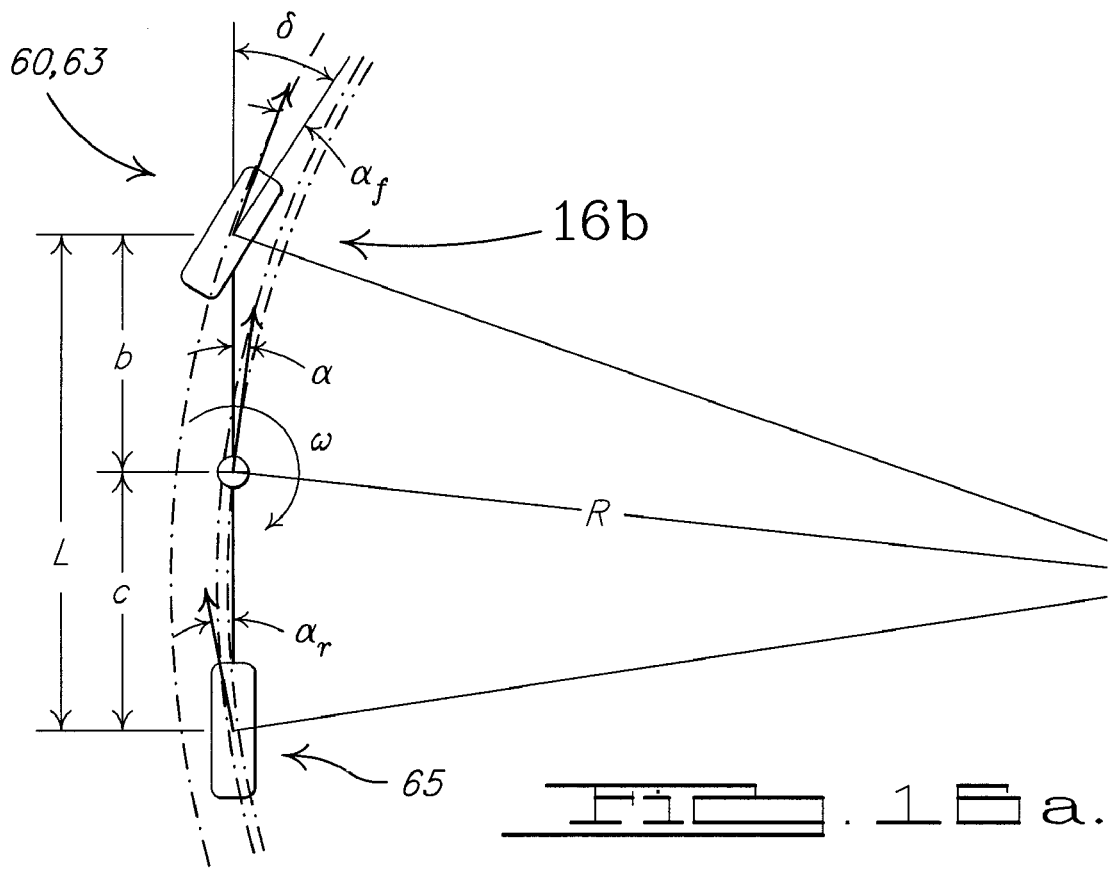
FIG. 16a illustrates a geometry of a bicycle model of a vehicle undergoing a turn.

Generally, for a vehicle 12 with two laterally displaced steered wheels 60, the associated steer angles δ of different steered wheels 60—i.e. inside and outside relative to a turn—will be different. However, referring to FIG. 16a, for a vehicle 12 traveling at relatively higher longitudinal speed U, the turn radius R is substantially larger than the wheelbase L of the vehicle 12, in which case the associated slip angles α of the different steered wheels 60 are relatively small so that the difference therebetween for the inside and outside steered wheels 60 can be assumed to be negligible. Accordingly, for purposes of describing cornering behavior, the vehicle 12 can be represented by what is known as a bicycle model 68 with a front 63 and rear 65 wheel, each corresponding to a composite of the associated front or rear wheels of the vehicle 12, wherein different steered wheels 60 at the front or rear of the vehicle are modeled as a single steered wheel 60 that is steered at an associated steer angle δ. Each wheel of the bicycle model 68—front 63 and rear 65—is assumed to generate the same lateral force responsive to an associated slip angle α as would all (e.g. both) corresponding wheels of the actual vehicle 12.

For a vehicle 12 at a longitudinal speed U following a curved path having a turn radius R, the sum of the lateral forces, i.e. cornering forces $F_y$, is equal to the product of the mass M of the vehicle 12 times the resulting centripetal acceleration, as follows:

$$\Sigma F_y = F_{yf} + F_{yr} = M \cdot U^2/R \tag{73}$$

where $F_{yf}$ and $F_{yr}$ are the lateral forces at the front 63 and rear 65 wheels respectively. Assuming that the yaw rotational acceleration of the vehicle 12 about the center of gravity CG is negligible, the sum of the moments caused by the front and rear lateral forces is equal to zero, with the result that $$F_{yf} = F_{yr} \cdot c/b \tag{74}$$

where b and c are the distances from the center of gravity CG to the front 63 and rear 65 wheels respectively.

The lateral force $F_{yr}$ at the rear wheel 65 is then given as follows by substituting equation (74) into equation (73):

$$F_{yr} = (M \cdot b/L) \cdot (U^2/R) = \frac{W_r}{g} \cdot \frac{U^2}{R} \tag{75}$$

where b and c are the distances from the center of gravity CG to the front 63 and rear 65 wheels respectively, and $W_r$ is the weight of the vehicle 12 carried by the rear wheel 65. Accordingly, the lateral force $F_{yr}$ at the rear wheel 65 is given by the product of the portion of vehicle mass ($W_r/g$) carried by the rear wheel 65 times the lateral acceleration at the rear wheel 65.

Similarly, the lateral force $F_{yf}$ at the front wheel 63 is given by the product of the portion of vehicle mass ($W_f/g$) carried by the front wheel 63 times the lateral acceleration at the front wheel 63 as follows:

$$F_{yr} = (M \cdot c/L) \cdot (U^2/R) = \frac{W_f}{g} \cdot \frac{U^2}{R} \tag{76}$$

where $W_f$ is the weight of the vehicle 12 carried by the front wheel 63.

Given the lateral forces $F_{yf}$, $F_{yr}$ at the front 63 and rear 65 wheels respectively, the associated slip angles $\alpha_f$, $\alpha_r$ are given from equations (72), (75) and (76) as follows:

$$\alpha_f = W_f \cdot U^2/(C_{\alpha f} \cdot g \cdot R) \tag{77}$$

and $$\alpha_r = W_r \cdot U^2/(C_{\alpha r} \cdot g \cdot R) \tag{78}$$

Figure 16B:
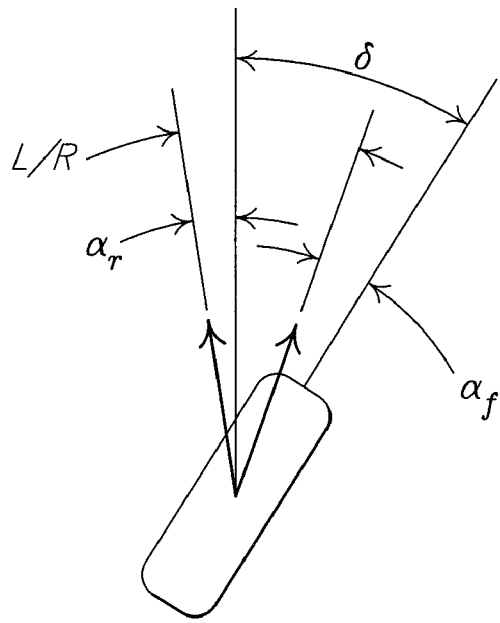

From the geometry illustrated in FIG. 16b, the steer angle δ is given by:

$$\delta = L/R + \alpha_f - \alpha_r \tag{79}$$

Substituting for $\alpha_f$ and $\alpha_r$ in equation (79) from equations (77) and (78) gives:

$$\delta = \frac{L}{R} + \left(\frac{W_f}{C_{\alpha f}} - \frac{W_r}{C_{\alpha r}}\right) \cdot \frac{U^2}{g \cdot R} \tag{80}$$

which can also be expressed as:

$$\delta = L/R + K \cdot a_y \tag{81}$$

where
 $\delta$=Steer angle at the front wheels (rad)
 L=Wheelbase (m)
 R=Turn Radius (m)
 U=Longitudinal speed (m/sec)
 g=Gravitational acceleration constant=9.81 m/sec²
 $W_f$=Load on the front axle (kg)
 $W_r$=Load on the rear axle (kg)
 $C_{\alpha f}$=Cornering stiffness of the front tires (kg$_y$/rad)
 $C_{\alpha r}$=Cornering stiffness of the rear tires (kg$_y$/rad)
 K=understeer gradient (rad/g)
 $a_y$=lateral acceleration (g)

Equations (80) and (81) describe the relationship between steer angle $\delta$ and lateral acceleration $a_y = U^2/(gR)$. The factor $K = [W_f/C_{\alpha f} - W_r/C_{\alpha r}]$—which provides the sensitivity of steer angle $\delta$ to lateral acceleration $a_y$, and which is also referred to as an understeer gradient—consists of two terms, each of which is the ratio of the load on the wheel $W_f$, $W_r$ (front or rear) to the corresponding cornering stiffness $C_{\alpha f}$, $C_{\alpha r}$ of the associated tires. Depending upon the value of the understeer gradient K, the cornering behavior of the vehicle 12 is classified as either neutral steer, understeer or oversteer, depending upon whether K is equal to zero, greater than zero, or less than zero, respectively.

For a vehicle 12 exhibiting neutral steer, $$W_f/C_{\alpha f} = W_r/C_{\alpha r} \rightarrow K = 0 \rightarrow \alpha_f = \alpha_r \tag{82a}$$

so that, for a constant-radius turn, there would be no change in steer angle $\delta$ as the longitudinal speed U is varied.

For a vehicle 12 exhibiting understeer, $$W_f/C_{\alpha f} > W_r/C_{\alpha r} \rightarrow K > 0 \rightarrow \alpha_f > \alpha_r \tag{82b}$$

so that, for a constant-radius turn, the steer angle $\delta$ would need to increase with increasing longitudinal speed U in proportion to the product of the understeer gradient K times the lateral acceleration $a_y$.

For a vehicle 12 exhibiting oversteer, $$W_f/C_{\alpha f} < W_r/C_{\alpha r} \rightarrow K < 0 \rightarrow \alpha_f < \alpha_r \tag{82c}$$

so that, for a constant-radius turn, the steer angle $\delta$ would need to decrease with increasing longitudinal speed U in proportion to the product of the understeer gradient K times the lateral acceleration $a_y$.

A vehicle 12 steered with a steer angle $\delta$ develops a yaw rate $\omega$ that is related to the longitudinal speed U and turn radius R by:

$$\omega = \frac{U}{R} \text{ (rad/sec)} \tag{83}$$

Solving for the turn radius R from equation (79) and substituting in equation (83) gives the following relationship between yaw rate $\omega$ and steer angle $\delta$:

$$\omega = \frac{\frac{U}{L}}{1 + \frac{K \cdot U^2}{L \cdot g}} \cdot \delta \tag{84}$$

which can be used to find the relationship between the associated error variances, e.g. assuming that the vehicle 12 exhibits neutral steer behavior. For example, in neutral steer case, K=0, so that equation (84) becomes:

$$\omega = \frac{U}{L} \cdot \delta \tag{85}$$

The error variance of $\omega$ is given by:

$$\sigma_\omega^2 = E[(\omega - \hat{\omega})^2] = E\left[\left(\frac{U\delta}{L} - \frac{\hat{U}\hat{\delta}}{L}\right)^2\right] = \frac{1}{L^2}[E(U^2\delta^2) - \hat{U}^2\hat{\delta}^2] \tag{86}$$

Assuming that the longitudinal speed U and steer angle $\delta$ are independent, then $$\sigma_\omega^2 = \frac{1}{L^2}[E(U^2) \cdot E(\delta^2) - \hat{U}^2 \cdot \hat{\delta}^2] = \tag{87}$$
$$\frac{1}{L^2}[(\hat{U}^2 + \sigma_U^2)(\hat{\delta}^2 + \sigma_\delta^2) - \hat{U}^2 \cdot \hat{\delta}^2] =$$
$$\frac{1}{L^2}[\hat{U}^2 \sigma_\delta^2 + \hat{\delta}^2 \sigma_U^2 + \sigma_U^2 \sigma_\delta^2] =$$
$$\frac{1}{L^2}(\hat{U}^2 + \sigma_U^2)\sigma_\delta^2 + \frac{1}{L^2}\hat{\delta}^2 \sigma_U^2$$

From equation (85) for a neutral steer condition $$\frac{\delta}{L} = \frac{\omega}{U} \text{ and } \frac{\delta^2}{L^2} = \frac{\omega^2}{U^2} \tag{88}$$

which when substituted into equation (87) gives:

$$\sigma_\omega^2 = \frac{1}{L^2} \cdot (\hat{U}^2 + \sigma_U^2) \cdot \sigma_\delta^2 + \frac{\hat{\omega}^2}{\hat{U}^2} \cdot \sigma_U^2 \tag{89}$$

where $\sigma_U$ and $\sigma_\delta$ are the error variances of longitudinal speed U and steer angle $\delta$.

For a constant turn radius R, from equation (2), $C = C_0$, and from equations (13) and (88) for a neutral steer condition, $$C_0 = \frac{\omega}{U} = \frac{\delta}{L} \tag{90}$$

from which the relation between curvature error variance $\sigma_{C0}^2$ and steer angle error variance $\sigma_\delta^2$ is given by:

$$\sigma_{C0}^2 = \frac{1}{L^2}\sigma_\delta^2 \qquad (91)$$

The steer angle sensor 58 can be implemented in various ways, including, but not limited to, an angular position sensor—e.g. shaft encoder, rotary potentiometer or rotary transformer/syncro—adapted to measure the rotation of the steering wheel shaft or input to a steering box, e.g. a pinion of a rack-and-pinion steering box; or a linear position sensor adapted to measure the position of the rack of the rack-and-pinion steering box. The steer angle sensor 58 could be shared with another vehicle control system, e.g. a road following or suspension control system. The steer angle sensor 58 can be used to supplement a yaw rate sensor 16, and can beneficially provide independent information about vehicle maneuvers. Furthermore, the steer angle $\delta$ measurement error is substantially independent of longitudinal speed U, in comparison with a gyroscopic yaw rate sensor 16 for which the associated yaw rate $\omega$ measurement error is related to vehicle speed, notwithstanding that a gyroscopic yaw rate sensor 16 is generally more accurate and more sensitive to vehicle maneuvers than a steer angle sensor 58 when each is used to generate a measure of yaw angle.

The curvature error variance associated with steer angle $\delta$ measurements can be compared with that associated with yaw rate $\omega$ measurements in order to identify conditions under which one measurement is more accurate than the other. The error variance of yaw rate $\omega$ measured with a gyroscopic yaw rate sensor 16 is given as follows:

$$\sigma_\omega^2 = E[(\omega_m - b_m - \omega + b)^2] = E[(\omega_m - \omega)^2 + (b_m - b)^2 + 2(\omega_m - \omega)(b_m - b)] \qquad (92)$$

$$\sigma_\omega^2 = E[(\omega_m - \omega)^2] + E[(b_m - b)^2] + 2E[(\omega_m - \omega)(b_m - b)] \qquad (93)$$

$$\sigma_\omega^2 = \sigma_{\omega m}^2 + \sigma_b^2 \qquad (94)$$

where $\omega$ is the true yaw rate, $\omega_m$ is the yaw rate measurement, b is the gyro bias with drift, and $b_m$ is the mean gyro bias.

The curvature error variance $\sigma_{c0}^2$ of the yaw rate $\omega$ is given by equation (97), described hereinbelow. By equating equations (91) and (97), and substituting for $\sigma_\omega^2$ from equation (94), the curvature error variance associated with the steer angle $\delta$ measurement is equal to the curvature error variance associated with the yaw rate $\omega$ measurement when:

$$U = \frac{L \cdot \sigma_\omega}{\sigma_\delta} = \frac{L\sqrt{(\sigma_{\omega m}^2 + \sigma_b^2)}}{\sigma_\delta} \qquad (95)$$

Figure 17:
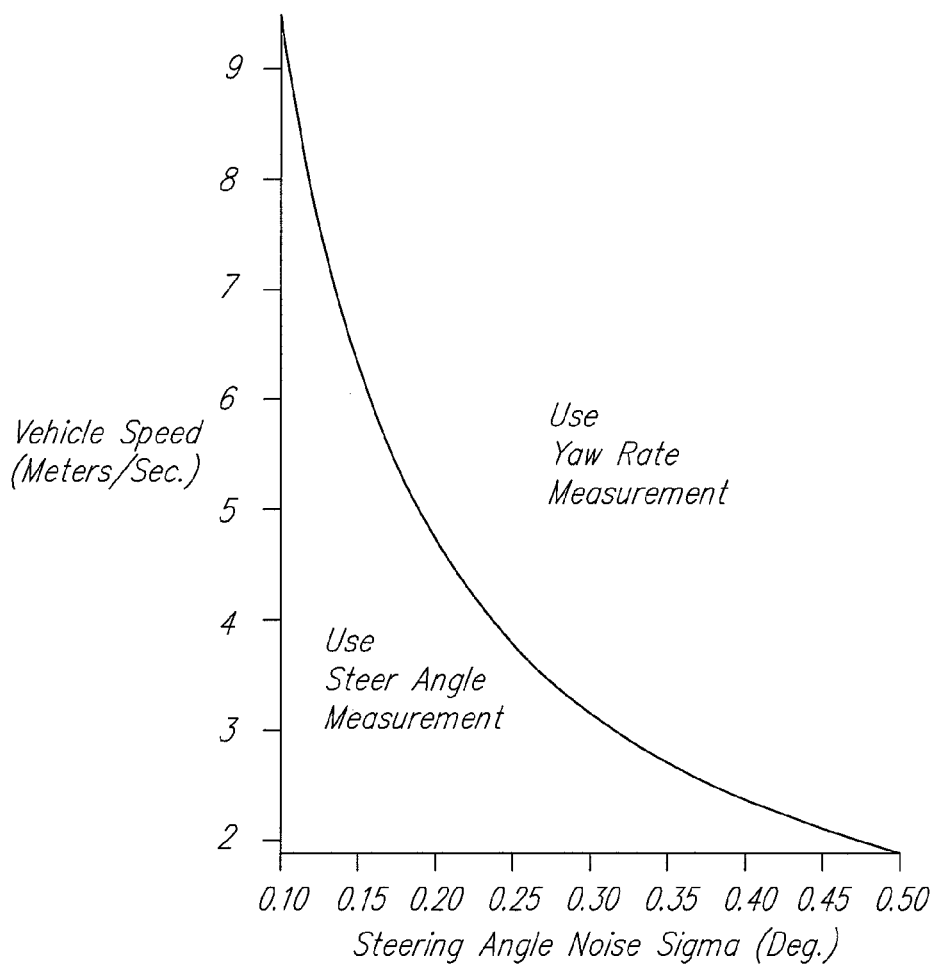
FIG. 17 illustrates a switching curve.
Figure 18:
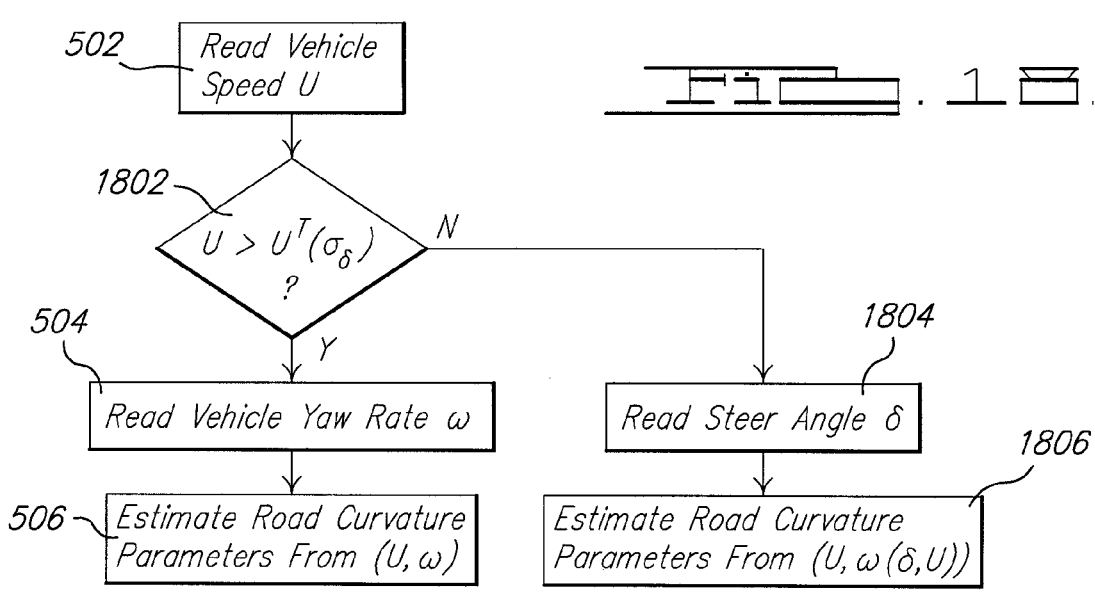
FIG. 18 illustrates a flow chart of a process associated with the switching curve illustrated in FIG. 17.

Equation (95) defines a switching curve—e.g. as illustrated in FIG. 17, for which $\sigma_{\omega m}^2 = 1.68 \times 10^{-5}$, $b_m = 2.5926$, and L=3.2 meters—that can be used in one embodiment to determine whether to use steer angle $\delta$ or yaw rate $\omega$ when determining road curvature parameters. For example, referring to FIG. 18, in step (502) the longitudinal speed U of the vehicle 12 is read from the speed sensor 18. Then, in step (1802), if the longitudinal speed U is greater than a speed threshold $U^T$, then the road curvature parameters are determined using yaw rate $\omega$, wherein the speed threshold $U^T$ parameter is given by equation (95) and illustrated in FIG. 17 as a function of the error variance $\sigma_\delta^2$ of the steer angle $\delta$ measurement, the latter of which is assumed to be constant for a given steer angle sensor 58. More particularly, from step (1802), the yaw rate $\omega$ of the vehicle 12 is read from the yaw rate sensor 16, and then in step (506), the road curvature parameters $C_0$ and $C_1$ are estimated from (U, $\omega$) as described hereinabove. Otherwise, from step (1802), if the longitudinal speed U of the vehicle 12 is less than the speed threshold $U^T$, then in step (1804) the steer angle $\delta$ is read from the steer angle sensor 58, and then in step (1806), the road curvature parameters $C_0$ and $C_1$ are estimated from (U, $\delta$), wherein the yaw rate $\omega$ measurement input to the first Kalman filter 52 (host state filter) can be determined from the steer angle $\delta$ and longitudinal speed U using equation (84). If the longitudinal speed U is equal to the speed threshold $U^T$, then the estimates of the road curvature parameters $C_0$ and $C_1$ from steps (506) and (1806) would have the same error variance, and either estimate could be used.

The error variances and covariance of the road curvature parameters $C_0$ and $C_1$ used by the associated second Kalman filter 54, i.e. the curvature filter, of the road curvature estimation subsystem 42 generally depend upon the quantity $1/U$, where U is the longitudinal speed U of the vehicle 12. If U is a Gaussian random variable, analytic solutions for the exact mean and variance of $1/U$ are not presently known. Instead, U can be assumed to be a non-random variable because the variance $\sigma_U^2$ of U is substantially smaller than U in substantially most cases. Accordingly, the various variance and covariance components of the road curvature parameters $C_0$ and $C_1$ can be derived as follows:

$$\sigma_{c0}^2 = \qquad (96)$$
$$E\left\{\left[\frac{\omega}{U} - \hat{\omega}\cdot\left(\frac{1}{U}\right)\right]^2\right\} = E\left\{\omega^2 \cdot \frac{1}{U^2} - 2\cdot\omega\cdot\frac{1}{U}\cdot\hat{\omega}\cdot\left(\frac{\hat{1}}{U}\right) + \hat{\omega}^2\cdot\left(\frac{\hat{1}}{U}\right)^2\right\}$$

$$\sigma_{c0}^2 = E[\omega^2]\cdot E\left[\frac{1}{U^2}\right] - E[\omega]^2\cdot E\left[\frac{1}{U}\right]^2 \approx \frac{\sigma_\omega^2}{U^2} \qquad (97)$$

$$\sigma_{c1}^2 = \left\{\left[\frac{\dot{\omega}}{U^2} - \frac{\omega\dot{U}}{U^3} - E\left(\frac{\dot{\omega}}{U^2}\right) + E\left(\frac{\omega\cdot\dot{U}}{U^3}\right)\right]^2\right\} \qquad (98)$$

$$\sigma_{c1}^2 = E\left[\left(\frac{\dot{\omega}}{U^2} - \frac{\omega\dot{U}}{U^3}\right)^2\right] - \left[E\left(\frac{\dot{\omega}}{U^2}\right) - E\left(\frac{\omega\dot{U}}{U^3}\right)\right]^2 \qquad (99)$$

$$\sigma_{c1}^2 = E\left[\frac{\dot{\omega}^2}{U^4} - 2\frac{\omega\cdot\dot{\omega}\cdot\dot{U}}{u^5} + \frac{\omega^2\cdot\dot{U}^2}{U^6}\right] - \qquad (100)$$
$$\left\{\left[E\left(\frac{\dot{\omega}}{U^2}\right)\right]^2 - 2E\left(\frac{\dot{\omega}}{U^2}\right)E\left(\frac{\omega\cdot\dot{U}}{U^3}\right) + \left[E\left(\frac{\omega\cdot\dot{U}}{U^3}\right)\right]^2\right\}$$

$$\sigma_{c1}^2 = \frac{E(\dot{\omega}^2) - \hat{\dot{\omega}}^2}{\hat{U}^4} - 2\cdot\frac{\hat{\dot{U}}}{\hat{U}^5}\cdot E(\omega\cdot\dot{\omega} - \hat{\omega}\cdot\hat{\dot{\omega}}) + \qquad (101)$$
$$\frac{(\hat{\omega}^2 + \sigma_\omega^2)\cdot\left(\hat{\dot{U}}^2 + \sigma_{\dot{U}}\right) - \hat{\omega}^2\cdot\hat{\dot{U}}^2}{\hat{U}^6}$$

$$\sigma_{c1}^2 = \frac{\sigma_{\dot{\omega}}^2}{\hat{U}^4} + \frac{\hat{\omega}^2\sigma_{\dot{U}}^2 + \hat{\dot{U}}^2\sigma_\omega^2 + \sigma_\omega^2\sigma_{\dot{U}}^2}{\hat{U}^6} - 2\frac{\hat{\dot{U}}\sigma_{\omega\dot{\omega}}^2}{\hat{U}^5} \qquad (102)$$

$$\sigma_{\dot{C}}^2 = E\left\{\left[\frac{\dot{\omega}}{U} - \frac{\omega\cdot\dot{U}}{U^2} - E\left(\frac{\dot{\omega}}{U}\right) + E\left(\frac{\omega\cdot\dot{U}}{U^2}\right)\right]^2\right\} \qquad (103)$$

$$\sigma_{\dot{C}}^2 = E\left[\left(\frac{\dot{\omega}}{U} - \frac{\omega\cdot\dot{U}}{U^2}\right)^2\right] - \left[E\left(\frac{\dot{\omega}}{U}\right) - E\left(\frac{\omega\cdot\dot{U}}{U^2}\right)\right]^2 \qquad (104)$$

$$\sigma_{\dot{C}}^2 = \frac{E(\dot{\omega}^2) - \hat{\dot{\omega}}^2}{\hat{U}^2} - 2\frac{\hat{\dot{U}}(E(\omega\cdot\dot{\omega}) - \hat{\omega}\cdot\hat{\dot{\omega}})}{\hat{U}^3} + \frac{E(\omega^2\cdot\dot{U}^2) - \hat{\omega}^2\cdot\hat{\dot{U}}^2}{\hat{U}^4} \qquad (105)$$

-continued $$\sigma_{\dot{C}}^2 = \frac{\sigma_{\dot{\omega}}^2}{\hat{U}^2} + \frac{\hat{\omega}^2 \cdot \sigma_{\dot{U}}^2 + \hat{\dot{U}}^2 \cdot \sigma_{\omega}^2 + \sigma_{\omega}^2 \cdot \sigma_{\dot{U}}^2}{\hat{U}^4} - 2\frac{\hat{\dot{U}} \cdot \sigma_{\omega\dot{\omega}}^2}{\hat{U}^3} \quad (106)$$

$$\sigma_{C_0 C_1}^2 = E[(C_0 - \hat{C}_0) \cdot (C_1 - \hat{C}_1)] = \quad (107)$$

$$E\left[\left(\frac{\omega}{U} - \frac{\hat{\omega}}{\hat{U}}\right) \cdot \left(\frac{\dot{\omega}}{U^2} - \frac{\omega \cdot \dot{U}}{U^3} - \frac{\hat{\dot{\omega}}}{\hat{U}^2} + \frac{\hat{\omega} \cdot \hat{\dot{U}}}{\hat{U}^3}\right)\right]$$

$$\sigma_{C_0 C_1}^2 = \frac{E(\omega \cdot \dot{\omega})}{\hat{U}^3} - \frac{(\hat{\omega}^2 + \sigma_{\omega}^2) \cdot \hat{\dot{U}}}{\hat{U}^4} - \quad (108)$$

$$\frac{\hat{\omega} \cdot \hat{\dot{\omega}}}{\hat{U}^3} + \frac{\hat{\omega}^2 \cdot \hat{\dot{U}}}{\hat{U}^4} - \frac{\hat{\omega} \cdot \hat{\dot{\omega}}}{\hat{U}^3} + \frac{\hat{\omega}^2 \cdot \hat{\dot{U}}}{\hat{U}^4} + \frac{\hat{\omega} \cdot \hat{\dot{\omega}}}{\hat{U}^3} - \frac{\hat{\omega}^2 \cdot \hat{\dot{U}}}{\hat{U}^4}$$

$$\sigma_{C_0 C_1}^2 = \frac{\sigma_{\omega\dot{\omega}}^2}{\hat{U}^3} - \frac{\hat{\dot{U}} \sigma_{\omega}^2}{\hat{U}^4} \quad (109)$$

$$\sigma_{C_0 \dot{C}}^2 = \quad (110)$$

$$E[(C_0 - \hat{C}_0) \cdot (\dot{C} - \hat{\dot{C}})] = E\left[\left(\frac{\omega}{U} - \frac{\hat{\omega}}{\hat{U}}\right) \cdot \left(\frac{\dot{\omega}}{U} - \frac{\omega \cdot \dot{U}}{U^2} - \frac{\hat{\dot{\omega}}}{\hat{U}} + \frac{\hat{\omega} \cdot \hat{\dot{U}}}{\hat{U}^2}\right)\right]$$

$$\sigma_{C_0 \dot{C}}^2 = \frac{E(\omega \cdot \dot{\omega})}{\hat{U}^2} - \frac{(\hat{\omega}^2 + \sigma_{\omega}^2) \cdot \hat{\dot{U}}}{\hat{U}^3} - \quad (111)$$

$$\frac{\hat{\omega} \cdot \hat{\dot{\omega}}}{\hat{U}^2} + \frac{\hat{\omega}^2 \cdot \hat{\dot{U}}}{\hat{U}^3} - \frac{\hat{\omega} \cdot \hat{\dot{\omega}}}{\hat{U}^2} + \frac{\hat{\omega}^2 \cdot \hat{\dot{U}}}{\hat{U}^3} + \frac{\hat{\omega} \cdot \hat{\dot{\omega}}}{\hat{U}^2} - \frac{\hat{\omega}^2 \cdot \hat{\dot{U}}}{\hat{U}^3}$$

$$\sigma_{C_0 \dot{C}}^2 = \frac{\sigma_{\omega\dot{\omega}}^2}{\hat{U}^2} - \frac{\hat{\dot{U}} \cdot \sigma_{\omega}^2}{\hat{U}^3} \quad (112)$$

Referring to FIG. 19, the road curvature estimation subsystem 42 can be embodied in a variety of ways. Generally, the road curvature estimation subsystem 42 comprises a host state filter 52.1 and a curvature filter 54.1, wherein the host state filter 52.1 processes measures responsive to vehicle speed and vehicle yaw to determine the corresponding host state $[\omega, \dot{\omega}, U, \dot{U}]$ of the host vehicle 12. For example, a speed sensor 18 provides the longitudinal speed $U_k^h$ of the vehicle 12 as the measure of vehicle speed, and either a yaw rate sensor 16 or a steer angle sensor 58, or both, provide either the yaw rate $\omega_k^h$ or the steer angle $\delta_k^h$ respectively, or both, as the measure of vehicle yaw, wherein samples k of the measurements are provided by a sampled data system at corresponding sampling times. In one embodiment, e.g. illustrated also in FIG. 4, the measure of vehicle yaw is given by the yaw rate $\omega_k^h$ from the yaw rate sensor 16, wherein the yaw rate $\omega_k^h$ and the longitudinal speed $U_k^h$ are input directly to the first Kalman filter 52 of the host state filter 52.1. In another embodiment, the measure of vehicle yaw is given by either the yaw rate $\omega_k^h$ from the yaw rate sensor 16 or the steer angle $\delta_k^h$ from the steer angle sensor 58, depending upon the magnitude of the longitudinal speed $U_k^h$ in accordance with the process illustrated in FIG. 18 and described hereinabove. If the longitudinal speed U of the vehicle 12 is less than the speed threshold $U^T$, then a yaw rate processor 68—e.g. embodied in the signal processor 26—calculates the yaw rate $\omega_k^h$ from the steer angle $\delta_k^h$, e.g. using equation (85) and the longitudinal speed $U_k^h$ measurement, for input to the first Kalman filter 52. Otherwise, if the longitudinal speed U of the vehicle 12 is greater than or equal to the speed threshold $U^T$, the yaw rate $\omega_k^h$ from the yaw rate sensor 16 is input to the first Kalman filter 52. In yet another embodiment, the steer angle sensor 58 and yaw rate processor 68 are used without benefit of the yaw rate sensor 16. In yet another embodiment, the steer angle $\delta_k^h$ from the steer angle sensor 58 is input directly to the first Kalman filter 52. In yet another embodiment, if the longitudinal speed U of the vehicle 12 is less than the speed threshold $U^T$, then the steer angle $\delta_k^h$ from the steer angle sensor 58 is input directly to the first Kalman filter 52 that is adapted to use steer angle $\delta_k^h$ as the associated state variable., and if the longitudinal speed U of the vehicle 12 is greater than or equal to the speed threshold $U^T$, then the yaw rate $\omega_k^h$ from the yaw rate sensor 16 is input to the first Kalman filter 52 that is adapted to use yaw rate $\omega_k^h$ as the associated state variable.

Generally, the associated state and variance output of the host state filter 52.1 is processed by a curvature estimator 70 so as to provide estimates of the road curvature parameters $C_0$ and $C_1$ and the error covariance associated therewith. Generally, the curvature estimator 70 comprises a first curvature processor 72 which transforms the associated state and covariance output of the host state filter 52.1 to either road curvature parameters $C_0$ and $C_1$, or another related form—comprising a measurement vector $Z_k^C$ and an associated covariance matrix $R_k^C$ thereof—that is either used directly as the output of the road curvature estimation subsystem 42, or is input to a second Kalman filter 54 of the curvature filter 54.1, the output of which is either used as the output of the road curvature estimation subsystem 42, or which is transformed to road curvature parameters $C_0$ and $C_1$ and the associated covariance thereof using a second curvature processor 74. For example, the first 72 and second 74 curvature processors and the host state filter 52.1 of the curvature estimator 70 can be embodied in the signal processor 26.

In accordance with a first embodiment, the curvature estimator 70 comprises the first curvature processor 72 and the second Kalman filter 54, wherein the first curvature processor 72 calculates the road curvature parameters $C_0$ and $C_1$ from the host state $[\omega, \dot{\omega}, U, \dot{U}]^T$ for input as a measurement vector $Z_k^C$ to the second Kalman filter 54, e.g. in accordance with equation (21). Similarly, the first curvature processor 72 calculates the associated covariance $R_k^C$ of the measurement vector from the covariance $P_{k|k}^h$ of the host state vector, e.g. in accordance with equations (21) and (22). The associated second Kalman filter 54 is illustrated in FIG. 20, wherein the associated vectors and matrices referenced in the Appendix are given by:

$$\underline{Z}_k^C = \begin{bmatrix} C_{0m} \\ C_{1m} \end{bmatrix}_k \quad (113)$$

$$R_k^C = \begin{bmatrix} \sigma_{C_0}^2 & \sigma_{C_0 C_1}^2 \\ \sigma_{C_0 C_1}^2 & \sigma_{C_1}^2 \end{bmatrix}$$

$$F_k = \begin{bmatrix} 1 & \hat{U}_k T_k \\ 0 & 1 \end{bmatrix} \quad (114)$$

$$Q_k = \begin{bmatrix} (\hat{U}_k T_k)^3/3 & (\hat{U}_k T_k)^2/2 \\ (\hat{U}_k T_k)^2/2 & \hat{U}_k T_k \end{bmatrix} \times q$$

wherein $q = 6 \times 10^{-7}$, $T_k$ is the sampling time interval, and the variance and covariance elements of the associated R matrix are given by equations (97), (102) and (109). The output of the road curvature estimation subsystem 42 is then given by the output of the second Kalman filter 54. The first embodiment of the curvature estimator 70 is also illustrated in FIG. 4, wherein the action of the first curvature processor 72 is implicit in the interconnection between the first 52 and second 54 Kalman filters thereof.

A second embodiment of the curvature estimator 70 is a modification of the first embodiment, wherein the second Kalman filter 54 is adapted to incorporate a sliding window in the associated filtering process. The length of the sliding window is adapted so as to avoid excessive delay caused by window processing, and for example, in one embodiment, comprises about 5 samples. The associated vectors and matrices—referenced in the Appendix—of the associated second Kalman filter 54 are given by:

$$F_k = \begin{bmatrix} 1 & dL \\ 0 & 1 \end{bmatrix} \quad (115)$$

$$R_k^C = \begin{bmatrix} \text{mean}(\sigma_{C_0}^2(k-L:k)) & \text{mean}(\sigma_{C_0C_1}^2(k-L:k)) \\ \text{mean}(\sigma_{C_0C_1}^2(k-L:k)) & \text{mean}(\sigma_{C_1}^2(k-L:k)) \end{bmatrix} / L$$

$$Z_k^C = \begin{bmatrix} \text{mean}(C_{0m}(k-L:k)) \\ \text{mean}(C_{1m}(k-L:k)) \end{bmatrix}_k \quad (116)$$

$$Q_k = \begin{bmatrix} (dL)^3/3 & (dL)^2/2 \\ (dL)^2/2 & dL \end{bmatrix} \times q$$

where L is the sliding window length, $$dL = \text{mean}(U(k-L:k)) \times \sum_{i=k-L}^{k} T_i,$$

and $q=2\times 10^{-7}$. The variances and covariance of the associated R matrix are given by equations (97), (102) and (109).

A third embodiment of the curvature estimator 70 is a modification of the second embodiment, wherein the length L of the sliding window is adaptive. For example, the window length can be adapted to be responsive to the road curvature parameters $C_0$ and $C_1$, for example, in accordance with the following rule:

$$L_k=\min\{\max\{25-\text{floor}[(|\hat{C}_{0\_k-1}|+33|\hat{C}_{1\_k-1}|)\times 10^4], 1\}, L_{k-1}+1\} \quad (117)$$

This rule provides for a larger window length L—e.g. as large as 25 samples—when both $C_0$ and $C_1$ are relatively small, for example, corresponding to a straight section of road. The window length L becomes smaller—e.g. as small as 1 sample—when either $C_0$ or $C_1$ is large, corresponding to a turn or transition of road. Furthermore, the window length L can be sharply reduced to account for a sudden vehicle maneuver, with a limitation on the subsequent increase in window length L to one sample per step so that the previous samples so not adversely affect the output from the curvature estimator 70 when maneuver ends. As the window length L is changed, the associated F, Q, and R matrices in the second Kalman filter 54 are also changed.

In accordance with a fourth embodiment, the curvature estimator 70 comprises the first curvature processor 72, the second Kalman filter 54, and the second curvature processor 74, wherein the first curvature processor 72 calculates the road curvature parameter $C_0$ and $\dot{C}$ from the host state $[\omega, \dot{\omega}, U, \dot{U}]^T$ for input as a measurement vector $Z_k^C$ to the second Kalman filter 54, and the second curvature processor 74 transforms the output of the second Kalman filter 54 to $C_1$ and $C_1=\dot{C}/\hat{U}$ as the curvature estimates of the curvature estimator 70. The associated second Kalman filter 54 is illustrated in FIG. 21, wherein the associated vectors and matrices referenced in the Appendix are given by:

$$Z_{Ck} = \begin{bmatrix} C_{0m} \\ \dot{C}_m \end{bmatrix}_k \quad (118)$$

$$R_{Ck} = \begin{bmatrix} \sigma_{C_0}^2 & \sigma_{C_0\dot{C}}^2 \\ \sigma_{C_0\dot{C}}^2 & \sigma_{\dot{C}}^2 \end{bmatrix}$$

$$F_k = \begin{bmatrix} 1 & T_k \\ 0 & 1 \end{bmatrix} \quad (119)$$

$$Q_k = \begin{bmatrix} T_k^3/3 & T_k^2/2 \\ T_k^2/2 & T_k \end{bmatrix} \times q$$

wherein $q=0.01$, $T_k$ is the sampling time interval, and the variance and covariance elements of the associated R matrix are given by equations (97), (106) and (112).

A fifth embodiment of the curvature estimator 70 is a modification of the fourth embodiment, wherein the second Kalman filter 54 is adapted to incorporate a sliding window in the associated filtering process. The length of the sliding window is adapted so as to avoid excessive delay caused by window processing, and for example, in one embodiment, comprises about 5 samples. The associated vectors and matrices—referenced in the Appendix—of the associated second Kalman filter 54 are given by:

$$F_k = \begin{bmatrix} 1 & dL \\ 0 & 1 \end{bmatrix} \quad (120)$$

$$R_{Ck} = \begin{bmatrix} \text{mean}(\sigma_{C_0}^2(k-L:k)) & \text{mean}(\sigma_{C_0\dot{C}}^2(k-L:k)) \\ \text{mena}(\sigma_{C_0\dot{C}}^2(k-L:k)) & \text{mean}(\sigma_{\dot{C}}^2(k-L:k)) \end{bmatrix} / L$$

$$Z_{Ck} = \begin{bmatrix} \text{mean}(C0_m(k-L:k)) \\ \text{mean}(\dot{C}_m(k-L:k)) \end{bmatrix}_k \quad (121)$$

$$Q_k = \begin{bmatrix} (dL)^3/3 & (dL)^2/2 \\ (dL)^2/2 & dL \end{bmatrix} \times q$$

wherein L is the sliding window length, $$dL = \sum_{i=k-L}^{k} T_i,$$

and $q=4\times 10^{-4}$. The variances and covariance of the associated R matrix are given by equations (97), (106) and (112).

A sixth embodiment of the curvature estimator 70 is a modification of the fifth embodiment, wherein the length L of the sliding window is adaptive. For example, the window length can be adapted to be responsive to the road curvature parameters $C_0$ and $C_1$, for example, in accordance with the following rule of equation (117). This rule provides for a larger window length L—e.g. as large as 25 samples—when both $C_0$ and $C_1$ are relatively small, corresponding to a straight section of road. The window length L becomes smaller—e.g. as small as 1 sample—when either $C_0$ or $C_1$ is large, corresponding to a turn or transaction of road.

Furthermore, the window length L can be sharply reduced to account for a sudden vehicle maneuver, with a limitation on the subsequent increase in window length L to one sample per step so that the previous samples so not adversely affect the output from the curvature estimator 70 when maneuver ends. As the window length L is changed, the associated F, Q, and R matrices in the second Kalman filter 54 are also changed.

In accordance with a seventh embodiment, the curvature estimator 70 comprises the first curvature processor 72, which calculates the road curvature parameters $C_0$ and $C_1$ from the host state $[\omega, \dot{\omega}, U, \dot{U}]^T$ as the output of the road curvature estimation subsystem 42—without using a second Kalman filter 54.

In accordance with an eighth embodiment, the curvature estimator 70 comprises the first curvature processor 72, which determines the road curvature parameters $C_0$ and $C_1$ of the clothoid model by a curve fit of a trajectory of the host state $[\omega, \dot{\omega}, U, \dot{U}]^T$ from the host state filter 52.1. The position, velocity and acceleration components of the host vehicle 12 are calculated as follows:

$$\theta_k = \theta_{k-1} + \omega_{k-1} \cdot T + \dot{\omega}_{k-1} \cdot T^2/2 \tag{122}$$

$$x_k = x_{k-1} + \cos\theta_k \cdot (U_{k-1} \cdot T + \dot{U}_{k-1} \cdot T^2/2) \tag{123}$$

$$y_k = y_{k-1} + \sin\theta_k \cdot (U_{k-1} \cdot T + \dot{U}_{k-1} \cdot T^2/2) \tag{124}$$

$$\dot{x}_k = U_k \cdot \cos\theta_k \tag{125}$$

$$\ddot{x}_k = \dot{U}_k \cdot \cos\theta_k + U_k \cdot \omega_k \cdot \sin\theta_k \tag{126}$$

$$\dot{y}_k = U_k \cdot \sin\theta_k \tag{127}$$

$$\ddot{y}_k = \dot{U}_k \cdot \sin\theta_k + U_k \cdot \omega_k \cdot \cos\theta_k \tag{128}$$

Then from the clothoid model and equation (8):

$$y_k = \left(\frac{x_k^2}{2}\right) \cdot C_0 + \left(\frac{x_k^3}{6}\right) \cdot C_1 \tag{129}$$

$$\dot{y}_k = (x_k \cdot \dot{x}_k) \cdot C_0 + \left(x_k^2 \cdot \frac{\dot{x}_k}{2}\right) \cdot C_1 \tag{130}$$

$$\ddot{y}_k = (\dot{x}_k^2 + x_k \cdot \ddot{x}_k) \cdot C_0 + \left(x_k \cdot \dot{x}_k^2 + x_k^2 \cdot \frac{\ddot{x}_k}{2}\right) \cdot C_1 \tag{131}$$

After finding $x_k$, $y_k$ and their derivatives using equations (122) through (128), equations (129) through (131) are used with curve fitting to solve for the road curvature parameters $C_0$ and $C_1$, wherein a window of sampled data points—e.g. in one embodiment, about 12 sample points—is used to improve the smoothness of the associated curve used for curve fitting.

A ninth embodiment of the curvature estimator 70 is a modification of the eighth embodiment, wherein the length L of the sliding window is adaptive. For example, the window length can be adapted to be responsive to the road curvature parameters $C_0$ and $C_1$, for example, in accordance with the following rule:

$$L_k = \min\{\max\{25 - \text{floor}[(|C0_m(k)| + 33|C1_m(k)|) \times 7000], 2\}, L_{k-1}1\} \tag{132}$$

This rule provides for a larger window length L—e.g. as large as 25 samples—when both $C_0$ and $C_1$ are relatively small, for example, corresponding to a straight section of road. The window length L becomes smaller—e.g. as small as 2 samples—when either $C_0$ or $C_1$ is large, corresponding to a turn or transition of road. Furthermore, the window length L can be sharply reduced to account for a sudden vehicle maneuver, with limitation on the subsequent increase in window length L to one sample per step so that the previous samples so not adversely affect the output from the curvature estimator 70 when maneuver ends.

The above-described first through ninth embodiments of the road curvature estimation subsystem 42 are based upon the clothoid model of road curvature, wherein the road curvature C is characterized as varying linearly with respect to path length along the road, and wherein different types of roads (e.g. straight, circular or generally curved) are represented by different values of the clothoid road curvature parameters $C_0$ and $C_1$. The clothoid model reduces to a simpler form for straight ($C_0 = C_1 = 0$) and circular ($C_1 = 0$) road segments. Different embodiments of the road curvature estimation subsystem 42 can be used under different conditions. For example, in one embodiment of the predictive collision sensing system 10 in which the sampling rate of the yaw rate sensor 16 is relatively low, the seventh embodiment of the curvature estimator 70 is used when the longitudinal speed U of the host vehicle 12 is greater than a threshold, e.g. about 11 meters/second, and the ninth embodiment of the curvature estimator 70 is used at greater velocities. The ratio of the mean prediction error to the mean prediction distance can be used to compare and evaluate the various embodiments of the curvature estimator 70.

Figure 22:
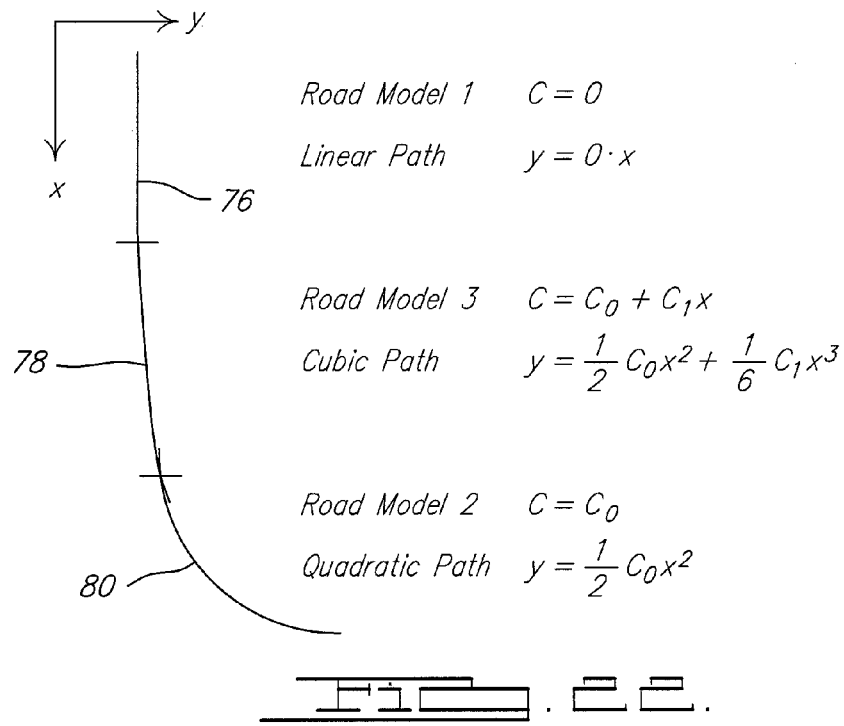
FIG. 22 illustrates various types of roads and associated road models.

Generally, high-speed roads can be modeled as a collection of different types of interconnected road segments, each of which is represented by a different road model. For example, FIG. 22 illustrates a straight first road segment 76 having a linear path—represented by C=0,—connected to a curved second road segment 78 having a cubic path—represented by the clothoid model $C = C_0 + C_1 x$,—connected to a third road segment 80 having a quadratic path—represented by $C = C_0$.

Figure 23:
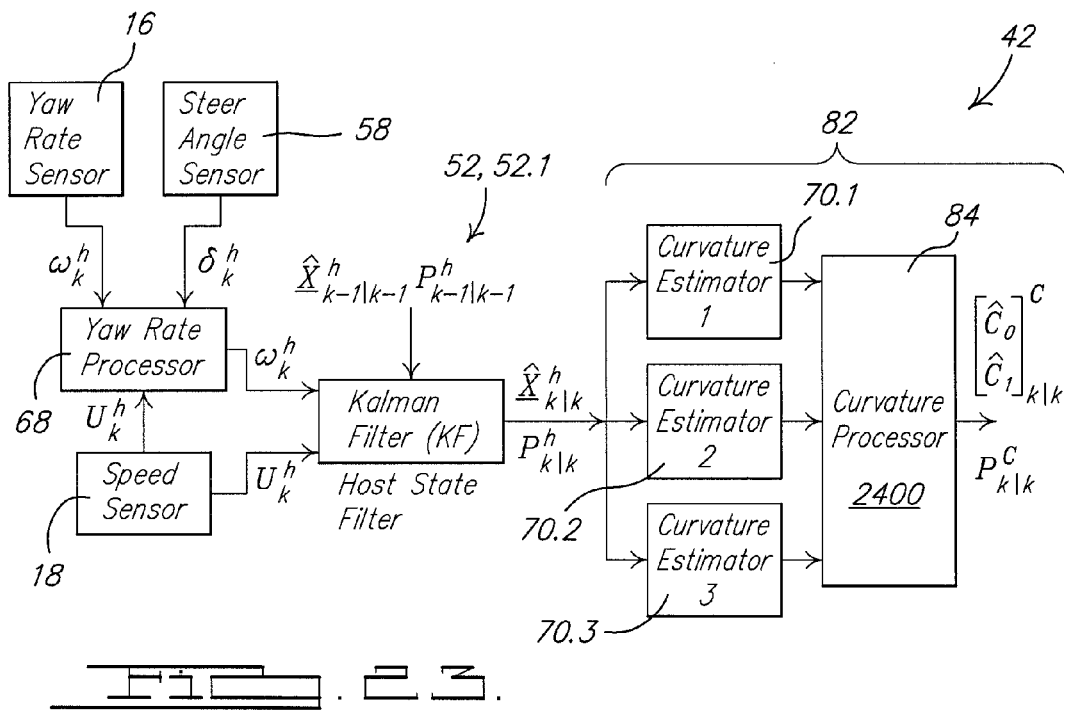
FIG. 23 illustrates a block diagram of a tenth embodiment of a road curvature estimation subsystem.

Referring to FIG. 23, in accordance with a tenth embodiment of the road curvature estimation subsystem 42, different types of roads are represented with different models, rather than using a single all-inclusive clothoid model, thereby providing for improved estimation accuracy for road segments that are characterized by models with fewer degrees of freedom resulting from constraints on one or more coefficients of the clothoid model, because of the fewer degrees of freedom. For example, for a straight road segment 76, the clothoid model reduces to $C = 0 \rightarrow C_0 = C_1 = 0$ corresponding to a path equation of y=0; and for a quadratic road segment 80, the clothoid model reduces to $C = C_0$ corresponding to a path equation of $$y = \frac{1}{2} C_0 x^2.$$

Accordingly, the roadway is represented by a multiple model system 82, wherein a particular road segment is characterized by one of a finite number r of models. For example, in FIG. 23, the multiple model system 82 incorporates r=3 models, each of which is embodied in a separate corresponding curvature estimator 70.1, 70.2 and 70.3 respectively. Each curvature estimator 70.1, 70.2, 70.3 is generally structured as illustrated in FIG. 19, and is adapted to process the output of the host state filter 52.1. Although FIG. 23 illustrates a common host state filter 52.1 for all of the curvature estimators 70.1, 70.2, 70.3, different curvature estimators 70.1, 70.2, 70.3 could utilize different corresponding embodiments of the host state filter 52.1—e.g. one embodiment of the host state filter 52.1 using only a yaw rate sensor 16, another embodiment using a yaw rate sensor 16 and a steer angle sensor 58. For example, the first curvature estimator 70.1 embodies a straight road model, the second curvature estimator 70.2 embodies a circular arc or quadratic road model and the third curvature estimator 70.3 embodies a clothoid road model suitable for a general high-speed road.

More particularly, the straight road model is characterized by:

$$C = 0 \Rightarrow (C_0 = 0 \text{ and } C_1 = 0) \quad (133)$$

$$F_k = \begin{bmatrix} 0 & 0 \\ 0 & 0 \end{bmatrix} \quad (134)$$

$$Q_k = \begin{bmatrix} 0 & 0 \\ 0 & 0 \end{bmatrix}$$

The circular arc or quadratic road model is characterized by:

$$C = C_0 \Rightarrow (C_1 = 0) \quad (135)$$

$$F_k = \begin{bmatrix} 1 & 0 \\ 0 & 0 \end{bmatrix} \quad (136)$$

$$Q_k = \begin{bmatrix} (\hat{U}_k T_k)^3/3 & 0 \\ 0 & 0 \end{bmatrix} \times q$$

where $T_k$ is sampling period, $\hat{U}_k$ is estimated host speed, and q=0.0005.

The clothoid road model is characterized by:

$$C = C_0 + C_1 \cdot l \quad (137)$$

$$F_k = \begin{bmatrix} 1 & \hat{U}_k T_k \\ 0 & 1 \end{bmatrix} \quad (138)$$

$$Q_k = \begin{bmatrix} (\hat{U}_k T_k)^3/3 & (\hat{U}_k T_k)^2/2 \\ (\hat{U}_k T_k)^2/2 & \hat{U}_k T_k \end{bmatrix} \times q$$

where $T_k$ is sampling period, $\hat{U}_k$ is estimated host speed, and q=0.0025.

The multiple model system 82 has both continuous (noise) uncertainties as well as discrete ("model" or "mode") uncertainties, and is thereby referred to as a hybrid system. The multiple model system 82 is assumed to be characterized by a base state model, a modal state, and a mode jump process.

The base state model is assumed to be characterized as follows:

$$x(k)=F[M(k)] \times (k-1)+v[k-1,M(k)] \quad (139)$$

$$z(k)=H[M(k)] \times (k)+w[k,M(k)] \quad (140)$$

where M(k) denotes the mode at time k in effect during the sampling period ending at k.

The modal state, or mode, is assumed to be one of r possible modes:

$$M(k) \in \{M_j\}_{j=1}^r \quad (141)$$

wherein the structure of the system and/or the statistics of the associated noise components can be different for different modes, as follows:

$$F[M_j]=F_j \quad (142)$$

$$v(k-1,M_j) \sim N(u_j, Q_j) \quad (143)$$

The mode jump process governs the transition from one mode to another is assumed to be characterized by a Markov chain with known transition probabilities, as follows:

$$P\{M(k)=M_j|M(k-1)=M_i\}=p_{ij} \quad (144)$$

The curvature estimators 70.1, 70.2, 70.3 operate in parallel, and the output therefrom is operatively coupled to a curvature processor 84—which, for example, can be embodied in the signal processor 26—which generates a single estimate of road curvature and associated covariance, in accordance with an interacting multiple model algorithm 2400 (IMM). Generally, the interacting multiple model algorithm 2400 is useful to track either or both maneuvering and non-maneuvering targets with moderate computational complexity, wherein a maneuver is modeled as a switching of the target state model governed by an underlying Markov chain. Different state models can have different structures, and the statistics of the associated process noises of different state models can be different. The interacting multiple model algorithm 2400 performs similar to the exact Bayesian filter, but requires substantially less computational power. Each model has a corresponding filter that is processed by the curvature processor 84 in accordance with the interacting multiple model algorithm 2400.

Figure 24:
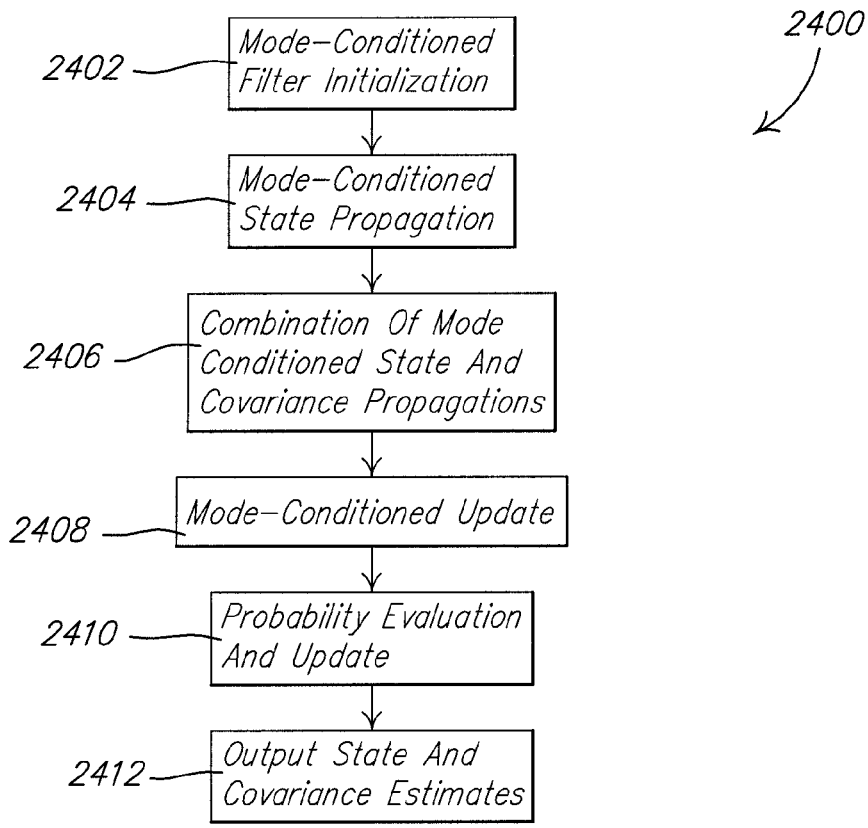
FIG. 24 illustrates a flow chart of an interacting multiple model algorithm.

Referring to FIG. 24, the interacting multiple model algorithm 2400 commences with the initialization in the current cycle of each mode conditioned filter in step (2402), whereby the mode-conditioned state estimates and covariance of the previous cycle are mixed using mixing probabilities. Each filter uses a mixed estimate at the beginning of each cycle, wherein the mixing is determined by the probabilities of switching between models. The initial estimate and covariance for filter j, for each model, i.e. j=1, . . . , r, is given by:

$$\hat{x}^{0j}(k-1|k-1) = \sum_{i=1}^r \hat{x}^i(k-1|k-1) \cdot \mu_{i|j}(k-1|k-1) \quad (145)$$

$$P^{0j}(k-1|k-1) = \quad (146)$$
$$\sum_{i=1}^r \mu_{i|j}(k-1|k-1) \cdot \{P^i(k-1|k-1) + [\hat{x}^i(k-1|k-1) - \hat{x}^{0j}(k-1|k-1)] \cdot [\hat{x}^i(k-1|k-1) - \hat{x}^{0j}(k-1|k-1)]'\}$$

Then, in step (2404), the mode-conditioned state is propagated for each model, i.e. j=1, . . . , r, according to a Kalman filter matched to the $j^{th}$ mode, $M_j(k)$, so as to provide the state $x^j(k|k-1)$ and covariance $P^j(k|k-1)$ at time k.

Then, in step (2406), the propagated mode-conditioned state estimates and covariances for each of the modes are combined to give:

$$\hat{x}(k|k-1) = \sum_{j=1}^r \hat{x}^j(k|k-1)\mu_j(k-1) \quad (147)$$

-continued $$P(k \mid k-1) = \sum_{j=1}^{r} \mu_j(k-1)\{P^j(k \mid k-1) + \quad (148)$$
$$[\hat{x}^j(k \mid k-1) - \hat{x}(k \mid k-1)][\hat{x}^j(k \mid k-1) - \hat{x}(k \mid k-1)]'\}$$

Then, in step (2408), for each of the r parallel filters, the state estimates and covariances are calculated, conditioned on a mode being in effect and conditioned on the corresponding mode likelihood function. The Kalman filter matched to the $j^{th}$ mode, $M_j(k)$, uses measurement $z(k)$ to provide the state $x^j(k|k)$ and covariance $P^j(k|k)$, whereby the likelihood function corresponding to filter j is given by:

$$\Lambda_j(k) = N[z(k); z_j(k|k-1), S_j(k)] \quad (149)$$

Then, in step (2410), the model probability $\mu_j(k)$ is updated for each mode, i.e. j=1, . . . , r, in parallel so as to provide the likelihood that each model is correct. The mixing probabilities are calculated for all combinations of (i,j) for (i,j=1, . . . r), as follows:

$$\mu_{i|j}(k-1 \mid k-1) = \frac{1}{\bar{c}_j} p_{ij}\mu_i(k-1) \quad (150)$$

where $$\bar{c}_j = \sum_{i=1}^{r} p_{ij}\mu_i(k-1) \quad (151)$$

The mode probabilities are then updated for each mode, i.e. j=1, . . . , r, as follows:

$$\mu_j(k) = \frac{1}{c}\Lambda_j(k)\bar{c}_j \quad (152)$$

$$c = \sum_{j=1}^{r} \Lambda_j(k)\bar{c}_j \quad (153)$$

Then, in step (2412), the overall state estimate and covariance—the output of the interacting multiple model algorithm 2400—is calculated by combining the mode-conditioned state estimates and covariances as follows:

$$\hat{x}(k \mid k) = \sum_{j=1}^{r} \hat{x}^j(k \mid k)\mu_j(k) \quad (154)$$

$$P(k \mid k) = \sum_{j=1}^{r} \mu_j(k)\begin{Bmatrix} P^j(k \mid k) + [\hat{x}^j(k \mid k) - \hat{x}(k \mid k)] \\ [\hat{x}^j(k \mid k) - \hat{x}(k \mid k)]' \end{Bmatrix} \quad (155)$$

The measurement and its noise covariance used as input to the interacting multiple model algorithm 2400 curvature filter, for each of the three associated mode-conditioned Kalman filters, are given by:

$$\begin{bmatrix} C_{0m} \\ C_{1m} \end{bmatrix}_k = \begin{bmatrix} \dfrac{\hat{\omega}_k}{\hat{U}_k} \\ \dfrac{\hat{\omega}_k}{\hat{U}_k^2} - \dfrac{\hat{\omega}_k \hat{U}_k}{\hat{U}_k^3} \end{bmatrix}, \quad (156)$$

$$R_{Ck} = J_{CX} P_{k|k} J_{CX}^T \quad (157)$$

where $P_{k|k}$ is the state error covariance matrix from the host filter, and $J_{CX}$ is the Jacobian matrix given by:

$$J_{CX} = \begin{bmatrix} -\dfrac{\hat{\omega}_k}{\hat{U}_k^2} & 0 & \dfrac{1}{\hat{U}_k} & 0 \\ -\dfrac{2\hat{\omega}_k}{\hat{U}_k^3} + \dfrac{3\hat{\omega}_k \hat{U}_k}{\hat{U}_k^4} & -\dfrac{\hat{\omega}_k}{\hat{U}_k^3} & -\dfrac{\hat{U}_k}{\hat{U}_k^3} & \dfrac{1}{\hat{U}_k^2} \end{bmatrix} \quad (158)$$

The Markov model is implemented by assuming that at each scan time there is a probability $p_{ij}$ that the target will make the transition from model state i to state j. These probabilities are assumed to be known a priori and can be expressed in a model probability transition matrix, e.g. as follows:

$$P_{trans} = \begin{matrix} & \text{New State} \\ & \begin{matrix} 1 & 2 & 3 \end{matrix} \\ \text{Prior} \begin{matrix} 1 \\ 2 \\ \text{State} \\ 3 \end{matrix} & \begin{bmatrix} p_{11} & p_{12} & p_{13} \\ p_{21} & p_{22} & p_{23} \\ p_{31} & p_{32} & p_{33} \end{bmatrix} \end{matrix} = \begin{bmatrix} 0.95 & 0.01 & 0.04 \\ 0.07 & 0.75 & 0.18 \\ 0.17 & 0.16 & 0.67 \end{bmatrix} \quad (159)$$

Figure 25:
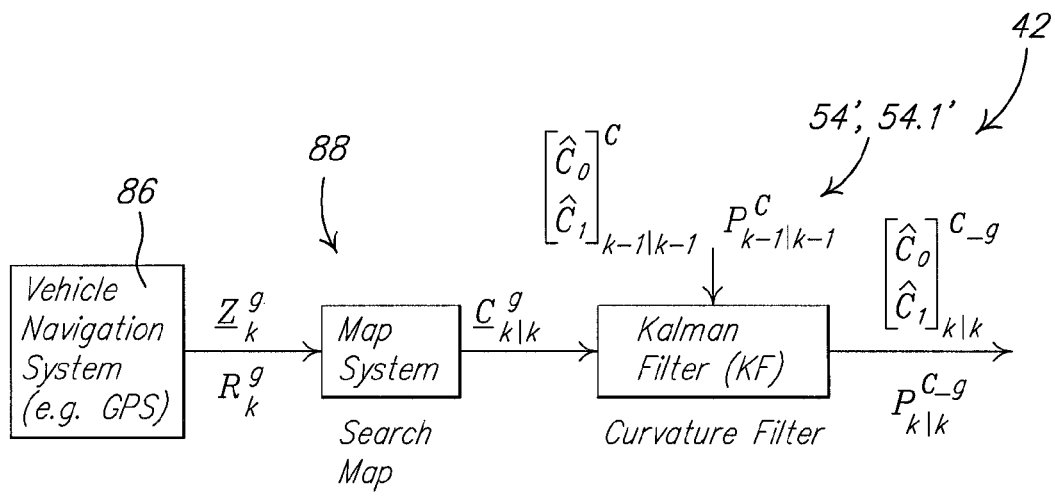
FIG. 25 illustrates a block diagram of a curvature estimation subsystem responsive to vehicle location and associated road curvature data from an associated map system.

Referring to FIGS. 1 and 25, in accordance with another embodiment of a road curvature estimation subsystem 42', the predictive collision sensing system 10 further comprises a vehicle navigation system 86 and an associated map system 88, operatively coupled to the signal processor 26. For example, the vehicle navigation system 86 could comprise a GPS navigation system that provides at least a two-dimensional vehicle position measure $\underline{Z}_k^g$ indicative of the current vehicle position on the road surface, e.g. $\underline{Z}_k^g=[x, y]$, having an associated error covariance $\underline{R}^g = cov(\underline{Z}_k^g)$, where x and y are the world absolute coordinates of the vehicle, e.g. latitude and longitude coordinates in the World Geodetic System WGS. The vehicle navigation system 86 could also provide altitude and time information, and/or the associated velocities of the measurements. The vehicle position measure $\underline{Z}_k^g$ is used with the map system 88 to determine the position and curvature coordinates of the road relative to the host vehicle 12, wherein the map system 88 incorporates a digital map database in absolute coordinates and an algorithm to convert the vehicle position measure $\underline{Z}_k^g$—in world absolute coordinates—of the road on which the host vehicle 12 is located, to the host absolute coordinates in the coordinate system used hereinabove for road curvature and target state estimation. Accordingly, the map system 88 provides for the following transformation:

$$[\underline{X}^c, \underline{Y}^c, \underline{C}^R] = f^M(x, y) \quad (160)$$

wherein (x, y) are the world absolute coordinates of the vehicle position measure $\underline{Z}_k^g$ from the vehicle navigation system 86; $\underline{X}^c$ and $\underline{Y}^c$ are vectors containing the coordinates of the center of the road closest to [x, y], and $\underline{C}^R$ is an array containing the curvature parameters corresponding to the road center point coordinates in the vectors $\underline{X}^c$ and $\underline{Y}^c$. Accordingly, $[\underline{X}^c(i), \underline{Y}^c(i)]$ represents a point on the center of the road, and $\underline{C}^R(i)=[C^0,C^1]$ represents the curvature parameters of the road at that point. The error covariance of $\underline{X}^c$ and $\underline{Y}^c$ is $\underline{R}_m{}^g$, and the error covariance of $\underline{C}^R$ is given by $\underline{R}_C{}^g$, representing the noise or error in the associated map data. The map system 88 can either store both the road position coordinates and associated curvature parameter information, or could calculate the curvature parameters from the stored position coordinates of the road centers as the information is required. The world absolute coordinates can be transformed to host vehicle absolute coordinates by a combination of translation and rotation, given the position of the host vehicle 12 from the vehicle navigation system 86, and the heading of the host vehicle 12 based upon either information from the host filter 52.1, or from the vehicle navigation system 86, or both.

More particularly, given the vehicle position measure $\underline{Z}_k{}^g$, in one embodiment the map system 88 uses an associated map database to determine the road that the host vehicle 12 is most likely on by finding roads in the associated map database that satisfy the following selection criteria:

$$(\underline{Z}_k{}^g - \underline{Z}^r) \cdot \underline{R}^g \cdot (\underline{Z}_k{}^g - \underline{Z}^r)^T \leq T \qquad (161)$$

where T is a selection threshold and $\underline{Z}^r$ is a point on the road that is closest to the vehicle position measure $\underline{Z}_k{}^g$. If more than one road satisfies the selection criteria, then the most likely road is selected by comparing the curvature $$\hat{\underline{C}}_k^C = \begin{bmatrix} \hat{C}_0 \\ \hat{C}_1 \end{bmatrix}_{k|k}^C$$

estimated by another road curvature estimation system 42 with the curvature $\underline{C}^R$ of each prospective road from the map database of the map system 88, and the road from the map database, for which the curvature $\underline{C}^R$ of the point nearest to the vehicle position measure $\underline{Z}_k{}^g$ is closest to estimated curvature $\hat{\underline{C}}_k^C$ from the other curvature estimation system 42, is selected as the most likely road from the map database, and the associated curvature at the closest point is then given as $\underline{C}_{k|k}{}^g = \underline{C}^R$.

Referring to FIG. 25, the curvature $\underline{C}_{k|k}{}^g$ from the map system 88 of a point on the road closest to the location of the host vehicle 12 from the vehicle navigation system 86 is used as a measurement to an associated Kalman filter 54' of a corresponding curvature filter 54.1', which is used to generate a corresponding map-based road curvature estimate $$\begin{bmatrix} \hat{C}_0 \\ \hat{C}_1 \end{bmatrix}_{k|k}^{C\_g}$$

and an associated covariance $P_{k|k}{}^{C\_g}$.

Referring to FIG. 26, in accordance with another embodiment of a road curvature estimation subsystem 42", the associated trajectory $$\begin{bmatrix} r \\ \dot{r} \\ \eta \end{bmatrix}_k^t$$

of the target vehicle 36—as measured by the radar sensor 14—can be used to determine an estimate of road curvature of the roadway 34 based upon the premise that under normal driving conditions, the target vehicle 36 is assumed to follow the roadway 34. The dynamics of the $t^{th}$ target are assumed to be given by the following constant-acceleration kinematic equations, which are embodied in an extended Kalman filter 90 of an auxiliary filter 90.1.

$$x_{k+1}^{at} = F_k^{at} \cdot x_k^{at} + w_k^{at}, \qquad w_k^{at} \sim N(0, Q_k^{at}) \qquad (162)$$

$$z_k^{at} = h_k^{at}(x_k^{at}) + v_k^{at}, \qquad v_k^{at} \sim N(0, R_k^{at}) \qquad (163)$$

where $$F_k^{at} = \begin{bmatrix} F_1 & 0 \\ 0 & F_1 \end{bmatrix}, F_1 = \begin{bmatrix} 1 & T & \frac{T^2}{2} \\ 0 & 1 & T \\ 0 & 0 & 1 \end{bmatrix}, \underline{x}_k^{at} = \begin{bmatrix} x^{at} \\ \dot{x}^{at} \\ \ddot{x}^{at} \\ y^{at} \\ \dot{y}^{at} \\ \ddot{y}^{at} \end{bmatrix}_k \text{ and } \underline{z}_k^{at} = \begin{bmatrix} r \\ \dot{r} \\ \eta \end{bmatrix}_k^t \qquad (164)$$

wherein T is the sampling period, the superscript $(\bullet)^t$ is used to designate a particular target, and the superscript $(\bullet)^a$ is used to indicate that the filter is auxiliary.

The associated measurement function $\underline{h}_k{}^{at}$ is non-linear, and given by:

$$\underline{h}_k^{at} = \begin{bmatrix} \sqrt{(x_k^{at})^2 + (y_k^{at})^2} \\ \frac{1}{\sqrt{(x_k^{at})^2 + (y_k^{at})^2}} \cdot (x_k^{at} \cdot \dot{x}_k^{at} + y_k^{at} \cdot \dot{y}_k^{at}) \\ \tan^{-1}\left(\frac{y_k^{at}}{x_k^{at}}\right) \end{bmatrix} \qquad (165)$$

The extended Kalman filter 90 provides for linearization of the non-linear measurement function $\underline{h}_k{}^{at}$ using an associated Jacobian matrix, and provides for an estimate of the target state $\hat{\underline{x}}_{k|k}{}^{at}$, and its associated error covariance $P_{k|k}{}^{at}$, which are transformed by an associated measurement processor 92 so as to provide the measurement input $\underline{z}_k{}^{C\_t}$ and associated error covariance $R_k{}^{C\_t}$ to an associated Kalman filter 94 of an associated curvature filter 94.1. The measurement input $\underline{z}_k{}^{C\_t}$ and associated error covariance $R_k{}^{C\_t}$ are given by:

$$\underline{z}_k^{C\_t} = \begin{bmatrix} \hat{y}^{at} \\ \hat{\dot{y}}^{at} \\ \hat{\ddot{y}}^{at} \end{bmatrix}_{k|k} \qquad (166)$$

$$R_k^{C\_t} = P_{y_{k|k}}^{at} \qquad (167)$$

The system equations of the associated Kalman filter 94 of the associated curvature filter 94.1 are given by:

$$x_{k+1}^{C\_t} = F_k^{C\_t} \cdot x_k^{C\_t} + w_k^{C\_t}, \quad w_k^{C\_t} \sim N(0, Q_k^{C\_t}) \tag{168}$$

$$z_k^{C\_t} = H^{C\_t} \cdot x_k^{C\_t} + v_k^{C\_t}, \quad v_k^{C\_t} \sim N(0, R_k^{C\_t}) \tag{169}$$

where $$F_k^{C\_t} = \begin{bmatrix} 1 & 0 & 0 \\ 0 & 1 & \Delta t \cdot \hat{U} + \hat{\dot{U}} \cdot \Delta t^2/2 \\ 0 & 0 & 1 \end{bmatrix}, \tag{170}$$

$$\underline{x}_k^{C\_t} = \begin{bmatrix} B \\ C_0 \\ C_1 \end{bmatrix}_k$$

and the associated measurement matrix $H_k^{C\_t}$ is given as follows:

$$H_k^{C\_t} = \begin{bmatrix} 1 & \frac{(\hat{x}^{at})^2}{2} & \frac{(\hat{x}^{at})^3}{6} \\ 0 & \hat{x}^{at}\hat{\dot{x}}^{at} & \frac{(\hat{x}^{at})^2\hat{\dot{x}}^{at}}{2} \\ 0 & \hat{x}^{at}\hat{\ddot{x}}^{at} + (\hat{\dot{x}}^{at})^2 & \hat{x}^{at}(\hat{\dot{x}}^{at})^2 + \frac{(\hat{x}^{at})^2\hat{\ddot{x}}^{at}}{2} \end{bmatrix}_{k|k} \tag{171}$$

The auxiliary filter 92.1 and the curvature filter 94.1 of the road curvature estimation subsystem 42″ operate in accordance with the Appendix.

Referring to FIG. 27, in accordance with another embodiment, a predictive collision sensing system 10.1 comprises a plurality of road curvature estimation subsystems 42.1, 42.2, ..., 42.N, each of which operates in accordance with any one of the various embodiments of road curvature estimation subsystems 42, 42′ or 42″ described hereinabove, e.g. as illustrated in FIG. 4, 19, 23, 25 or 26. Each road curvature estimation subsystem 42.1, 42.2, ... 42.N provides a separate, associated estimate of road curvature, which is then fused by a road curvature fusion subsystem 96, for example, to provide an improved estimate of the road curvature and associated error covariance at a future location along the roadway 34. For example, in one embodiment, the predictive collision sensing system 10.1 incorporates first 42.1 and second 42.2 road curvature estimation subsystems, wherein the first road curvature estimation subsystem 42.1 is a road curvature estimation subsystem 42 responsive to host vehicle measurements, and the second road curvature estimation subsystem 42.2 is a road curvature estimation subsystem 42′ responsive to measurements from a vehicle navigation system 86 and an associated map system 88.

From the first road curvature estimation subsystem 42.1, the curvature estimate and associated error covariance at a distance l along the roadway 34 from the current location are given respectively by:

$$C(l) = C_0 + C_1 \cdot l \tag{172}$$

$$R_C(l) = R_{C0} + R_{C1} \cdot l \tag{173}$$

where $R_{C0}$, $R_{C1}$ and $R_C$ are the error covariances of $C_0$, $C_1$ and $C$ respectively.

From the second road curvature estimation subsystem 42.2, the corresponding curvature estimate is given by $C_g(l)$ and the corresponding error covariance is given by $R_g$, wherein $R_g$ is generally a constant scalar.

The curvature estimates and associated error covariances are combined by the road curvature fusion subsystem 96, for example, as follows:

$$C_f(l) = G \cdot C(l) + G_g \cdot C_g(l) \tag{174}$$

$$R_f(l) = (R_C(l)^{-1} + R_g^{-1})^{-1} \tag{175}$$

where $G$ and $G_g$ are weights given by:

$$G = \frac{1}{1 + \frac{R_C(l)}{R_g}} \tag{176}$$

$$G_g = \frac{1}{1 + \frac{R_g}{R_C(l)}} \tag{177}$$

The fused curvature $C_f(l)$ and associated error covariance $R_f(l)$ can be used by other processes, for example for improving the estimation of the locations of the host 12 or target 36 vehicles, or for collision prediction. For example, in the embodiment of FIG. 27, the fused curvature $C_f(l)$ and associated error covariance $R_f(l)$ are input to a constrained target state estimation subsystem 46 for estimating the constrained target state, wherein the constrained target state estimation subsystem 46 and the associated unconstrained target state estimation subsystem 44, target state decision subsystem 48, and target state fusion subsystem 50 function in accordance with the embodiment illustrated in FIG. 4.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the any claims derivable from the description herein, and any and all equivalents thereof APPENDIX—Description of Kalman Filtering A Kalman filter is used to estimate, from a set of noisy measurements, the state and associated covariance of a dynamic system subject to noise.

The system dynamics are defined by:

$$\underline{x}_{k+1} = F_k \underline{x}_k + \underline{w}_k, \quad \underline{w}_k \sim N(0, Q_k) \tag{A-1}$$

where $\underline{x}_k$ is the system state vector, $F_k$ is the system matrix and $\underline{w}_k$ an associated vector of noise variables corresponding to each state variable, each noise variable having a mean value of zero, and a variance given by the corresponding element of the associated variance vector, $Q_k$.

The dynamics of the associated system measurements are given by:

$$\underline{z}_k = H_k \underline{x}_k + \underline{v}_k, \quad \underline{v}_k \sim N(0, R_k) \tag{A-2}$$

where $\underline{z}_k$ is the system measurement vector, $H_k$ is the measurement matrix and $\underline{v}_k$ an associated vector of noise variables corresponding to each measurement variable, each noise variable having a mean value of zero, and a variance given by the corresponding element of the associated variance vector, $R_k$. The values of the elements of the associated covariance matrix $R_k$ can be determined a priori from analysis of the representative measurements of the associated system for associated representative sets of operating conditions. The values of the elements of the associated covariance matrix $Q_k$ account for modeling errors. Generally, the associated matrices $F_k$, $Q_k$, $H_k$, $R_k$ can vary over time.

Given a measurement $\underline{z}_k$ at time k, and initial values of the state $\underline{x}_{k-1|k-1}$ and associated covariance $P_{k-1|k-1}$ at time k−1, the Kalman filter is used to estimate the associated state $\underline{x}_{k|k}$ and associated covariance $P_{k|k}$ at time k.

The first step in the filtering process is to calculate estimates of the state $\underline{x}_{k|k-1}$ and associated covariance $P_{k|k-1}$ at time k based upon estimates at time k−1, as follows:

$$\underline{x}_{k|k-1} = F_k \cdot \underline{x}_{k-1|k-1} \tag{A-3}$$

$$P_{k|k-1} = F_k \cdot P_{k-1|k-1} \cdot F_k^T + Q^k \tag{A-4}$$

The next step is to predict the measurement $\hat{\underline{z}}_k$ and associated covariance matrix $S_k$ at time k, as follows:

$$\hat{\underline{z}}_k = H_k \cdot \underline{x}_{k|k-1} \tag{A-5}$$

$$S_k = \text{cov}(\hat{\underline{z}}_k) = H_k \cdot P_{k|k-1} \cdot H_k^T + R_k \tag{A-6}$$

The next step is to calculate a gain matrix $G_k$ used for updating the state vector $\underline{x}_{k|k}$ and associated covariance matrix $P_{k|k}$, as follows:

$$G_k = P_{k|k-1} \cdot H_k^T \cdot S_k^{-1} \tag{A-7}$$

Finally, the state vector $\underline{x}_{k|k}$ and associated covariance matrix $P_{k|k}$ are estimated at time k, responsive to the associated measurement $\underline{z}_k$, as follows:

$$\underline{x}_{k|k} = \underline{x}_{k|k-1} + G_k \cdot (\underline{z}_k - \hat{\underline{z}}_k) \tag{A-8}$$

$$P_{k|k} = P_{k|k-1} - G_k \cdot S_k \cdot G_k^T \tag{A-9}$$

What is claimed is:

1. A road curvature estimation system, comprising:
   a. a speed sensor adapted to measure a longitudinal speed of a vehicle on a roadway and to generate a measure of longitudinal speed responsive thereto;
   b. a source of a measure of yaw rate of said vehicle; and
   c. a processor operatively coupled to said speed sensor and to said source of said measure of yaw rate, wherein said processor comprises a plurality of curvature estimators associated with a corresponding plurality of different roadway models, each said curvature estimator is adapted to estimate at least one associated curvature parameter of a corresponding said different roadway model, said processor provides for selecting a most likely of said different roadway models as a most likely roadway model, and said processor provides for outputting said at least one curvature parameter of said most likely roadway model as an estimate of curvature of said roadway.

2. A road curvature estimation system as recited in claim 1, wherein said processor comprises an interacting multiple model algorithm incorporating a mode jump process characterized by a Markov chain.

3. A road curvature estimation system as recited in claim 2, wherein said interacting multiple model algorithm comprises:
   a. a mode-conditioned filter initialization process;
   b. a mode-conditioned state propagation process;
   c. a combination of mode-conditioned state and covariance propagations;
   d. a mode-conditioned update process;
   e. a probability evaluation and update process; and
   f. process to output state and covariance estimates.

4. A road curvature estimation system as recited in claim 1, wherein said plurality of different roadway models comprise at least two roadway models selected form a straight road model, a quadratic road model, and a clothoid road model.

* * * * *